(12) United States Patent
Racz et al.

(10) Patent No.: US 11,374,997 B2
(45) Date of Patent: Jun. 28, 2022

(54) METHODS AND SYSTEMS FOR CODEC DETECTION IN VIDEO STREAMS

(71) Applicant: GENETEC INC., Montreal (CA)

(72) Inventors: Pierre Racz, Montreal (CA); Julien Vary, Montreal (CA)

(73) Assignee: GENETEC INC., Saint-Laurent (CA)

( * ) Notice: Subject to any disclaimer, the term of this patent is extended or adjusted under 35 U.S.C. 154(b) by 0 days.

(21) Appl. No.: 17/489,121

(22) Filed: Sep. 29, 2021

(65) Prior Publication Data

US 2022/0028236 A1    Jan. 27, 2022

Related U.S. Application Data

(63) Continuation of application No. 16/880,832, filed on May 21, 2020, now Pat. No. 11,153,360.
(Continued)

(51) Int. Cl.
| | |
|---|---|
| *H04L 29/06* | (2006.01) |
| *H04L 12/801* | (2013.01) |
| *H04N 21/24* | (2011.01) |
| *H04L 65/60* | (2022.01) |
| *H04L 65/65* | (2022.01) |
| *H04L 69/22* | (2022.01) |

(Continued)

(52) U.S. Cl.
CPC ...... *H04L 65/607* (2013.01); *G08B 13/19656* (2013.01); *G08B 13/19667* (2013.01); *G08B 13/19686* (2013.01); *H04L 47/196* (2013.01); *H04L 65/608* (2013.01); *H04L 69/22* (2013.01); *H04N 19/70* (2014.11); *H04N 21/2402* (2013.01)

(58) Field of Classification Search
CPC ... H04L 65/607; H04L 47/196; H04L 65/608; H04L 69/22; H04N 19/70; H04N 21/23; G08B 13/19656; G08B 13/19667; G08B 13/19686
See application file for complete search history.

(56) References Cited

U.S. PATENT DOCUMENTS 6,650,640 B1    11/2003 Muller et al.
7,242,681 B1    7/2007 Bokkelen et al.
(Continued)

FOREIGN PATENT DOCUMENTS

WO    2020/232549    11/2020

OTHER PUBLICATIONS

Wireshark—About Wireshark Tab, https://www.wireshark.org/, 1 page, [retrieved May 21, 2020].
(Continued)

*Primary Examiner* — Christopher B Robinson

(57) ABSTRACT

Method and apparatus for carrying out the method receiving packets, each of the packets comprising a header and a payload. For a particular packet among the packets, the method includes processing at least the header of the particular packet to determine a flow associated with the particular packet; attempting to determine a payload structure based on the flow, the payload structure associated with transport of coded video data in the payload of the particular packet; and if the attempting is successful, repackaging coded video data contained in the payload of the particular packet into a new packet and forwarding the new packet to an external system or storing the new packet in memory.

30 Claims, 39 Drawing Sheets

Related U.S. Application Data

(60) Provisional application No. 63/027,217, filed on May 19, 2020, provisional application No. 63/013,021, filed on Apr. 21, 2020, provisional application No. 62/850,788, filed on May 21, 2019.

(51) Int. Cl.
  *H04L 47/19* (2022.01)
  *H04N 19/70* (2014.01)
  *G08B 13/196* (2006.01)

(56) References Cited

U.S. PATENT DOCUMENTS

| | | | |
|---|---|---|---|
| 8,792,353 B1* | 7/2014 | Janarthanan | H04L 49/355 370/359 |
| 10,298,387 B1 | 5/2019 | Good | |
| 2002/0101872 A1 | 8/2002 | Boivie | |
| 2004/0199670 A1 | 10/2004 | Garfinkel | |
| 2006/0104268 A1* | 5/2006 | Lee | H04L 45/60 370/389 |
| 2007/0076855 A1 | 4/2007 | MeLampy et al. | |
| 2008/0056302 A1 | 3/2008 | Erdal et al. | |
| 2008/0080619 A1 | 4/2008 | Zhou et al. | |
| 2010/0262628 A1 | 10/2010 | Singer | |
| 2013/0173819 A1 | 7/2013 | Lee et al. | |
| 2013/0279572 A1 | 10/2013 | Li et al. | |
| 2015/0281125 A1 | 10/2015 | Koponen et al. | |
| 2016/0100196 A1 | 4/2016 | Wu et al. | |
| 2017/0063690 A1 | 3/2017 | Bosshart | |
| 2018/0007398 A1 | 1/2018 | Bleidt et al. | |
| 2018/0227229 A1 | 8/2018 | Lopez | |
| 2018/0295400 A1 | 10/2018 | Thomas et al. | |
| 2019/0089673 A1 | 3/2019 | Berhorst | |
| 2019/0109820 A1* | 4/2019 | Clark | H04L 9/0861 |
| 2019/0116111 A1* | 4/2019 | Izard | H04L 45/745 |
| 2020/0374333 A1 | 11/2020 | Racz et al. | |

OTHER PUBLICATIONS

Wireshark Forum—"how to replay the video from packets captured by wireshark", https://osqa-ask.wireshark.org/luestions/43920/how-to-replay-the-video-from-packets-captured-by-wireshark, 1 page, [retrieved May 21, 2020].

Vasvox, "VoIP Recording", http://web.archive.org/web/2016*/http://www.vasvox.com/voip-recording/, 2 pages, [cached Jun. 24, 2016 retrieved May 21, 2020].

Yang, Y.-K. et al., "RTP Payload Format for H.264 Video" https://toolsietiorg/html/rfc6184#page-75, 101 pages, [retrieved May 21, 2020].

Written Opinion in connection with PCT application No. PCT/CA2020/050682 dated Jul. 17, 2020—16 pages.

Notice of Allowance issued by the USPTO in connection with U.S. Appl. No. 16/880,832 dated Jun. 16, 2021, 16 pages.

* cited by examiner

| Flow | | | | Payload Structure | Codec | Timestamp |
|---|---|---|---|---|---|---|
| Source IP 156 | Source Port 158 | Destination IP 160 | Destination Port 162 | | | |
| ... | ... | ... | ... | ... | ... | ... |

| Structure | Constraint | Representative portions to preserve |
|---|---|---|
| Structure A | Memory space reduction | XYZ |
| Structure B | Increased Network Delay | ABC |
| Structure C | Bandwidth reduction | DEF |
| Payload structure D | Increased temperature | IJK |
| Payload structure E | Memory space reduction | QRS |
| H.263 | Bandwidth reduction | Every Xth video image |
| H.264 | Bandwidth reduction | i-frames |
| Etc. | Etc. | Etc. |

METHODS AND SYSTEMS FOR CODEC DETECTION IN VIDEO STREAMS

CROSS-REFERENCE TO RELATED APPLICATIONS

This application is a continuation of U.S. patent application Ser. No. 16/880,832 filed on May 21, 2020, which is hereby incorporated by reference herein. U.S. patent application Ser. No. 16/880,832 filed on May 21, 2020 claims the benefit of (i) U.S. Provisional Patent Application Ser. No. 62/850,788 filed on May 21, 2019; (ii) U.S. Provisional Patent Application Ser. No. 63/013,021 filed on Apr. 21, 2020; and (iii) U.S. Provisional Patent Application Ser. No. 63/027,217 filed on May 19, 2020, all of which are hereby incorporated by reference herein.

FIELD

This disclosure relates generally to the field of digital video and, more particularly, to methods and systems for codec detection in video streams.

BACKGROUND

Building security systems typically include a closed-circuit network between a set of cameras connected to a switch, and a video management system (or server) connected to the switch. The cameras can use any of a variety of encoders to encode the video images into a particular format (e.g., H263, MPEG4, H.264) for transmission to the switch in the form of packets.

Should the need to monitor or intercept these packets arise, e.g., for law enforcement purposes, personnel entering the building in a clandestine fashion may gain access to the communication link between the switch and the VMS. However, there is little or no a priori knowledge of the encoders used to encode the various video streams traveling on the communication link. As a result, one may resort to brute force methods, whereby multiple encoders of different types are run in parallel and the one that produces the most coherent output is selected. However, this becomes a computationally intensive approach and is unwieldy, requiring large or heavy equipment to be brought into the building.

The complexity of the problem is exacerbated as the number of cameras grows, since this results in an increase in the bit rate of the communication link between the switch and the VMS. As a result, law enforcement and other interested third parties would welcome an approach that allows more rapid and computationally efficient detection of video streams.

SUMMARY

According to a first broad aspect, there is provided a computer-implemented method, comprising:
  receiving packets, each of the packets comprising a header and a payload;
  for each particular packet among the packets:
    processing at least the header of the particular packet to determine a flow associated with the particular packet;
    processing at least part of the payload of the particular packet to determine a candidate payload structure of the particular packet and processing at least part of the payload of the particular packet in accordance with the candidate payload structure, which includes processing at least part of the payload of the particular packet in accordance with one or more codec-specific tests; and
    in case a given test of the one or more codec-specific tests is passed, creating an association between the flow associated with the particular packet and the candidate payload structure.

According to another broad aspect, there is provided a computing device comprising:
  a computer-readable program storage unit comprising an application program and an operating system code; and
  a processor being configured to read and execute the application program so as to carry out a method that comprises:
    receiving packets, each of the packets comprising a header and a payload; and
    for each particular packet among the packets:
      processing at least the header of the particular packet to determine a flow associated with the particular packet;
      processing at least part of the payload of the particular packet to determine a candidate payload structure of the particular packet and to process at least part of the payload of the particular packet in accordance with the candidate payload structure, which includes processing at least part of the payload of the particular packet in accordance with one or more codec-specific tests;
      creating an association between the flow associated with the particular packet and the candidate payload structure if a given test of the one or more codec-specific tests is passed.

According to another broad aspect, there is provided a computer-readable medium storing computer-readable instructions which, when executed by a processor, cause the processor to carry out a method that comprises:
  receiving packets, each of the packets comprising a header and a payload; and
  for each particular packet among the packets:
    processing at least the header of the particular packet to determine a flow associated with the particular packet;
    processing at least part of the payload of the particular packet to determine a candidate payload structure of the particular packet and processing at least part of the payload of the particular packet in accordance with the candidate payload structure, which includes processing at least part of the payload of the particular packet in accordance with one or more codec-specific tests; and
    in case a given test of the one or more codec-specific tests is passed, creating an association between the flow associated with the particular packet and the candidate payload structure.

According to another broad aspect, there is provided a computer-implemented method, comprising:
  receiving a packet, the packet comprising a header and a payload;
  processing a portion of the packet to identify a flow associated with the packet; and
  determining whether the payload contains pre-determined codec-identifying information regarding a particular codec that is sufficient to identify the particular codec as having been used to encode video data in the payload and, if so, returning the particular codec as an identified codec for the flow.

According to another broad aspect, there is provided a computing device comprising:
- a computer-readable program storage unit comprising an application program and an operating system code; and
- a processor being configured to read and execute the application program so as to carry out a method that comprises:
  - receiving a packet, the packet comprising a header and a payload;
  - processing a portion of the packet to identify a flow associated with the packet; and
  - determining whether the payload contains pre-determined codec-identifying information regarding a particular codec that is sufficient to identify the particular codec as having been used to encode video data in the payload and, if so, to return the particular codec as an identified codec for the flow.

According to another broad aspect, there is provided a computer-readable medium storing computer-readable instructions which, when executed by a processor, cause the processor to carry out a method that comprises:
- receiving a packet, the packet comprising a header and a payload;
- processing a portion of the packet to identify a flow associated with the packet; and
- determining whether the payload contains pre-determined codec-identifying information regarding a particular codec that is sufficient to identify the particular codec as having been used to encode video data in the payload and, if so, returning the particular codec as an identified codec for the flow.

According to another broad aspect, there is provided a computer-implemented method, comprising:
- receiving a packet, the packet comprising a header and a payload;
- processing a portion of the packet to identify a flow associated with the packet; and
- determining whether the payload contains partial codec-identifying information regarding a particular codec and, if so:
  - adding the partial codec-identifying information to previously determined partial codec-identifying information regarding the particular codec to obtain cumulative codec-identifying information regarding the particular codec; and
  - returning the particular codec as an identified codec for the flow in case the cumulative codec-identifying information regarding the particular codec is sufficient to identify the particular codec as having been used to encode video data in the payload.

According to another broad aspect, there is provided a computing device comprising:
- a computer-readable program storage unit comprising an application program and an operating system code; and
- a processor being configured to read and execute the application program so as to carry out a method that comprises:
  - receiving a packet, the packet comprising a header and a payload;
  - processing a portion of the packet to identify a flow associated with the packet; and
  - determining whether the payload contains partial codec-identifying information regarding a particular codec and, if so:
    - adding the partial codec-identifying information to previously determined partial codec-identifying information regarding the particular codec to obtain cumulative codec-identifying information regarding the particular codec; and
    - returning the particular codec as an identified codec for the flow in case the cumulative codec-identifying information regarding the particular codec is sufficient to identify the particular codec as having been used to encode video data in the payload.

According to another broad aspect, there is provided a computing device comprising a computer-readable medium storing computer-readable instructions which, when executed by a processor, cause the processor to carry out a method that comprises:
- receiving a packet, the packet comprising a header and a payload;
- processing a portion of the packet to identify a flow associated with the packet; and
- determining whether the payload contains partial codec-identifying information regarding a particular codec and, if so:
  - adding the partial codec-identifying information to previously determined partial codec-identifying information regarding the particular codec to obtain cumulative codec-identifying information regarding the particular codec; and
  - returning the particular codec as an identified codec for the flow in case the cumulative codec-identifying information regarding the particular codec is sufficient to identify the particular codec as having been used to encode video data in the payload.

According to another broad aspect, there is provided a computer-implemented method, comprising:
- receiving packets, each of the packets comprising a header and a payload;
- for a particular packet among the packets:
  - processing at least the header of the particular packet to determine a flow associated with the particular packet;
  - attempting to determine a payload structure based on the flow, the payload structure associated with transport of coded video data in the payload of the particular packet;
  - if the attempting is successful, repackaging coded video data contained in the payload of the particular packet into a new packet and forwarding the new packet to an external system or storing the new packet in memory.

According to another broad aspect, there is provided a computing device comprising:
- a computer-readable program storage unit comprising an application program and an operating system code; and
- a processor being configured to read and execute the application program so as to carry out a method that comprises:
  - receiving packets, each of the packets comprising a header and a payload;
  - for a particular packet among the packets:
    - processing at least the header of the particular packet to determine a flow associated with the particular packet;
    - attempting to determine a payload structure based on the flow, the payload structure associated with transport of coded video data in the payload of the particular packet;
    - if the attempting is successful, repackaging coded video data contained in the payload of the particular packet into a new packet and forwarding the new packet to an external system or storing the new packet in memory.

According to another broad aspect, there is provided a computer-readable medium storing computer-readable instructions which, when executed by a processor, cause the processor to carry out a method that comprises:

receiving packets, each of the packets comprising a header and a payload;

for a particular packet among the packets:

processing at least the header of the particular packet to determine a flow associated with the particular packet;

attempting to determine a payload structure based on the flow, the payload structure associated with transport of coded video data in the payload of the particular packet;

if the attempting is successful, repackaging coded video data contained in the payload of the particular packet into a new packet and forwarding the new packet to an external system or storing the new packet in memory.

According to another broad aspect, there is provided a system comprising:

a tap for capturing packets sent from a source device to a destination device on a data network;

a surveillance module operatively coupled to the tap, the surveillance module having an input port, and output port and a processing entity configured for receiving the captured packets from the tap via the input port, each of the packets comprising a header and a payload and, for a particular packet among the packets:

(i) processing at least the header of the particular packet to determine a flow associated with the particular packet;

(ii) attempting to determine a payload structure based on the flow, the payload structure associated with transport of coded video data in the payload of the particular packet;

(iii) if the attempting is successful, repackaging coded video data contained in the payload of the particular packet into a new packet and forwarding the new packet to an external system via the output port or storing the new packet in memory.

According to another broad aspect, there is provided a computer-implemented method, comprising:

intercepting packets sent from a source device and destined for a destination device, each of the packets comprising a header and a payload;

for a particular packet among the packets:

processing at least the header of the particular packet to determine a flow associated with the particular packet;

attempting to determine a payload structure and a codec based on the flow;

if the attempting is successful, replacing at least part of the payload of the particular packet with replacement coded video data that has been encoded with the codec, the packet with the replacement coded video data being then released towards the destination device instead of the particular packet.

According to another broad aspect, there is provided a computing device comprising:

a computer-readable program storage unit comprising an application program and an operating system code; and a processor being configured to read and execute the application program so as to carry out a method that comprises:

intercepting packets sent from a source device and destined for a destination device, each of the packets comprising a header and a payload;

for a particular packet among the packets:

processing at least the header of the particular packet to determine a flow associated with the particular packet;

attempting to determine a payload structure and a codec based on the flow;

if the attempting is successful, replacing at least part of the payload of the particular packet with replacement coded video data that has been encoded with the codec, the packet with the replacement coded video data being then released towards the destination device instead of the particular packet.

According to another broad aspect, there is provided a computer-readable medium storing computer-readable instructions which, when executed by a processor, cause the processor to carry out a method that comprises:

intercepting packets sent from a source device and destined for a destination device, each of the packets comprising a header and a payload;

for a particular packet among the packets:

processing at least the header of the particular packet to determine a flow associated with the particular packet;

attempting to determine a payload structure and a codec based on the flow;

if the attempting is successful, replacing at least part of the payload of the particular packet with replacement coded video data that has been encoded with the codec, the packet with the replacement coded video data being then released towards the destination device instead of the particular packet.

According to another broad aspect, there is provided a processor-implemented method, comprising:

receiving a plurality of packets, each belonging to one of a plurality of flows, each packet comprising a header and a payload;

responsive to receipt of each of the packets:

searching in a memory for a record associated with the flow to which the packet belongs;

in case the searching finds no record in the memory, allocating a portion of the memory to a record associated with the flow to which the packet belongs;

attempting codec identification by processing at least part of the payload of the packet;

in case the attempting successfully identifies a particular codec, storing information regarding the particular codec in the record associated with the flow to which the packet belongs;

in case the attempting is unsuccessful and a certain condition has been reached since the portion of the memory has been allocated, freeing up the portion of the memory.

According to another broad aspect, there is provided a computer-readable medium storing computer-readable instructions which, when executed by a processor, cause the processor to carry out a method that comprises:

receiving a plurality of packets, each belonging to one of a plurality of flows, each packet comprising a header and a payload;

responsive to receipt of each of the packets:
- searching in a memory for a record associated with the flow to which the packet belongs;
- in case the searching finds no record in the memory, allocating a portion of the memory to a record associated with the flow to which the packet belongs;
- attempting codec identification by processing at least part of the payload of the packet;
- in case the attempting successfully identifies a particular codec, storing information regarding the particular codec in the record associated with the flow to which the packet belongs;
- in case the attempting is unsuccessful and a certain condition has been reached since the portion of the memory has been allocated, freeing up the portion of the memory.

According to another broad aspect, there is provided a processor-implemented method, comprising:
- receiving a data stream containing video data for a given flow;
- receiving a control stream that contains codec-identifying information associated with the given flow; and
- creating an output stream including packets containing the video data from the data stream and additional packets containing the codec-identifying information.

According to another broad aspect, there is provided a computer-readable medium storing computer-readable instructions which, when executed by a processor, cause the processor to carry out a method that comprises:
- receiving a data stream containing video data for a given flow;
- receiving a control stream that contains codec-identifying information associated with the given flow; and
- creating an output stream including packets containing the video data from the data stream and additional packets containing the codec-identifying information.

According to another broad aspect, there is provided a method carried out by a device for connection to a network that supports communication of packets between at least one first entity and at least one second entity, the method comprising:
- receiving the packets;
- identifying, based on information contained in at least a payload of respective ones of the received packets, those of the received packets that are packets of interest;
- grouping the payloads of the packets of interest into streams of packets, the payloads of those of the received packets that are not packets of interest not being so grouped; and
- transmitting the streams of packets to a third destination for processing, the third destination being different from the first and second entities.

According to another broad aspect, there is provided a method that comprises:
- identifying, in a plurality of received packets conveying frames, certain ones of the frames that are related to one another;
- identifying, in the related frames, portions of the related frames that are in accordance with at least one structure of interest;
- assembling said portions of the related frames into at least one stream of new packets; and
- storing the at least one stream of new packets in memory or sending the at least one stream of new packets to an external entity.

According to another broad aspect, there is provided a non-transitory computer-readable storage medium storing computer-readable instructions which, when read and executed by a processor of a computing entity, cause the computing entity to carry out a method that comprises:
- identifying, in a plurality of received packets conveying frames, certain ones of the frames that are related to one another;
- identifying, in the related frames, portions of the related frames that are in accordance with at least one structure of interest;
- assembling said portions of the related frames into at least one stream of new packets; and
- storing the at least one stream of new packets in memory or sending the at least one stream of new packets to an external entity.

BRIEF DESCRIPTION OF THE DRAWINGS

A detailed description of embodiments is provided below, by way of example only, with reference to drawings accompanying this description, in which:

FIG. 9A is a block diagram of example memory container.

FIG. 26 is a table showing constraints that lead to throttling of the amount of collected data that is recorded in memory or data sent to an external entity.

It is to be expressly understood that the description and drawings are only for purposes of illustrating certain embodiments and are an aid for understanding. They are not intended to be and should not be limiting.

DETAILED DESCRIPTION

Figure 1A:
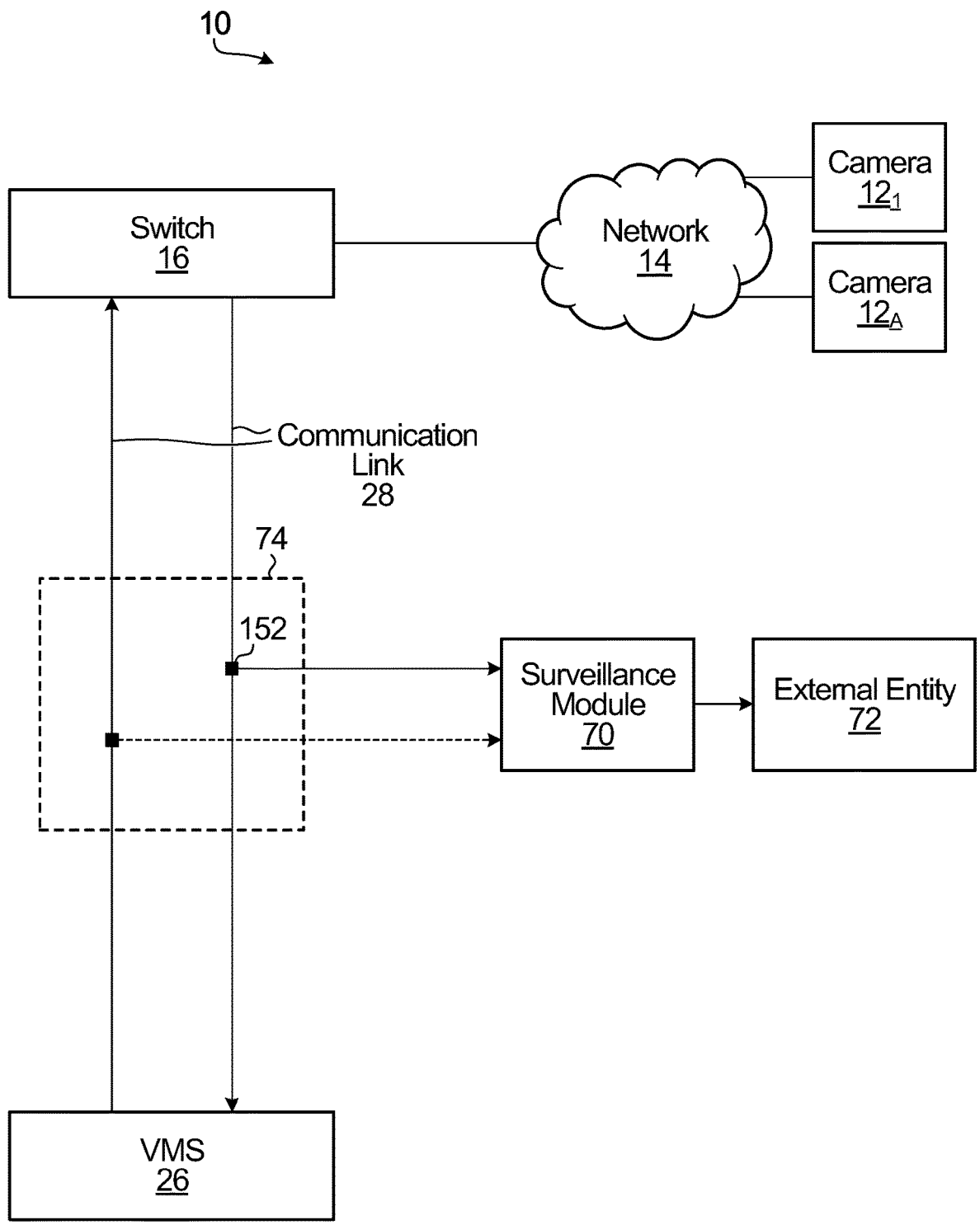
FIGS. 1A, 1B and 1C are block diagrams showing examples of a video network architecture.
Figure 1B:
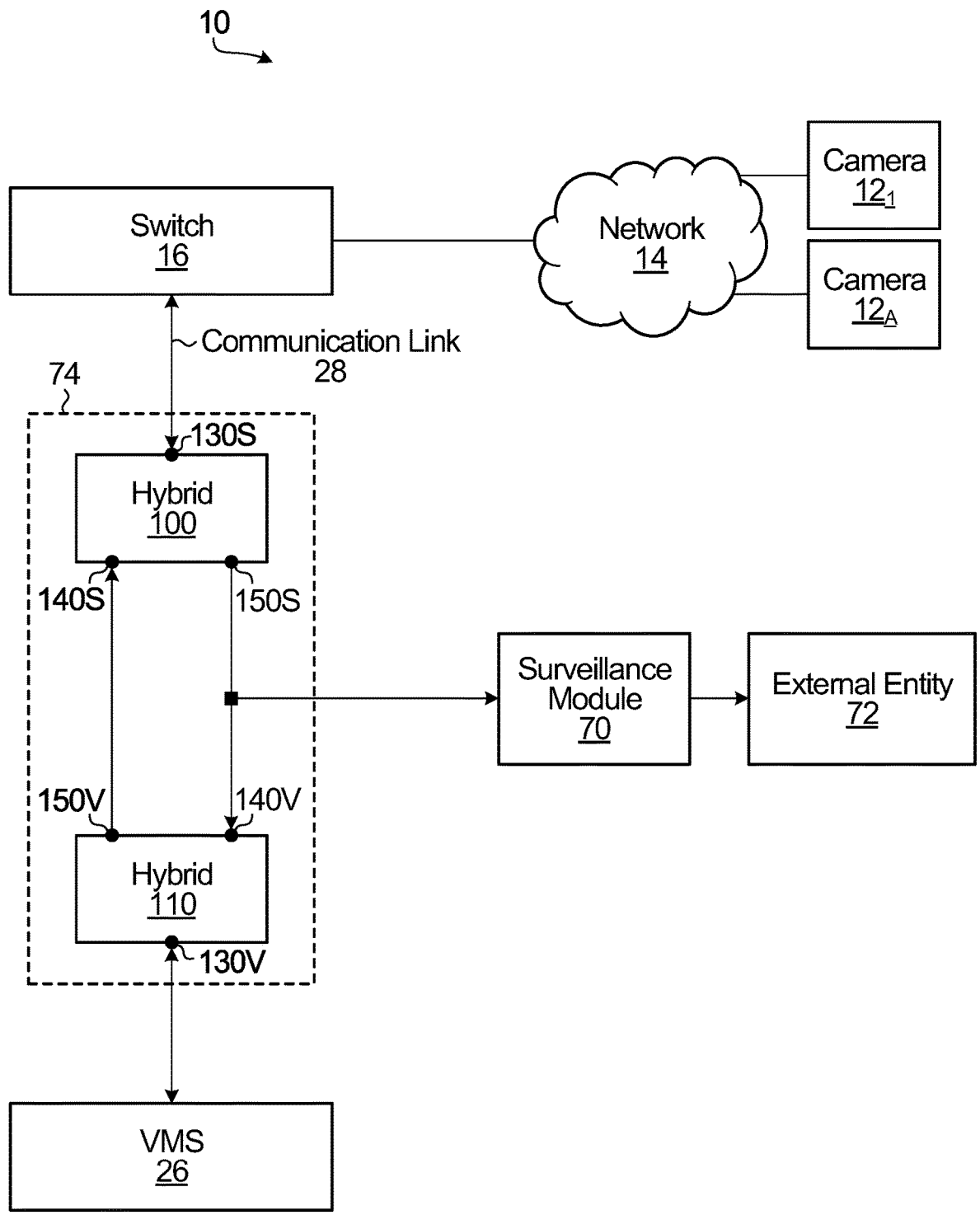

FIGS. 1A and 1B show a video network architecture 10 in which one or more cameras $12_1 \ldots 12_A$ are connected by a network 14 to a switch 16. The network 14 may be a closed-circuit private video network, such as may be provided in a building (e.g., condominium tower, office tower, warehouse, airport terminal, school, etc.). The cameras $12_1 \ldots 12_A$ capture images, which are encoded into blocks of coded video data 22 in accordance with a particular codec format such as H263, MPEG4, H.264, H.264 bitstream mode, H.265, AAC, PCM and MJPEG, to name a few non-limiting possibilities. In a non-limiting embodiment, the cameras $12_1 \ldots 12_A$ may be Internet Protocol (IP) cameras, which produce IP packets that carry the blocks of coded video data 22. Blocks of coded video data 22 representing sequential images originating from the same camera may be referred to as a video stream. The rate at which a camera produces new images may vary, from e.g., 1 frame every few seconds to e.g., 24 frames per second or more. This, together with the quality of the image and the codec used, has an impact on the bit rate of each video stream.

The switch 16 is connected to a video management system (VMS) 26 by a communication link 28. The communication link 28 may thus carry numerous video streams from the cameras $12_1 \ldots 12_A$, and such video streams may be interleaved or multiplexed in various ways on the communication link 28. The communication link 28 may be an Ethernet link, such as 100 MB Ethernet (e.g., Category 5), 10 GB Ethernet (e.g., Category 7), etc. In such an embodiment, the switch exchanges Ethernet frames with the VMS 26. Some of the Ethernet frames traveling in the direction from the switch 16 to the VMS 26 encapsulate packets which contain coded video data 22 representing images captured by the cameras, whereas other such Ethernet frames may include control information (e.g., status information relating to the cameras or the switch). In the opposite direction, some of the Ethernet frames traveling from the VMS 26 to the switch 16 may encapsulate packets which contain control information (e.g., information for controlling the cameras or the switch). If the switch 16 and the VMS 26 are members of and connected to a local area network (now shown), additional devices may be connected to this local area network, which could mean that additional packets travel between the switch 16 and the VMS 26 in one direction or the other. Such additional packets may include additional data that might not be coded video data 22 from any of the cameras $12_1 \ldots 12_A$.

Figure 3:
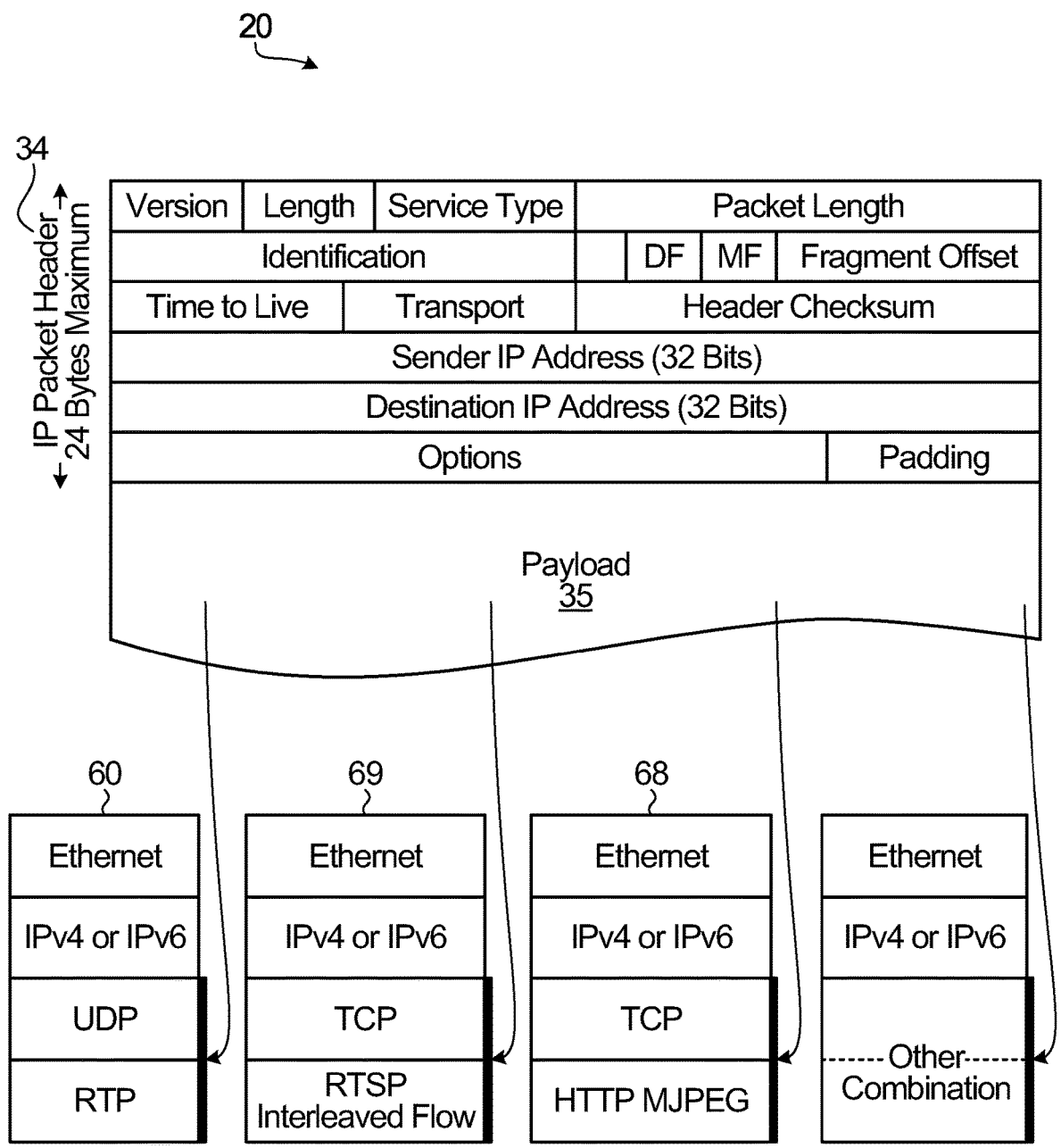
FIG. 3 shows an IP packet comprising a header and a payload.

The packets encapsulated in the Ethernet frames traveling on the communication link 28 may be Internet Protocol (IP) packets 20 (e.g., IPv4 or IPv6 packets). With reference to FIG. 3, an IP packet 20 is shown to comprise a header 34 and a payload 36. The header 34 specifies, inter alia, a source IP address and a destination IP address. The header 34 may also include a medium access control (MAC) address.

A (software) application at the cameras $12_1 \ldots 12_A$ (or at the switch 16) determines what information goes into the headers of the IP packets so as to allow proper delivery of the packet to a destination across a network 14. Also, the (software) application at the cameras $12_1 \ldots 12_A$ (or at the switch 16) determines the communications protocols to be used for transmission of the coded video data 22 within the payloads 36 of the IP packets 20. Such communications protocols may include a lower-layer communications protocol and a higher-layer communications protocol.

The lower-layer communications protocol may be connectionless or may be connection-oriented. One non-limiting example of a connectionless lower-layer communications protocol is the User Datagram Protocol (UDP). One non-limiting example of a connection-oriented lower-layer communications protocol is the Transmission Control Protocol (TCP). As such, the payload 36 of an IP packet 20 may include one or more UDP packets or TCP packets.

Each UDP or TCP packet has its own packet format, including a header and a payload, as will now be described.

Figure 4A:
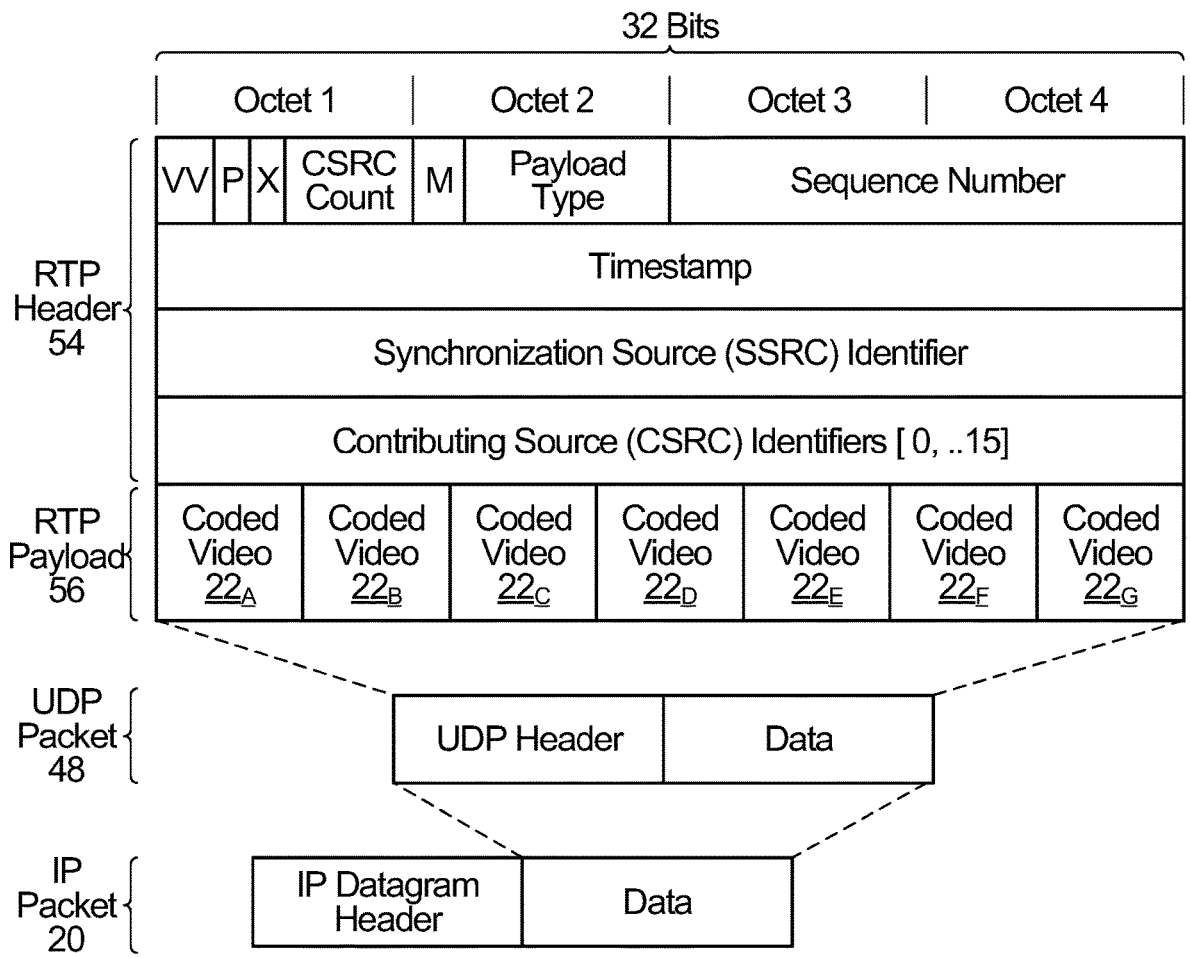
FIG. 4A shows an example of a UDP packet carrying coded video data.

In the case of a UDP packet 48, and with reference to FIG. 4A, the header includes control information relating to the UDP packet 48, such as a source port and a destination port. For its part, the payload of a UDP packet 48 includes data, which may be of various types.

In one example, the data carried by the payload of the UDP packet 48 is video information. In that case, the payload of a UDP packet 48 may include blocks of coded video data 22 that are formatted in accordance with a higher-layer communications protocol. An example of such a higher-layer communications protocol is RTP. Thus, for example, the payload of a UDP packet 48 may include an RTP packet with an RTP header 54 and an RTP payload 56. The RTP header 54 incudes control information relating to the RTP packet, whereas the RTP payload 56 includes blocks of coded video data 22.

Therefore, in summary, coded video data 22 pertaining to a particular video stream occupies the RTP payload of an RTP packet 48 which, together with the RTP header, is encapsulated within the payload of a UDP packet 48 which, together with its own header, is encapsulated within the payload 36 of an IP packet 20. This can be referred to as an RTP-over-UDP (or RTP/UDP) payload structure 60.

Figure 4B:
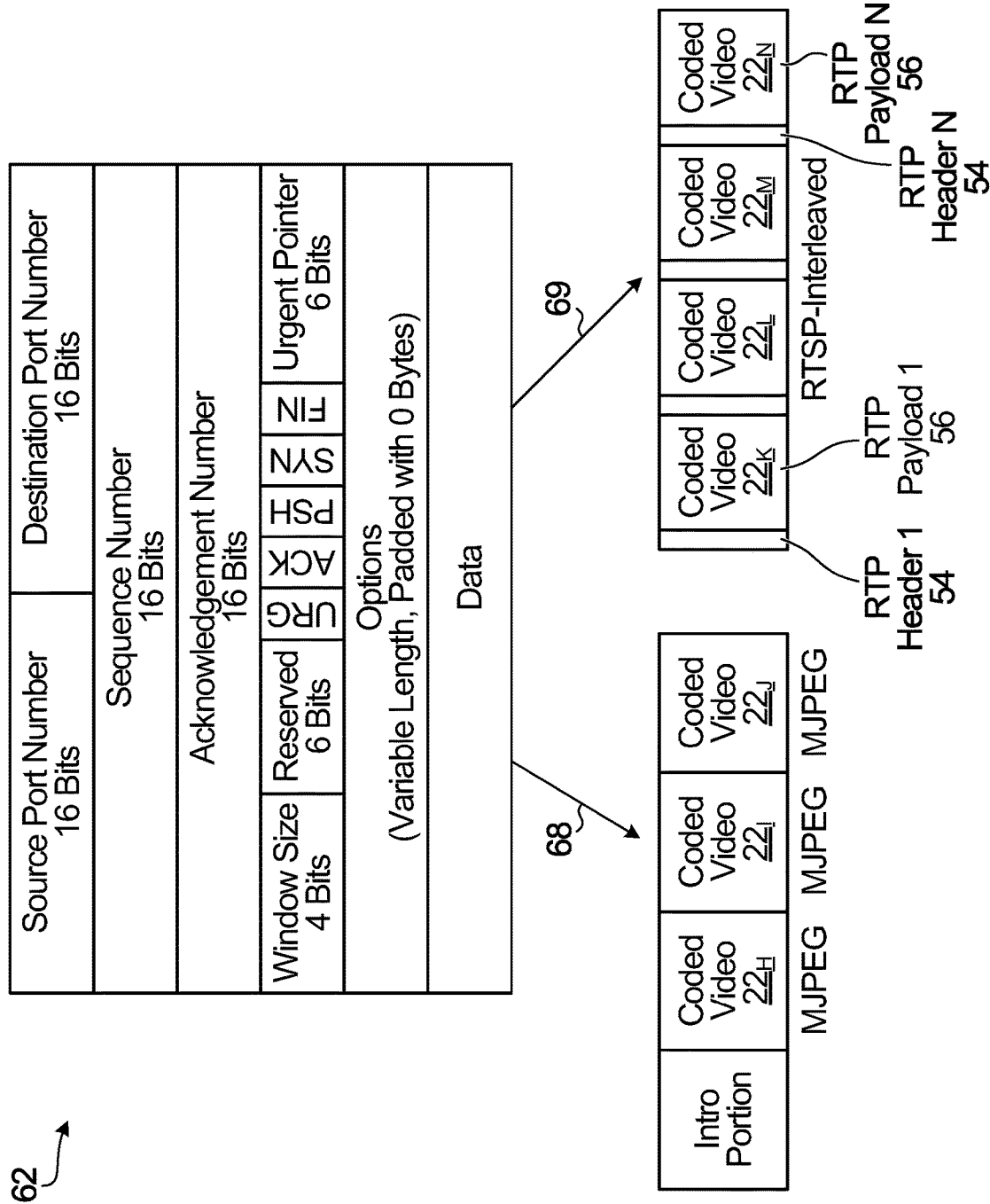
FIG. 4B shows an example of a TCP packet carrying coded video data.

Turning now to the case of a TCP packet 62, and with reference to FIG. 4B, the header includes control information relating to the TCP packet 62, such as a source port 64 and a destination port 66. For its part, the payload of a TCP packet 62 includes data, which may be of various types.

In one example, the data carried by the payload of the TCP packet 62 is video information. In that case, the payload of a TCP packet 62 may include coded video data 22 that is formatted in accordance with a higher-layer communications protocol. Examples of such a higher-layer communications protocol include Hypertext Transport Protocol (HTTP) and RTSP-Interleaved (RTSP-I).

Thus, for example, in the case of HTTP, the payload of the TCP packet 62 may include an introductory portion (e.g., —*\r\nContent-Type: image/jpeg\r\nContent-Length:*\r\n\r\n) followed by blocks of coded video data 22 in JPEG format. This is referred to as an "HTTP MJPEG multipart" payload structure 68.

In the case of RTSP-I, the payload of the TCP 62 packet may include a sequence of RTP headers 54 and corresponding RTP payloads 56. The RTP headers 54 are associated with respective video streams and include control information relating to the corresponding RTP payloads 56, and the RTP payload 56 includes blocks of coded video data 22 for the respective video streams. Therefore, coded video data 22 pertaining to multiple video streams occupies the payloads of multiple RTP packets which, together with their corresponding headers, are encapsulated within the payload of a TCP packet 62 which, together with its own header, is encapsulated within the payload 36 of an IP packet 20. This is referred to as an RTSP-I-over-TCP (or RTSP-I/TCP) payload structure 69.

In another example, the data carried by the payload of the TCP packet 62 is control information. The control information may be used for various purposes, such as, for example, to set up or control the transmission of video information. For instance, the payload of the TCP packet may include control information, which itself may be arranged to follow a particular control protocol. An example of such a control protocol is the "Real Time Streaming Protocol" (RTSP)—see RFC 2326 or 7826, hereby incorporated by reference herein. Control information sent in accordance with RTSP may include commands such as DESCRIBE, SETUP, TERADOWN, PLAY and PAUSE, for example.

It is noted that the IP packets 20 produced by different ones of the cameras $12_1 \ldots 12_4$ may have different payload structures, depending on the manufacturer, model or camera setting. As such, the IP packets 20 produced by some of the cameras $12_1 \ldots 12_4$ may have an RTP/UDP payload structure 60, whereas the IP packets 20 produced by other ones of the cameras $12_1 \ldots 12_4$ may have an RTSP-I/TCP payload structure 69, and the IP packets 20 produced by still other ones of the cameras $12_1 \ldots 12_4$ may have the HTTP MJPEG multipart payload structure 68. Still other payload structures may be used to carry coded video data 22 from the cameras to the VMS 26 via the switch 16.

For the purposes of this disclosure, each video stream generated by one of the cameras $12_1 \ldots 12_4$ may be characterized by a unique "flow". The flow may be defined by any suitable combination of identifiers. Such identifiers could be found exclusively in the IP header or they could be found partly in the IP header and partly in the IP payload, such as in the header of a TCP or UDP packet carried by the IP payload. For example, in the case of an IP packet carrying a TOP packet in the IP payload, the flow may be defined by identifiers in the IP header and the TOP header. In the case of an IP packet carrying a UDP packet in the IP payload, the flow may be defined by identifiers in the IP header and the UDP header. Thus, the flow associated with an IP packet 20 may be defined by header information that appears in both the IP header of the IP packet 20 and in the header of whichever sub-packet is encapsulated within the IP payload of the IP packet 20. In some embodiments, the flow can be a unique combination of header information chosen from source address, destination address, source port, destination port and MAC address (to name a few possible identifiers). In some cases, a flow uniquely identifies a single video stream from a single camera.

In accordance with the present disclosure, and with reference to FIGS. 1A, 1B, 2 and 10, a surveillance module 70 is provided. In general, there are two main embodiments of the surveillance module 70, one for listening (see FIGS. 1A, 1B and 2) and one for modification (see FIG. 10). Each of these main embodiments will be described in turn.

Case 1—Listening ("Passive")

In an embodiment, a passive tap 74 may be connected to the communication link 28. A passive tap 74 does not interrupt or inspect the passage of data along the communication link 28. FIGS. 1A and 1B show two non-limiting embodiments of a passive tap 74 Specifically, FIG. 1A shows the example of a tap 74 in the case where the communication link 28 between the switch 16 and the VMS 26 includes two unidirectional links and FIG. 1B shows the example of a tap 74 in the case where the communication link 28 between the switch 16 and the VMS 26 includes a bidirectional link.

In the case of unidirectional sub-links (namely, a switch-to-VMS sub-link and a VMS-to-switch sub-link), and with reference to FIG. 1A, the tap 74 comprises a connector 152 that is electrically coupled to the switch-to-VMS sub-link and an output port leading to the surveillance module 70. In order to electrically couple the connector 152 to the switch-to-VMS sub-link, non-contact techniques may be used (e.g., an opto-isolator). Alternatively, a portion of the insulation of the switch-to-VMS sub-link may be stripped, exposing a wire, and the connector 152 may be attached to the exposed wire. The connector 152 allows the transfer of video-data-containing packets from the cameras $12_1 \ldots 12_4$ to the surveillance module 70. Still other ways of mirroring the in-transit data signal may be used. Optionally, a second connector 152 may be provided that is electrically coupled to the VMS-to-switch sub-link and also leading directly to the surveillance module 70. This second connector 152 would allow the surveillance module 70 to receive and process packets sent by the VMS 26. Wireless interception techniques may also be used in some embodiments.

In the case of a bidirectional link, and with reference to FIG. 1B, the tap 74 comprises a switch-side hybrid 100 with an input/output port 130S, an input port 140S and an output port 150S, and a VMS-side hybrid 110 with an input/output port 130V, an input port 140V and an output port 150V. The VMS-side hybrid 110 separates signals on the input/output port 130V that are simultaneously traveling to and from the VMS 26. As such, signals coming from the VMS 26 and arriving at the input/output port 130V of the VMS-side hybrid 110 (e.g., via an RJ45 connector) are sent to the output port 150V of the VMS-side hybrid 110V, whereas the input/output port 130V of the VMS-side hybrid 110 also carries signals arriving at the VMS-side hybrid 110 via its input port 140V. Similarly, the switch-side hybrid 100 separates signals on the input/output port 130S of the switch-side hybrid 100 that are simultaneously traveling to and from the switch 16. As such, signals coming from the switch 16 and arriving at the input/output port 130S of the switch-side hybrid 100 (e.g., via an RJ45 connector) are sent to the output port 150S of the switch-side hybrid 100, whereas the input/output port 130S of the switch-side hybrid 100 also carries signals arriving at the switch-side hybrid 100 via the input port 140S of the switch-side hybrid 100.

In this embodiment, the (passive) tap 74 comprises a connector 152 coupled to the connection between the output port 150S of the switch-side hybrid 100 and the input port 140V of the VMS-side hybrid 110. The connector 152 may have an output port leading to the surveillance module 70. Optionally, a second connector 152 may be provided that is electrically coupled between the output port 150V of the VMS-side hybrid 110 and the input port 140S of the switch-side hybrid 100. This second connector 152 would allow the surveillance module 70 to receive and process packets sent by the VMS 26. Wireless interception techniques may be used, depending on operational requirements. In order to connect the tap 74, the communication link 28 may be disconnected or broken, and the two resultant ends are fed to the input/output ports 130S, 130V of the two hybrids. In some operational contexts, severing of the communication link 28 may be done surreptitiously, e.g., by law enforcement personnel unbeknownst to the owner or manager of the communication link 28 between the switch 16 and the VMS 26.

It is also within the scope of the present disclosure to use an active tap, i.e., one that interrupts and inspects the passage of data on the communication link 28. In fact, for some types of communication links (e.g., Gigabit Ethernet), an active tap may be a preferred way to access the data on the communication link 28, due to the use of differential voltages for transmitting the data, which may make passive tapping difficult. Embodiments for the active tap include Ethernet PHY tapping, port mirroring and use of a managed switch.

Figure 1C:
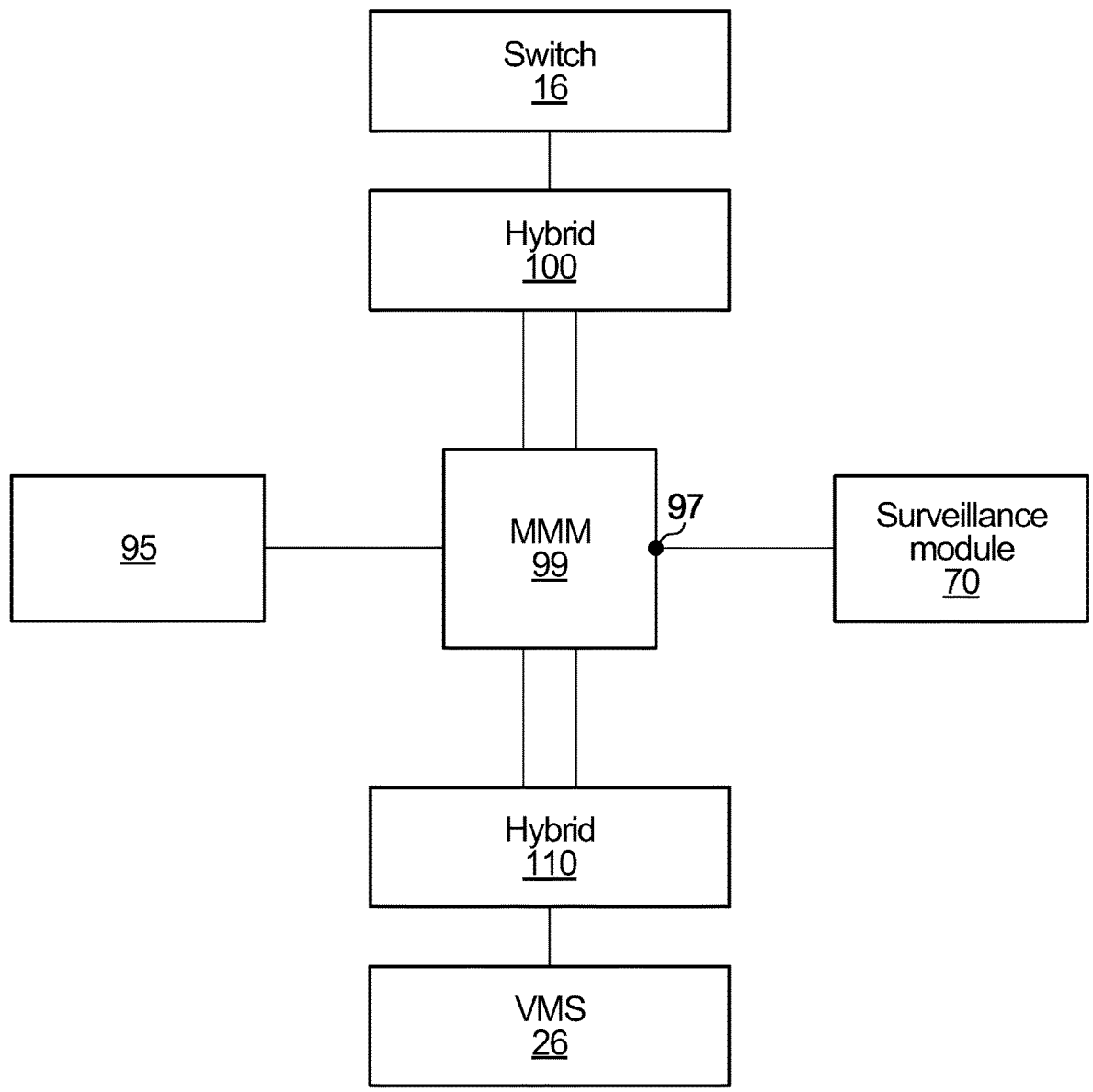

In the case of an active tap, and with reference to FIG. 1C, a man-in-the-middle module (MMM) 99 is configured to receive signals from the output port of the switch-side hybrid 100, extract Ethernet frames (that encapsulate IP packets), write the packets to an internal memory, read the packets from the internal memory 95 and send them towards both (i) the input port of the VMS-side hybrid 110 and (ii) an output port 97 leading to the surveillance module 70. The MMM 99 thus allows copies of the same video-data-containing packets from the cameras $12_1 \ldots 12_A$ to be fed to the VMS 26 and to the surveillance module 70.

In addition, the MMM 99 may be configured to similarly intercept and replicate Ethernet frames received from the VMS 26 and destined for the cameras $12_1 \ldots 12_A$. In such a case, the MMM 99 may allow the surveillance module 70 to receive and monitor packets (e.g., including control information) sent by the VMS 26.

Also, the MMM 99 may be configured to insert additional packets destined for the cameras $12_1 \ldots 12_A$. Such additional packets may carry control messages to the cameras $12_1 \ldots 12_A$ in order to cause the cameras $12_1 \ldots 12_A$ to take certain actions. For example, the control messages may include an RTSP DESCRIBE message which, upon receipt by a camera, may cause the camera to negotiate transmission of a video stream. This negotiation may contain crucial control information that may be detected and used by the surveillance module 70.

Figure 2:
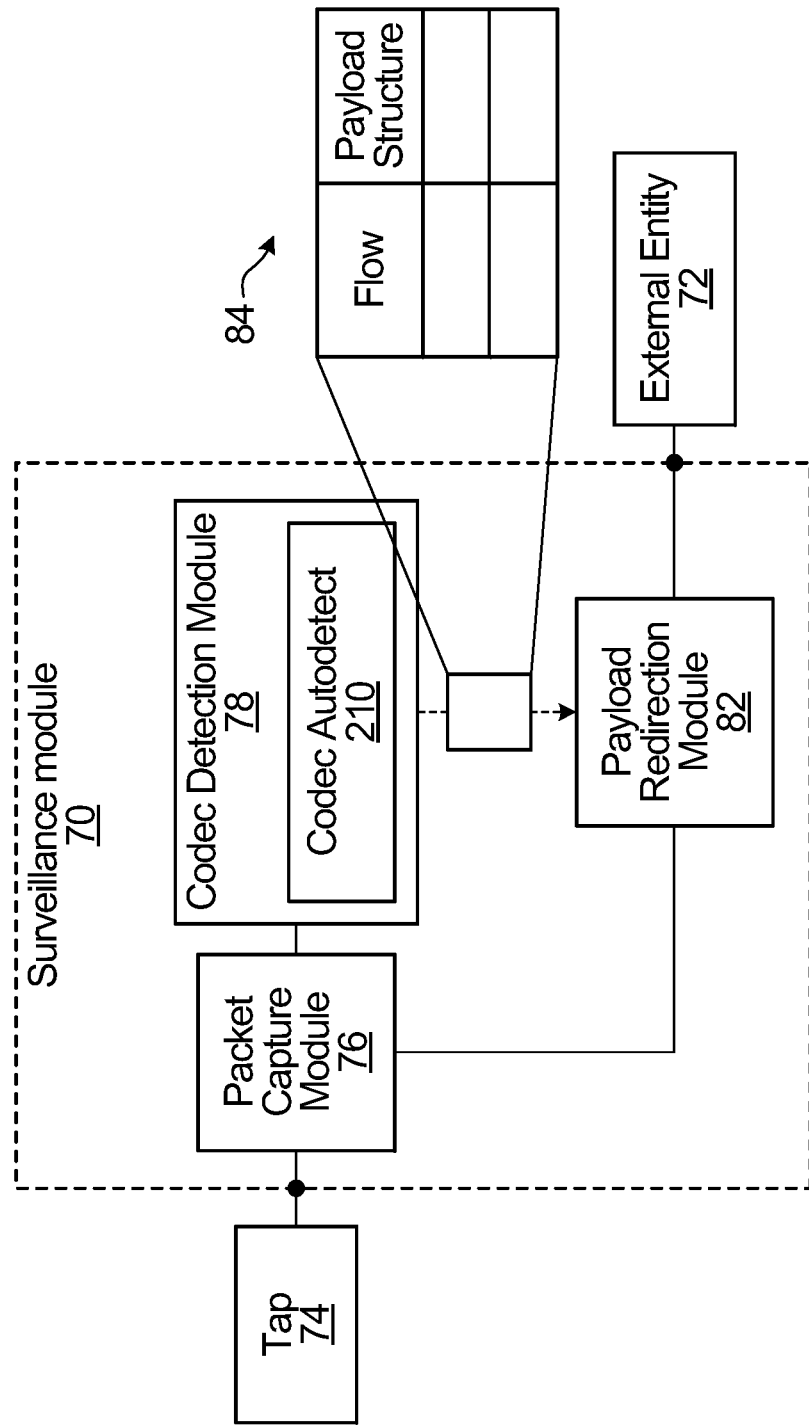
FIG. 2 is a block diagram of an example surveillance module.

Turning now to FIG. 2, the surveillance module 70 may be operatively coupled to an external system 72. In some embodiments, the external system 72 may be implemented as a console as shown in FIGS. 1A and 1B. In other embodiments, the external system 72 may be implemented as a display 192 while in still other embodiments, the external system 72 may be implemented as a data network 194 (such as the Internet) or a server with an address on such data network 194. Still other implementations of the external system 72 are possible. The external system 72 may be communicatively isolated from the private network between the cameras $12_1 \ldots 12_A$ and the switch 16, as well as from the communication link 28 between the switch 16 and the VMS 26.

Those skilled in the art will appreciate that the incoming packets (e.g., IP packets 20) at the surveillance module 70 may arrive at a high speed (packet bit rate), and in some cases may include coded video data 22 from one or more of the cameras $12_1 \ldots 12_A$, whereas in some cases the incoming packets may include data that is not coded video data 22 (e.g., control information related to the cameras $12_1 \ldots 12_A$ or data not related in any way to the cameras $12_1 \ldots 12_A$). The role of the surveillance module 70 is to identify, among the unpredictable morass of received IP packets 20, those containing coded video data 22 and to send the coded video data 22 onwards to the external system 72 for storage, decoding and/or analysis (or store them in a memory (not shown)). This is not a simple task, as the surveillance module 70 does not know a priori whether any given received packet is a video-data-containing packet. As such, the surveillance module 70 is configured to process received IP packets 20 on-the-fly with a view to identify those that contain coded video data 22, to group them on a per-flow basis and to send them to the external system 72 (or store them in a memory).

To this end, the surveillance module 70 is configured for receiving via an input port a signal supplied by the tap 74. The received signal is fed to a packet capture module 76. The packet capture module 76 is configured to detect packets (e.g., IP packets 20) in the received signal. The packets detected by the packet capture module 76 are fed/copied to both (i) a codec detection module 78 and (ii) a payload redirection module 82.

Figure 5:
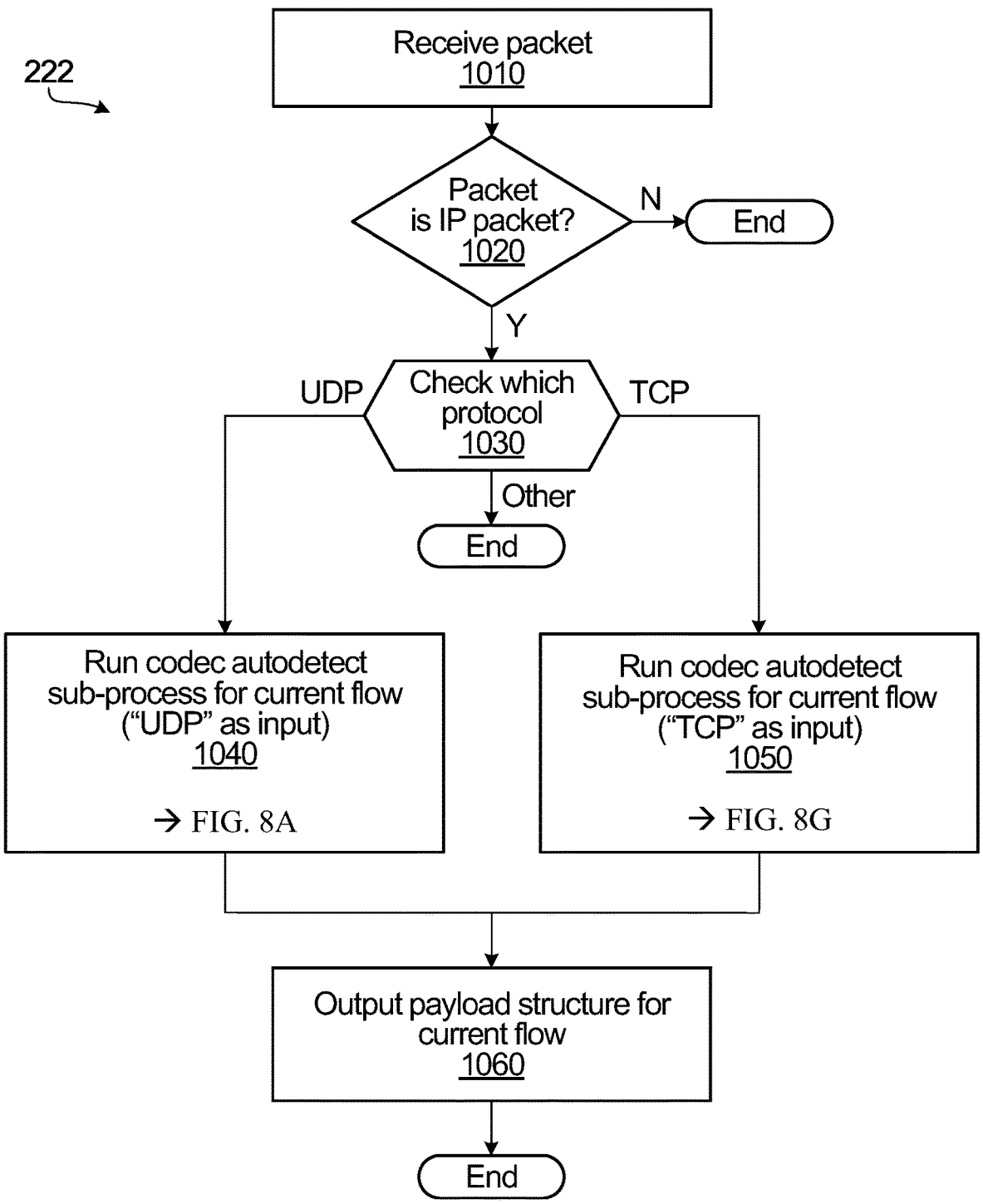
FIGS. 5 and 5A are flowcharts corresponding to two variants of an example codec detection process.

The codec detection module 78 carries out a codec detection process 222 which is now described generally with reference to the flowchart in FIG. 5. At step 1010, an IP packet is received from the packet capture module 76. A purpose of the codec detection process 222 may be to discriminate between two main possibilities: (1) the packet contains coded video data and (2) the packet does not contain coded video data. If the packet contains coded video data, then this means that the packet would have a certain payload structure, and therefore the outcome of the codec detection process 222 should be the flow of the packet as well as the corresponding payload structure (if correctly determined), which should then allow the payload redirection module 82 to properly deconstruct and redirect the packets it receives for that flow. On the other hand, if the packet does not contain coded video data (or contains coded video data that the codec detection module 78 is unable to detect), then the outcome of the codec detection process 222 would be either nothing or an indication of the flow of the packet together with an indication that there was no detectable coded video in the packet.

Accordingly, at step 1020, the codec detection process 222 includes determining whether the received packet is an IP packet. If not, the packet may be ignored or discarded. If yes, the next step is step 1030, whereby the codec detection process 222 includes attempting to check the lower-layer communication protocol used by the IP packet. If none can be identified, then the process may terminate. In case the communication lower-layer communication protocol is UDP, the codec detection process 222 proceeds to step 1040, whereby a codec autodetect sub-process 210 is carried out for the current flow with the input variable "UDP"; in case the lower-layer communication protocol is TCP, the codec detection process 222 proceeds to step 1050, whereby the codec autodetect sub-process 210 is carried out for the current flow with the input variable "TCP".

The codec autodetect sub-process 210 will be described in greater detail later on. For now, those skilled in the art should appreciate that the codec autodetect sub-process 210 may include some initial processing of the payload of the received packet to determine a candidate payload structure of the received packet. This is still only a candidate payload structure because it is based on some initial information in the payload of the received IP packet, which will need to be confirmed by individual codec testing. Accordingly, this is followed by some processing of the payload of the received packet in accordance with this candidate payload structure, which includes processing the payload of the received packet in accordance with one or more tests, each test associated with a specific codec. If a given test of the one or more tests is passed, this can be viewed as confirming the candidate payload structure, and an association is created between the current flow and at least the candidate payload structure. The output of the codec autodetect sub-process 210 (carried out at step 1040 or step 1050) is thus identity of the candidate payload structure as well as the codec for which the test was ultimately passed (if any). In the present embodiment, the codec detection process 222 then proceeds to step 1060, whereby it creates an association between the current flow and this candidate payload structure.

The association between the current flow and the candidate payload structure may be sent directly to the payload redirection module 82. Alternatively or in addition, a table 84 that stores this information may be populated by the codec detection module 78 and made accessible to the payload redirection module 82. Specifically, the table 84 may include records each containing a "flow" field that specifies the parameters of a given flow (e.g., any suitable combination of source address, destination address, source port, destination port, MAC address, etc.), as well as a "payload structure" field that specifies the payload structure (e.g., RTP/UDP, RTSP-I/TCP, HTTP MJPEG multipart) that was found to be associated with the given flow.

It should be appreciated that the payload structure identified for a given flow may be a best guess effort done by the codec detection module 78 based on various bit patterns and state buildup (as will be described later on); as such, the payload structure associated with a given flow and stored in the table 84 may not always be accurate.

The information in the table 84 provides the payload redirection module 82 with the information it needs to decide what to do with the packets it receives from the packet capture module 76, i.e., whether to ignore or repackage each packet. In particular, by determining the flow of a particular received packet and consulting the table 84 for that flow, the payload redirection module determines if the "payload structure" field associated with that flow is populated in order to find out the payload structure that is thought to be associated with the flow of the particular received packet.

Figure 6:
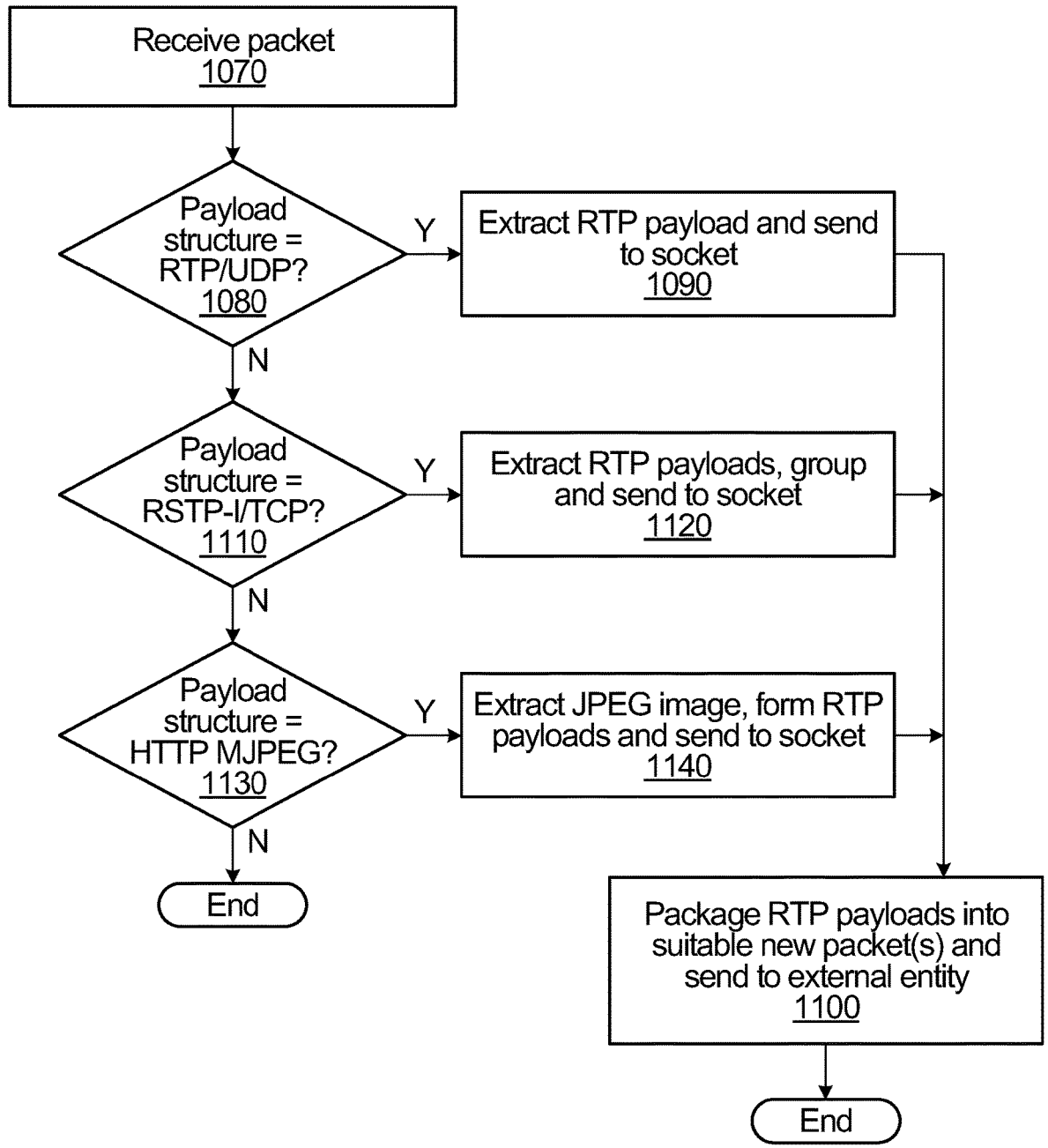
FIG. 6 is a flowchart corresponding to an example payload redirection process.
Figure 7:
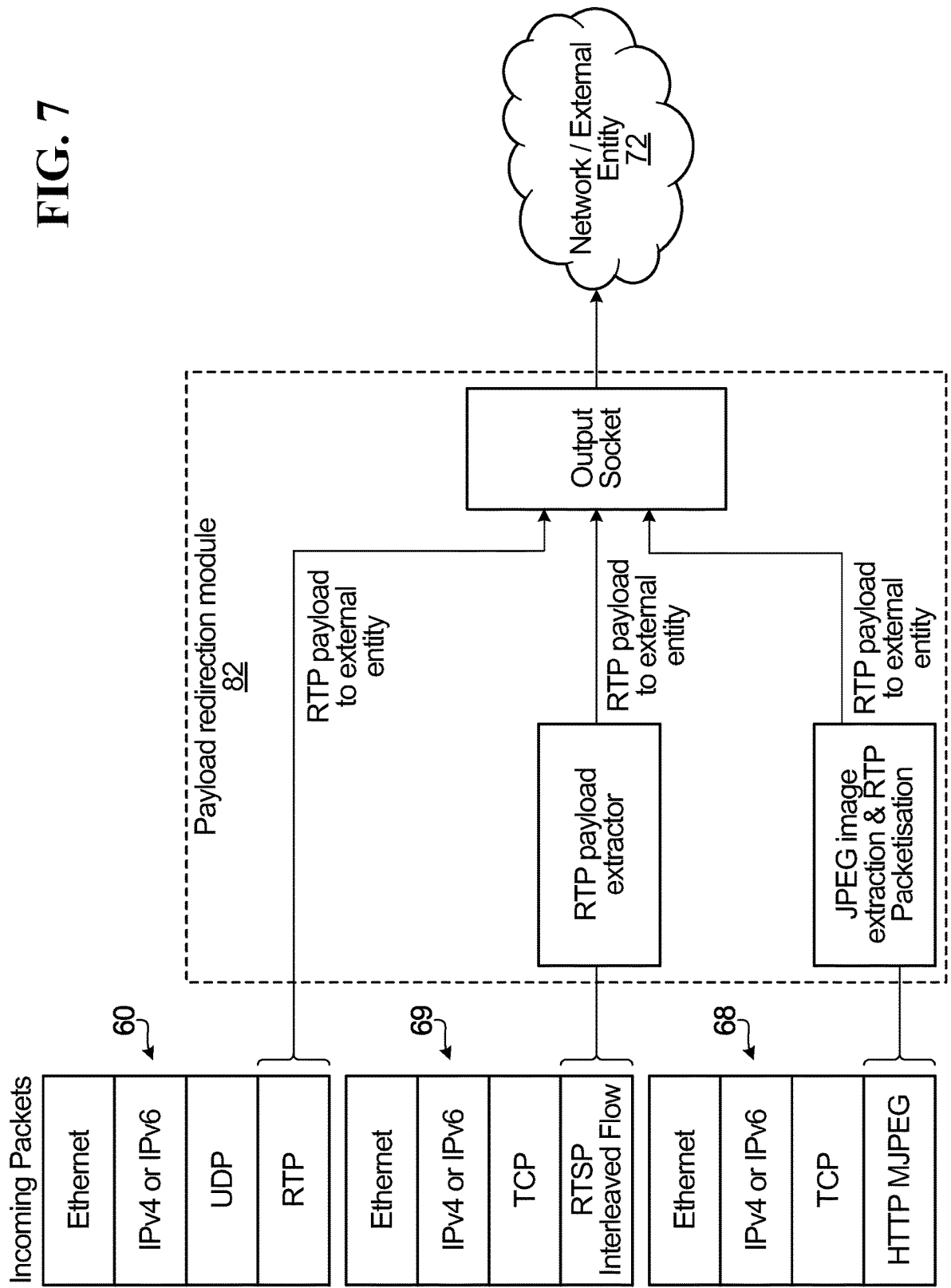
FIG. 7 is a conceptual diagram of the example payload redirection process.

Accordingly, operation of the payload redirection module 82 may be viewed as carrying out a payload redirection process, which is now described in greater detail with reference to the flowchart in FIG. 6 and the conceptual diagram in FIG. 7. In particular, at step 1070, a packet is received (it is assumed to be an IP packet, otherwise it may be ignored or discarded, for example) and the flow is determined (based on at least the header of the received packet but also possibly based on part of the payload, which may contain the header of a therein encapsulated packet), In subsequent steps (to be described below, and which need not be practiced in the order shown), the payload redirection process behaves in a manner that depends on the payload structure associated with the current flow, if one exists in the table 84.

For example, if the table 84 is indicative of the payload structure for the current flow being RTP/UDP (which would mean that the received IP packet includes a UDP packet in its payload, whereby the UDP packet includes an RTP packet in its own payload, and whereby the RTP packet includes an RTP header and an RTP payload), then the payload redirection process includes step 1090, whereby the RTP payload is extracted and sent to a socket (such as a Berkeley socket or BSD socket or other Internet socket or other library of linkable modules or application programming interfaces) at step 1100, where the RTP payload is packaged into one or more suitable new packets and sent to the console or other external system 72, or stored in memory for future use.

If the table 84 is indicative of the payload structure for the current flow being RTSP-I/TCP (which would mean that the received IP packet includes a TCP packet in its payload, whereby the TCP packet includes an interleaved set of RTP headers and RTP payloads in its own TCP payload), then the payload redirection process includes step 1120, whereby the RTP payloads for each flow are extracted and sent to the output socket. At step 1100, the socket packages the RTP payloads for each flow into new packets which are sent to the console or other external system 72, or stored in memory for future use.

If the table 84 is indicative of the payload structure for the current flow being HTTP MJPEG multipart (which would mean that the received IP packet includes a TCP packet in its payload and the payload of the TCP packet includes MJPEG coded video data in the HTTP format), then the payload redirection process includes step 1140, whereby the payload redirection process extracts the JPEG image(s) from the TCP payload, forms one or more RTP payloads and sends the RTP payload(s) to the output socket, linked library or application programming interface. At step 1100, the RTP payload(s) is/are packaged by the socket/library/API into one or more suitable new packets and sent to the console or other external system 72, or stored in memory for future use.

In the aforementioned steps 1090, 1120, 1140, data that is presumed to be coded video data is extracted from the received IP packet and repackaged into RTP payloads sent to the output socket. This extraction can be done "blindly", i.e., without verifying the data or decoding it, because it is known (or believed) to obey a certain known payload structure.

However, in some embodiments, there may be an advantage to decoding some or all of the coded video data before repackaging it. For example, the coded video data may include control information that should be validated or supplemented. For instance, the coded video data may include information that signals the beginning of a video frame. It is useful to know this from the point of view of the payload redirection module 82 because the transmission of an incomplete video frame may cause artifacts. As such, it is conceivable that the payload redirection process will include a step of ensuring that it does not transmit coded video data until it has received data signaling the beginning of a video frame. In another example, the coded video data may include codec-identifying information required for proper decoding (e.g., SPS, VPS). As such, it is conceivable that the payload redirection process will include a step of ensuring that it sends the codec-identifying information to be repackaged before it sends the remainder of the coded video data.

It should be appreciated that some of the aforementioned steps may be performed in a different order to achieve substantially similar effects. Additional verifications of other payload structures can also be carried out, and in any order, including in parallel.

If no payload structure was identified for the current flow, the packet may be ignored or discarded.

It should also be noted that the new packets include the same coded video data as the received IP packets; the coded video data need not be decoded, in other words new packets are sent to the console, external system 72 or memory without decoding the video data. The new packets may also be IP packets, although this is not a requirement. If the new packets are IP packets, they may be structured in accordance with any suitable protocol (e.g., UDP, TCP), and have any suitable payload structure (e.g., RTP/UDP, etc.). Furthermore, suitable encapsulation, tunneling or encryption may be provided. In addition, it is also possible to create additional (RTP) packets to be sent to the external system 72. These additional (RTP) packets may carry missing or reconstructed control information (e.g., codec-identifying information) that may assist the external system 72 in successfully decoding the coded video data.

In some embodiments, the output socket of payload redirection module 82 may be configured to send the new packets to a console via an output port (e.g., an Ethernet port or network interface card). Alternatively or in addition, the new packets may be sent onto an external network (e.g., intranet or internet) via the output port. Alternatively or in addition, the new packets may be saved to memory by a local recording module. As such, the coded video data conveyed by the new packets can be decoded by a device that ultimately views or processes the coded video data further downstream or at a later time.

The above payload redirection process included various steps that check to see if the current flow appears in the aforementioned table 84, which is dynamically updated as new flows are discovered to be associated with coded video data, and as old flows fail to produce coded video data after a certain timeout period. In other embodiments, this check can be performed not against all flows in the table 84, but rather against a pre-defined set of flows. In other words, a comparison is done against a limited set of flows that may have been pre-defined as being of interest. These pre-defined set of flows may be supplied by the external system 72 or by a user via the data network, and the tests performed by the codec detection module 78 may be performed only if the current flow appears in the pre-defined set of flows. This could further reduce the bandwidth of the signal traveling from the surveillance module 70 to the external system 72.

It is also within the scope of the present disclosure for the codec detection module 78 to be configured to send control information to the payload redirection module 82 so as to control the payload redirection module's creation of new packets for a given flow.

Case 2—Modification ("Active")

Figure 10:
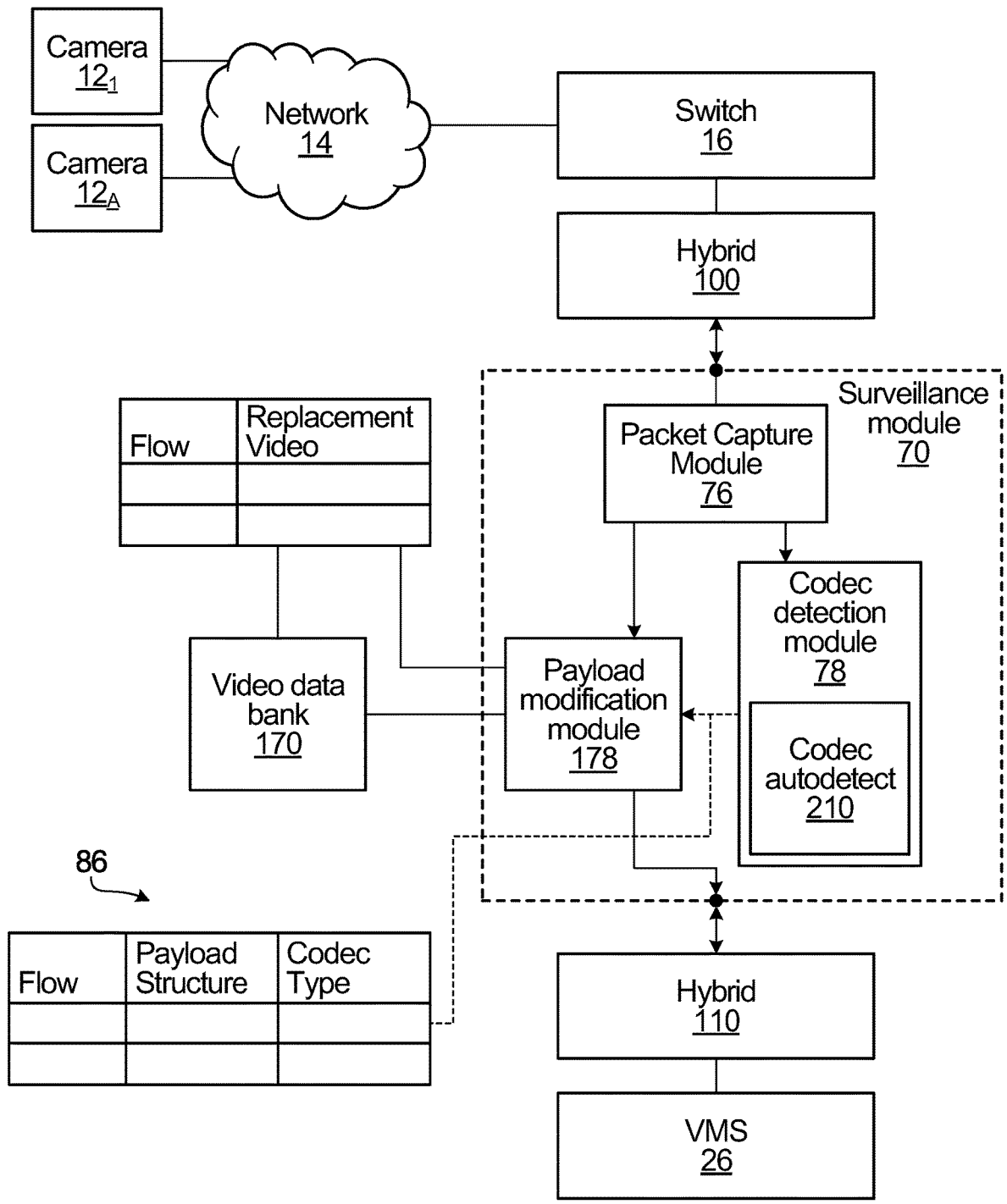
FIG. 10 is block diagram of an example surveillance module.

With reference now to FIG. 10, in this embodiment, the surveillance module 70 replaces coded video data 22 carried by certain packets traveling from the switch 16 to the VMS 26 with replacement coded video data. This allows the substitution of video images into in-progress video streams at line speed. The substituted video images may originate either from a video data bank from a video editor (not shown), for example. In clandestine applications, the introduction of replacement coded video data potentially fool users of the VMS 26 into continuing to believe that the video streams displayed by the VMS 26 are those received from the cameras $12_1 \ldots 12_A$. In privacy-preserving applications, this embodiment has the potential to obfuscate features (e.g., human faces) of the video streams that are provided to the VMS 26 before the VMS 26 has a chance to store or display these features. In the following description of this example embodiment, only packets traveling from the cameras $12_1 \ldots 12_A$ to the VMS 26 are captured, but those skilled in the art will find it within their purview to apply these teachings to the opposite direction of travel.

Those skilled in the art will appreciate that the packets (e.g., IP packets) that arrive at the surveillance module 70 may arrive at a high speed (packet bit rate), and in some cases may include coded video data from one or more of the cameras $12_1 \ldots 12_A$, whereas in some cases they may include data that is not coded video data (e.g., control information related to the cameras or data not related in any way to the cameras). The role of the surveillance module 70 in this embodiment is to identify, among the unpredictable morass of received original IP packets, those containing coded video data and to replace some of the coded video data on-the-fly with replacement coded video data that has been encoded using the same codec as the coded video data in the originally received packet. This is not a simple task, as the surveillance module 70 does not know a priori whether a given received packet is a video-data-containing packet, let alone the codec that may have been used.

To this end, the surveillance module 70 is configured for receiving via an input port a signal from the switch 16. The received signal is fed to a packet capture module 76. The packet capture module 76 is configured to detect packets (e.g., IP packets) in the received signal. The packets detected by the packet capture module 76 are fed to both (i) a codec detection module 78 and (ii) a payload modification module.

The codec detection module 78 carries out a similar codec detection process 222 as was previously described with reference to the flowchart in FIG. 5. As previously described, a purpose of the codec detection process 222 may be to discriminate between two main possibilities: (1) the received packet contains coded video data and (2) the received packet does not contain coded video data. If, on the one hand, the packet contains coded video data, then this means that the packet would adhere to a certain payload structure, and therefore the outcome of the codec detection process 222 will be the current flow as well as the corresponding payload structure. In addition, this particular embodiment of the codec detection process 222 also outputs the detected codec type for the current flow. If, on the other hand, the packet does not contain coded video data (or contains coded video data that the codec detection module 78 is unable to detect), then the outcome of the codec detection process 222 would be either nothing or an indication of the current flow together with an indication that there was no detectable coded video 22 in the packet.

Figure 5A:
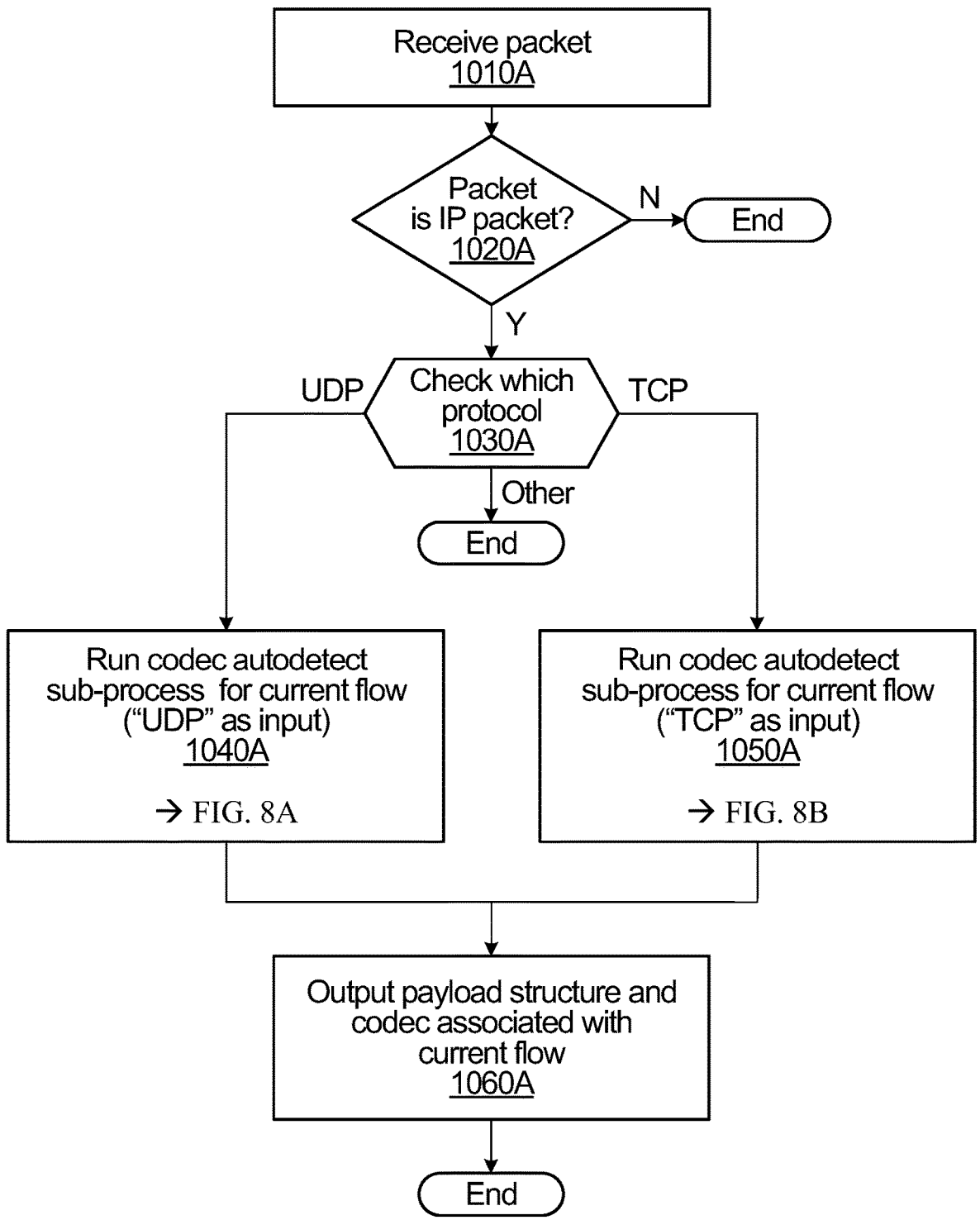

Accordingly, with reference to FIG. 5A, a packet is received at step 1010A and, at step 1020A, the codec detection process 222 includes determining whether the originally received packet is an IP packet. If not, the packet is ignored or discarded. If yes, the next step is step 1030A, whereby the codec detection process 222 includes attempting to check the lower-layer communication protocol used by the IP packet. If none can be identified, then the process may terminate. In case the communication lower-layer protocol is UDP, the codec detection process 222 proceeds to step 1040A, whereby a codec autodetect sub-process 210 is carried out for the current flow with the input variable "UDP"; in case the lower-layer communication protocol is TOP, the codec detection process 222 proceeds to step 1050A, whereby the codec autodetect sub-process 210 is carried out for the current flow with the input variable "TOP".

The codec autodetect sub-process 210 for UDP and TCP will be described in greater detail later on. For now, those skilled in the art should appreciate that the codec autodetect sub-process 210 may include some initial processing of the payload of the received packet to determine the payload structure of the received packet (which is really only a candidate payload structure at this stage), followed by some processing of the payload of the received packet in accordance with the candidate payload structure, which includes processing the payload of the received packet in accordance with one or more tests, each test associated with a specific codec. If a given test of the one or more tests is passed, an association is created between the current flow and at least the candidate payload structure. The output of the codec autodetect sub-process 210 (carried out at step 1040A or step 1050A) is thus identity of the candidate payload structure as well as the codec for which the test was ultimately passed (if any). In the present embodiment, the codec detection process 222 then proceeds to step 1060A, whereby it creates an association between (i) the current flow and (ii) the candidate payload structure and (iii) the codec associated with the test that was passed.

The aforementioned association between the current flow and the candidate payload structure and the codec associated with the given test may be sent directly to the payload modification module 198. Alternatively or in addition, a table 86 that stores this information may be populated by the codec detection module 78 and made accessible to the payload modification module 198. Specifically, the table 86 may include records each containing a "flow" field that specifies the parameters of a given flow (e.g., any suitable combination of source address, destination address, source port, destination port, MAC address, etc.), as well as a "payload structure" field that specifies the candidate payload structure (e.g., RTP/UDP, RTSP-I/TCP, HTTP MJPEG multipart) found to be associated with the given flow and a "codec" field that specifies the codec type (e.g., H263, MPEG4, H.264, H.264 bitstream mode, H.265, AAC, PCM, MJPEG) associated with the given flow. In some cases, more than one codec may be associated with the given flow. For example, in the case of RTSP-I, it may be necessary to provide plural "codec" sub-fields associated with plural RTP headers that may occupy the payload of the same TCP packet.

The information in the table 86 provides the payload modification module 198 with an indication of those flows that contain coded video data that may be subject to replacement, versus those flows for which there is insufficient information to do this, in which case the received packet must be passed along the communication link 28 untouched.

Figure 11:
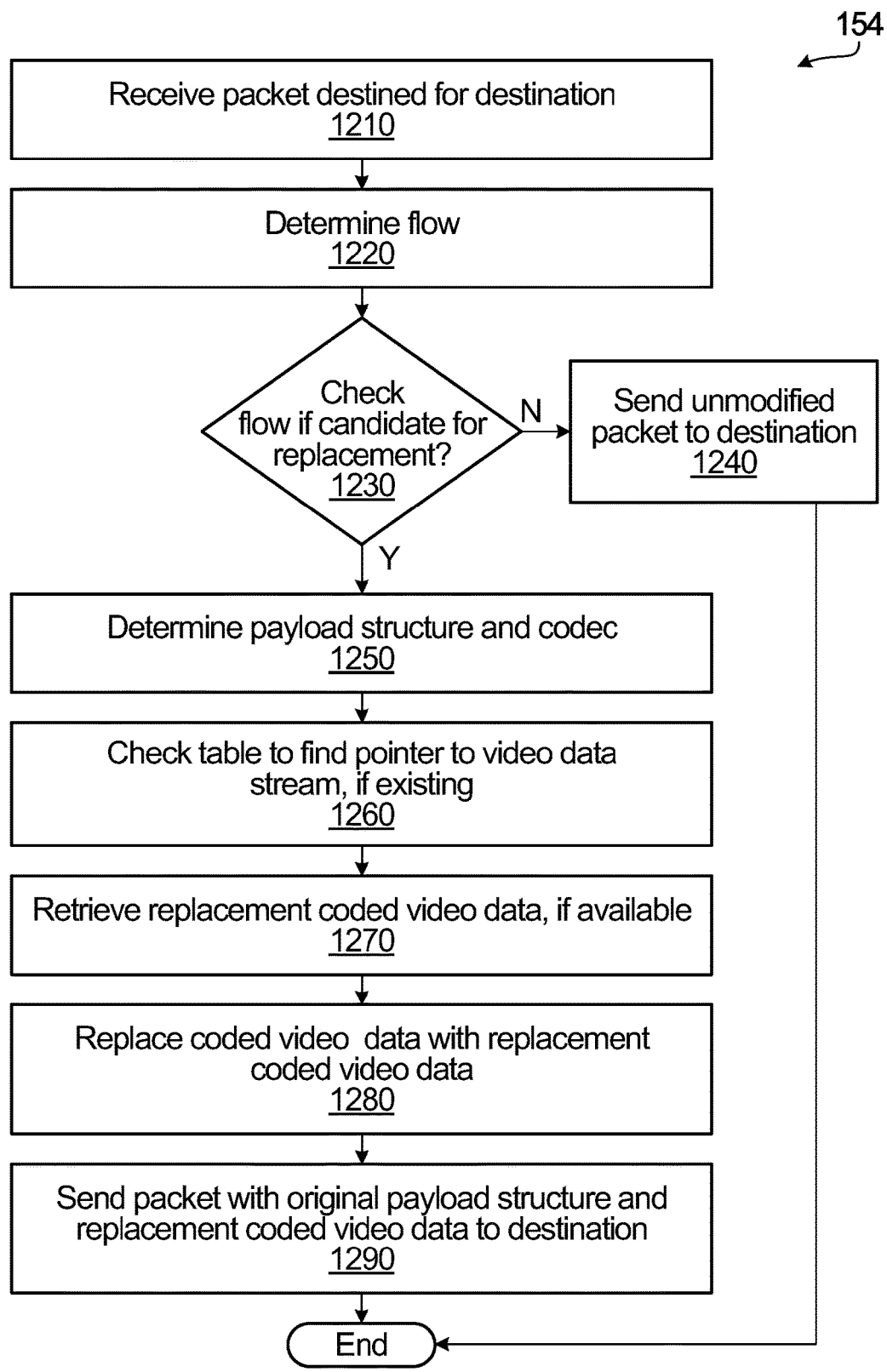
FIG. 11 is a flowchart corresponding to an example payload modification process.

Operation of the payload modification module 198 is now described. The payload modification module 198 may be configured to carry out a payload modification process 154, which is now described in greater detail with reference to the flowchart in FIG. 11. In particular, at step 1210, a packet is received (it is assumed to be an IP packet, otherwise it may be released untouched towards the VMS 26 via the output port of the surveillance module 70). At step 1220, the current flow is determined (based on at least the header of the received packet but also possibly based on part of the payload, as it may contain the header of an encapsulated packet). A video data bank table is then consulted at step 1230 to see if the current flow is a candidate for replacement. Specifically, the video data bank table may include a collection of records each including a "flow" field and a "replacement video" field. For a given record, the contents of the flow field indicates a given flow and the contents of the replacement video field indicates a pointer to a set of pre-coded video data streams in the video data bank. The pre-coded video data streams all include the same video data, except encoded in accordance with various codecs.

If step 1230 reveals that the current flow is not a candidate for replacement, the payload modification process 154 may terminate by simply sending the received packet to the VMS 26 in unmodified form (step 1240). However, if step 1230 reveals that the current flow is a candidate for replacement, the payload modification process 154 may proceed to step 1250, where the payload structure and the codec for the current flow are determined. This may be done by consulting the table 86 (step 1260). There are two possibilities, either there is an entry for the current flow in the table 86 or there is not. If there is no entry, then this means that despite the current flow being a candidate for replacement, the payload modification module does not have enough information to proceed. This could lead to the same scenario as if the current flow were not a candidate for replacement, namely, the received packet may be simply forwarded to the VMS 26 untouched. On the other hand, if consulting the table 86 reveals that there is indeed a payload structure and a codec associated with the current flow, the next step is step 1270, which involves retrieving replacement coded video data from the video data bank (at the location pointed to by video data bank table, as determined earlier). Of course, care should be taken to make sure that the replacement coded video data is coded with the same codec as the one that was found to be associated with the current flow.

Then, at step 1280, the payload modification module process includes replacing the coded video in the received packet with the replacement coded video data. This result in a new packet having the same payload structure as the received packet but in which the coded video data has been replaced with the replacement coded video data. Finally, at step 1290, the payload modification module process outputs the new packet towards the VMS 26 via the output port of the surveillance module 70.

It should be appreciated that some of the aforementioned steps may be performed in a different order to achieve substantially similar effects. It should also be noted that the packets being output to the VMS 26 include the same flow and other header information as the received IP packets; this may make it more difficult for the recipient to notice any tampering in the case that the coded video has been replaced. Alternatively or in addition, copies of some or all of the packets output to the VMS 26 may also be sent onto an external network (e.g., intranet or internet) via another output port. Alternatively or in addition, copies of some or all of the packets output to the VMS 26 may be saved to memory by a local recording module.

In some embodiments, the payload modification module may be configured to validate that, when replacing the coded video data of a given packet, it has already replaced the coded video of the first packet of the corresponding frame of that same video stream. That is to say, should a new flow be detected mid-way through an image frame, the remainder of the image frame should be allowed to continue unchanged, and replacement coded video data should only be introduced once the next frame has begun. This validation may be important in order to begin replacing video data on a key frame (i.e., not on an interpolated frame), so as to limit the occurrence of detectable visual artefacts at the recipient.

The above description considers that the payload modification module obtains replacement coded video data from the video data bank. The video data bank may be operationally coupled to the packet modification module. The video data bank may be located within the surveillance module 70 or it may be accessible remotely, e.g., over a public data network such as the Internet or over a private data network. The video data bank furnishes replacement video streams to the payload modification module. In some embodiments, the replacement video streams include multiple versions of the same video data, encoded using different codecs so as to be readily available in the desired format; in other embodiments, a real-time transcoding module (not shown) may be invoked on demand. As an alternative to replacing the payload with replacement video streams from the video data bank, a video stream edition module (not shown) may be used to on-the-fly edit regions of interest (e.g., facial features, license plates, etc.) within images carried in the coded video of various packets.

In addition, control information may be provided by the codec detection module 78 to the payload modification module 198 in the form of, e.g., a control signal. The control information may indicate one or more of, for example:
- specific flows that are 1 are not candidates for replacement;
- the type of replacement operation (e.g., replaced from video data bank or edited by the video stream edition module)
- the pointers to the pre-coded video data streams in the video data bank that are to be used in lieu of original coded video, for a particular flow (i.e., the video data bank table);
- the timing of replacement (e.g., when it is to start or end).

Codec Autodetect Sub-Process

The codec autodetect sub-process 210 includes discovering a codec used for encoding video data carried by at least part of the payload of the received packets associated with a given flow. In the case of some codecs, they are discoverable directly from the payload of each received packet, whereas in the case of other codecs, they are discoverable only once a "state" has been built up over multiple received packets for the given flow. In order to handle the latter case, the codec detection module 78 may store a "state of codec discovery" for each of one or more flows. As such, the codec detection module 78 carries out the present codec autodetect sub-process 210 for each received packet in order to discover, where possible, the codec used to encode the video data carried by the received packet or to build up the state of codec discovery for the flow to which the received packet belongs.

Figure 8A:
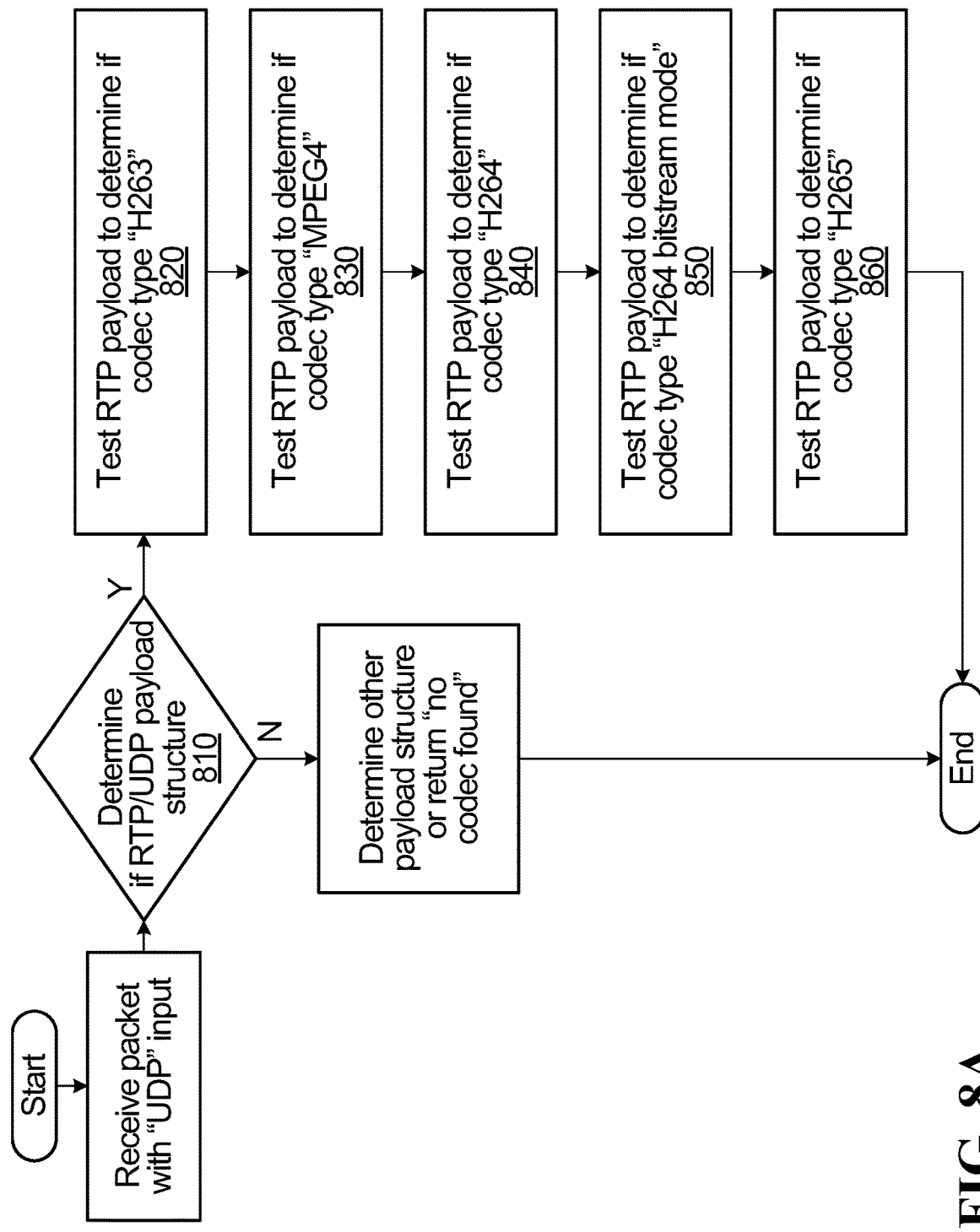
FIG. 8A is a flowchart corresponding to an example codec autodetect sub-process with an input variable "UDP".

Reference is now made to FIG. 8A, which pertains to step 1040 of FIG. 5 and step 1040A of FIG. 5A, whereby the codec autodetect sub-process 210 is carried out for the current flow with the input variable "UDP". At step 810, a protocol compliance verification is performed to determine if the received packet might have an RTP-over-UDP (or RTP/UDP) payload structure. This can be determined by checking certain bits in the UDP header to determine the RTP version used and the RTP payload type. If the protocol compliance verification determines that the received packet might have a UDP/RTP payload structure, the codec autodetect sub-process 210 proceeds to step 820 (in order to start testing for codecs), otherwise, the codec autodetect sub-process 210 may proceed to try to establish the presence of other payload structures or may simply terminate by returning that no codec was found in the UDP packet.

At step 820, the first of several tests on the RTP payload is performed. Each of the tests is associated with a specific codec. Each of the tests is considered "passed" if it successfully determines that the codec type associated with that test was used (or likely used) to encode video data in the RTP payload. The tests may be performed in series (in any order) or in parallel, or the code may be optimized so that the processing done at certain steps is shared among multiple tests. For example, the test performed at step 820, if passed, will return the codec type "H263"; the test performed at step 830, if passed, will return the codec type "MPEG4"; the test performed at step 840, if passed, will return the codec type "H.264"; the test performed at step 850, if passed, will return the codec type "H.264 bitstream mode"; and the test performed at step 860, if passed, will return the codec type "H.265". Still other tests can be performed for other codecs.

Figure 8B:
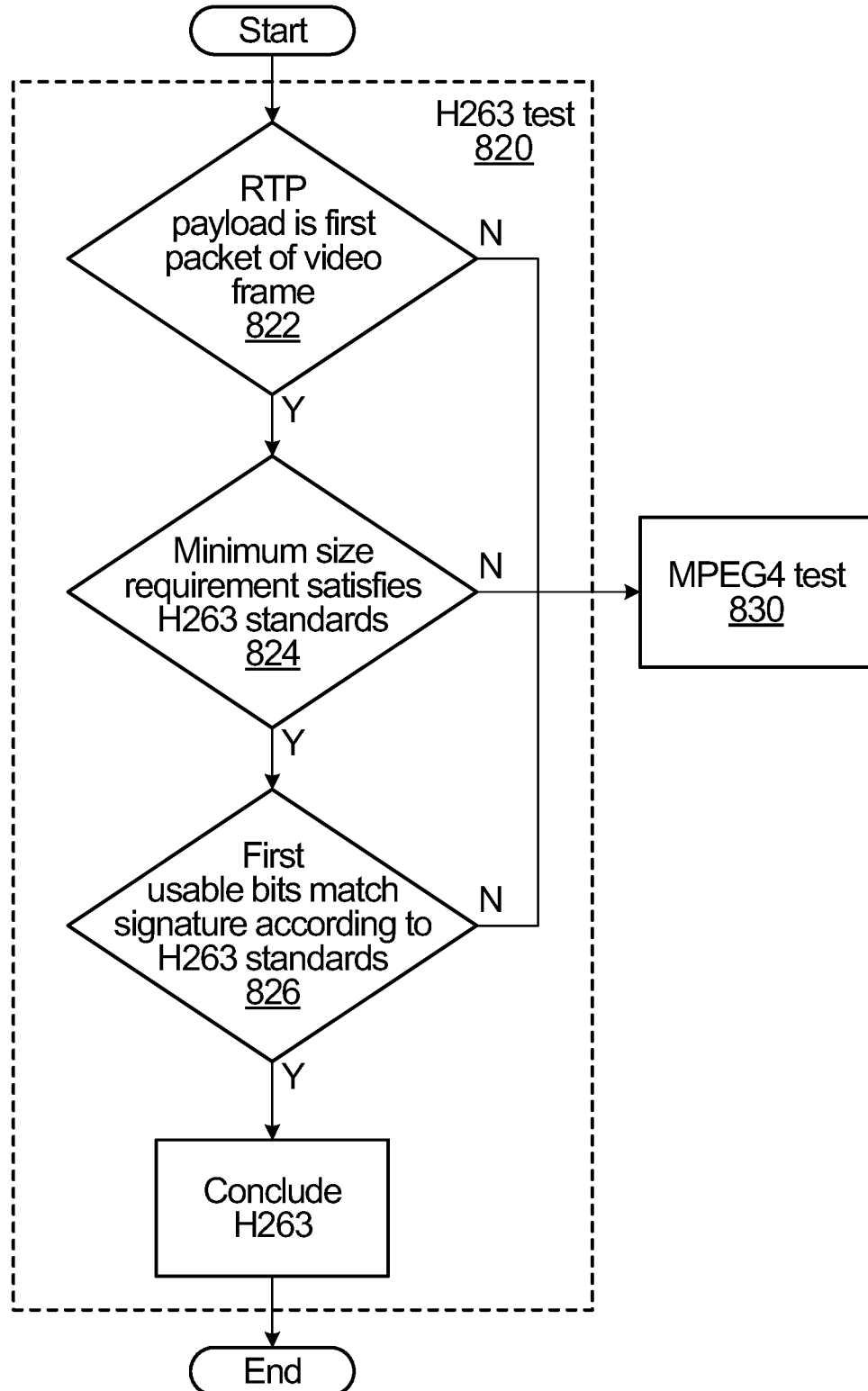
FIG. 8B to 8F are flowcharts corresponding to various example tests designed to confirm whether an RTP payload is coded with a particular codec.

With specific reference now to step 820, which corresponds to the H263 test, it can be described with reference to FIG. 8B. Specifically, at step 822, the H263 test checks if the presumed H.263 video content of the RTP payload is the first packet of the current video frame. At step 824, the H263 test checks if the presumed H.263 video content RTP payload satisfies a minimum size requirement. The minimum size requirement may represent the smallest size in bytes required in order to conclude that the RTP payload might be encoded using H263. If both conditions are fulfilled, the H263 test performs step 826, which is performed on the first usable bits of the RTP payload. The first usable bits of the payload of the RTP packet are determined by ignoring a certain number of bits from the beginning of the RTP payload (i.e., the H263 test begins to read after the number of bits to ignore). Consequently, if step 826 reveals that the first usable bits match a particular signature (called "Picture Start Code", e.g., the 22 following bits: "0000 0000 0000 0000 1000 00"), the H263 test will have successfully passed ("conclude H263"), and the codec autodetect sub-process 210 may terminate; otherwise the codec autodetect sub-process 210 continues with step 830.

Figure 8C:
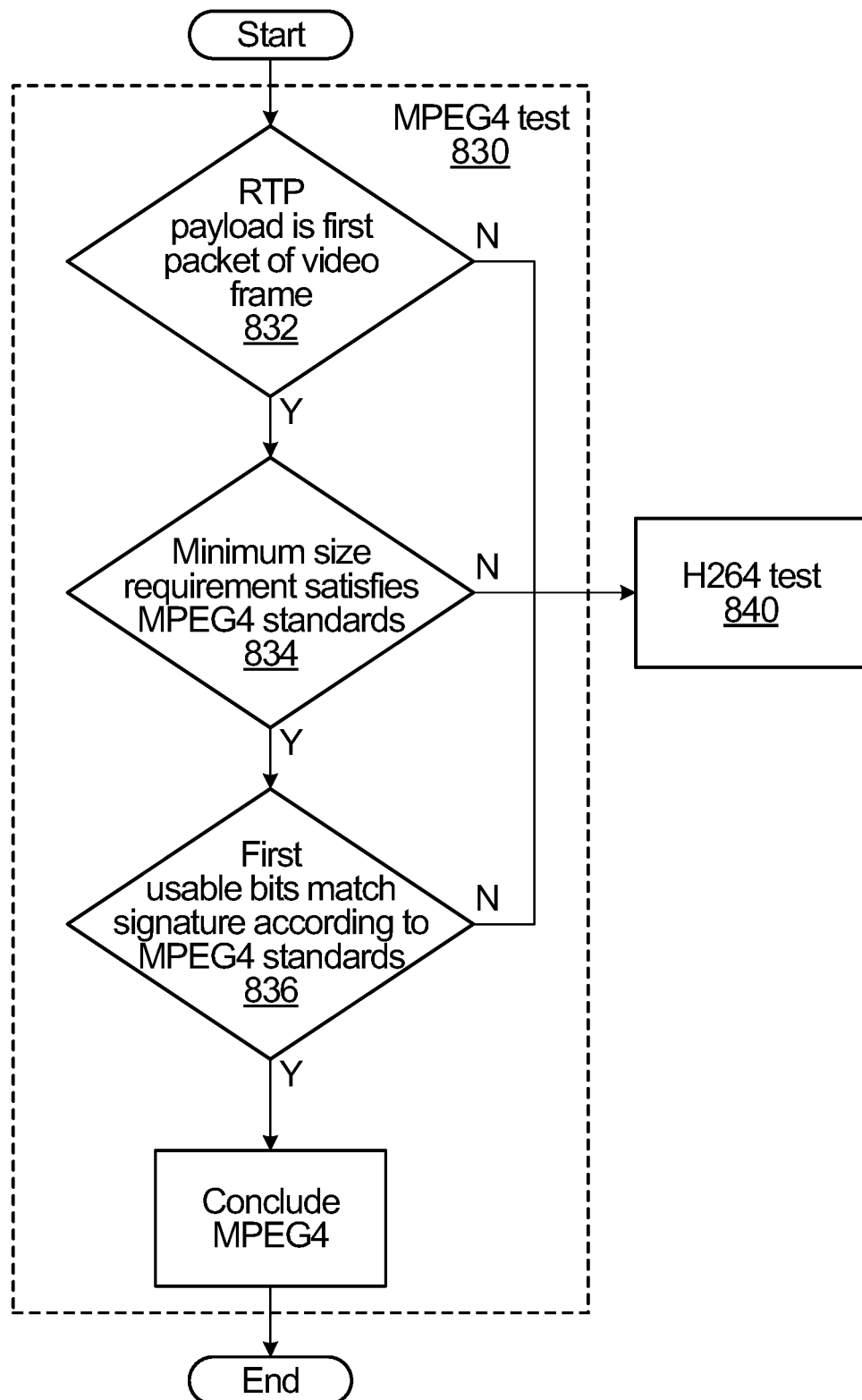

With specific reference to step 830, which corresponds to the MPEG4 test, it can be described with reference to FIG. 8C. Specifically, at step 832, the MPEG4 test checks if the presumed MPEG4 content of the RTP payload is be the first packet of the current video frame. At step 834, the MPEG4 test checks if the presumed MPEG4 video content of the RTP payload satisfies a minimum size requirement. The minimum size requirement represents the smallest size in bytes required in order to conclude that the RTP payload packet might be encoded using MPEG4. If both conditions are fulfilled, the MPEG4 test performs step 836, which is performed on the first usable bits of the RTP payload. The first usable bits of the payload are determined by ignoring a certain number of bits to directly from the beginning of the payload 36 (i.e., the MPEG4 test begins to read after the number of bits to ignore). Consequently, if step 836 reveals that the first usable bits match a particular signature according to MPEG4 standards (e.g., {0x00, 0x00, 0x01}), the MPEG4 test will have successfully passed, and the codec autodetect sub-process 210 may terminate; otherwise the codec autodetect sub-process 210 continues with step 840.

With specific reference to step 840, which corresponds to the H.264 test, it can be described with reference to FIG. 8D. Specifically, the H.264 test searches for several (e.g., 3) partial codec-identifying pieces of information (so-called Network Abstract Layer Units (NALUs)) that would be contained in the H.264 header if such were present in the RTP payload. The three NALUs can be referred to as Instantaneous Decoder Refresh (IDR), Picture Parameter Set (PPS) and Sequence Parameter Set (SPS). The detecting order may vary from one RTP packet to another, as loss of packet order may occur during transit on the network. Moreover, these NALUs may themselves be fragmented and contained in several non-consecutive packets. A "state of codec discovery" is therefore built up over several packets. The H.264 test updates the state of codec discovery until all three NALUs have been found and discovery is complete. The state of codec discovery may be suspended between packets. Practically speaking, the state of codec discovery may be represented by a NALU flag that is set for each NALU as it is received, and reset under various conditions.

Figure 8D:
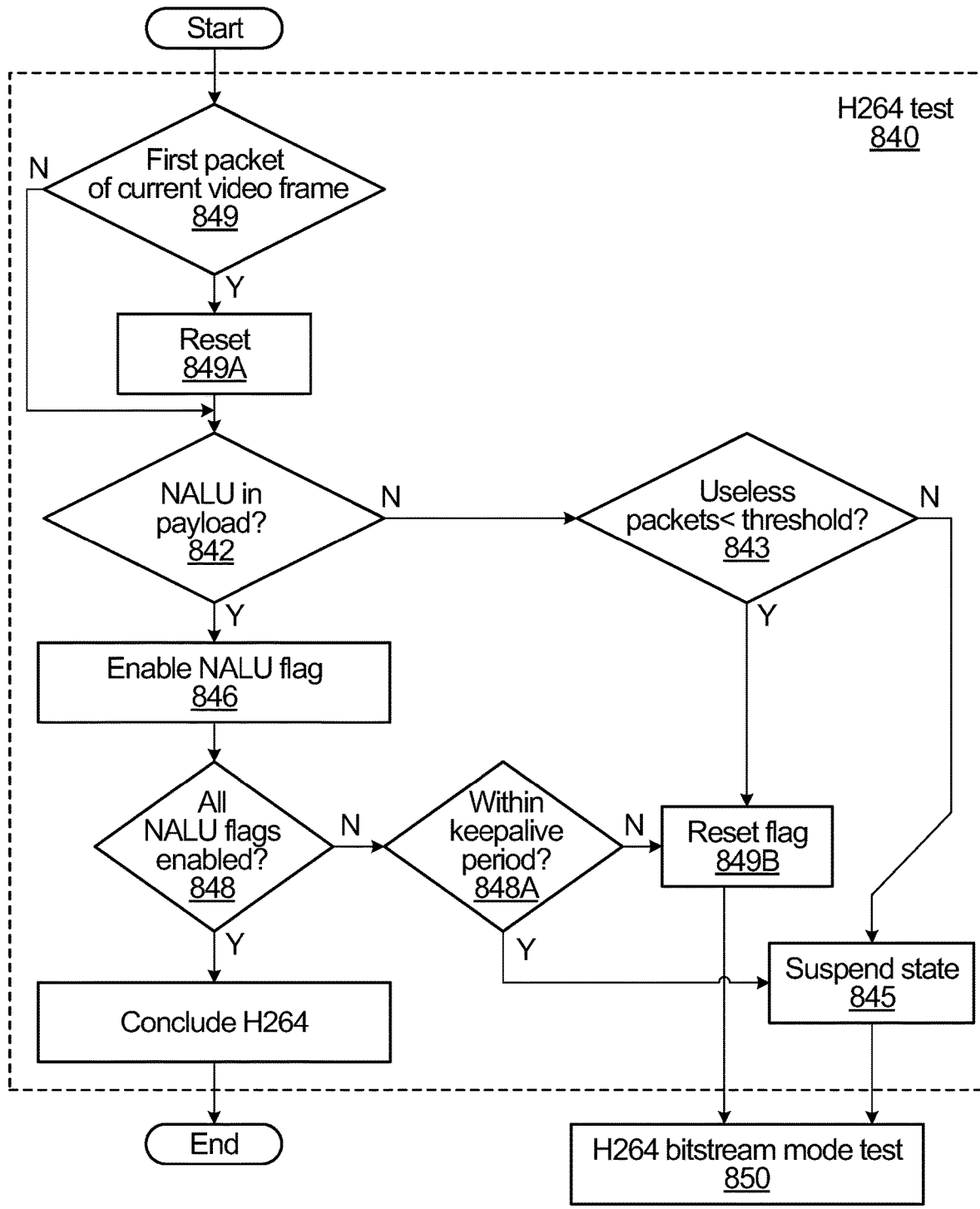

Turning now to the simplified flowchart in FIG. 8D, a check is done at step 849 to see if the received packet is the first packet in the current video frame. If not, the next step is step 842, but if yes, the state is reset (e.g., NALU flags are reset) at step 849A and the following step is step 842. At step 842, it is checked whether the received packet (the presumed RTP payload) appears to include one or more NALUs (or portions of NALUs), which can be determined based on specific bit patterns. If not, then a check is done at step 843 to see whether the count of successive "useless" packets (i.e., not containing NALU information) exceeds a certain threshold (e.g., greater than 3, 5, 10, etc. useless packets). If not, this means that the state continues to be built up; therefore, the state is suspended and a next packet is awaited. However, it is possible that the correct codec is not H264, therefore the testing continues with step 850. Returning to step 843, if the count of successive useless packets determined at step 843 did exceed the threshold, then the next step is step 849B the state is reset (e.g., the NALU flags are reset). Testing continues with step 850.

On the other hand, if step 842 revealed that the presumed RTP payload of the received packet does appear to include one or more NALUs (or portions of NALUs), then then next step is step 846 where the appropriate NALU flag is set. A check is then done at step 848 to see if all NALU flags have been set. If so, then the H264 test will have successfully passed ("conclude H264"), and the codec autodetect sub-process 210 may terminate. If not all NALU flags have been set, the state continues to be built up. The state is therefore suspended, but only if the time taken to build the state is still within a "keep-alive period" (e.g., 1-10 seconds) (see step 848A). Otherwise, the state is reset (e.g., the NALU flags are reset; see step 849B). In each case, it is possible that the correct codec is not H264 and therefore testing continues at step 850.

Figure 8E:
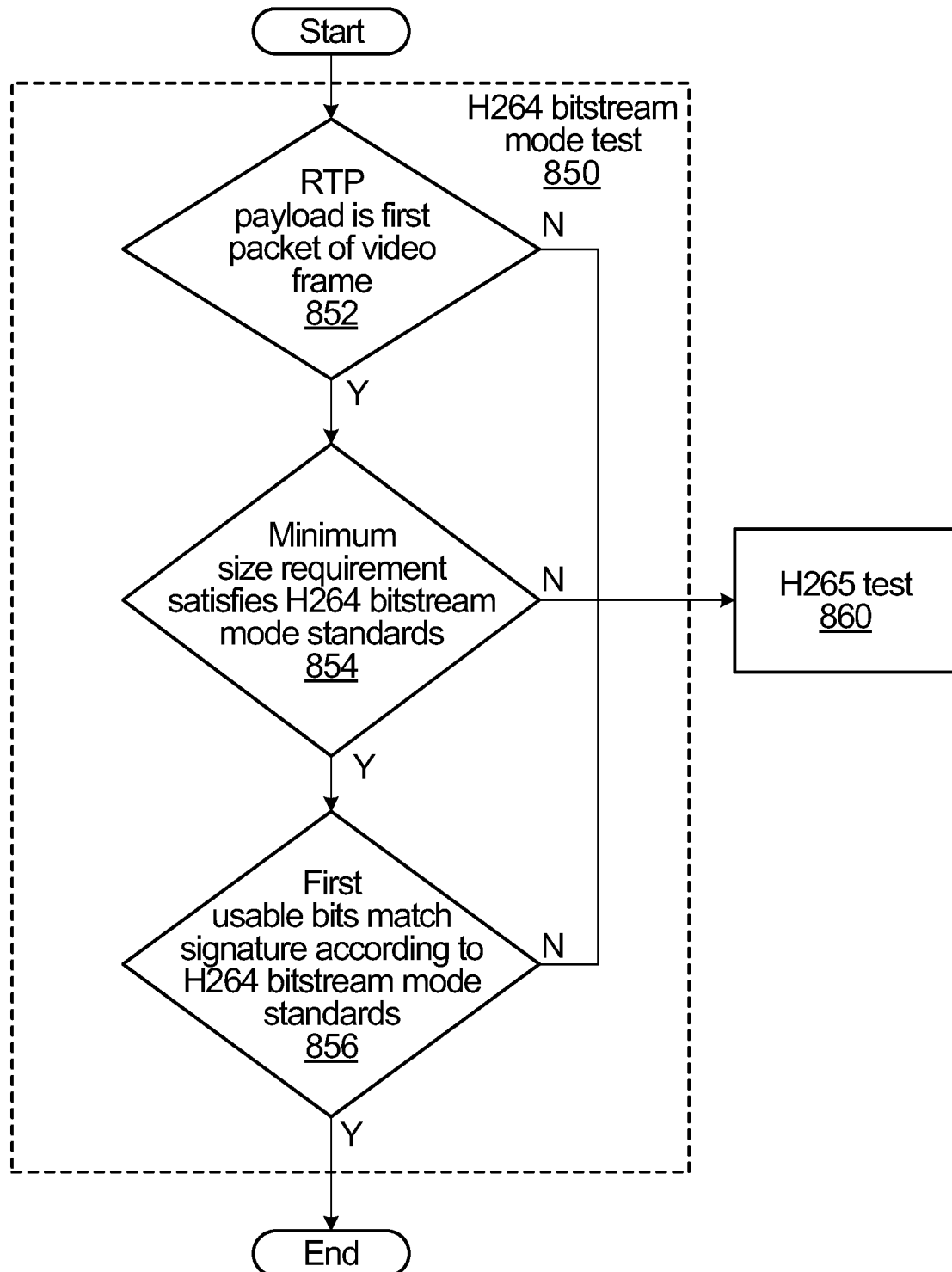

With specific reference to step 850, which corresponds to the H.264 bitstream mode test, it can be described with reference to FIG. 8E. Specifically, at step 852, the H.264 bitstream mode test checks if the presumed H.264 bitstream mode video content of the RTP payload is the first packet of the current video frame. At step 854, the H.264 bitstream mode test checks if the RTP payload satisfies a minimum size requirement. The minimum size requirement represents the smallest size in bytes required in order to conclude that the RTP payload might be encoded using H.264 bitstream mode. If both conditions are fulfilled, the H.264 bitstream mode test performs step 856, which is performed on the first usable bits of the RTP payload. The first usable bits of the RTP payload are determined by ignoring a certain number of bits from the beginning of the payload (i.e., the H.264 bitstream mode test begins to read after the number of bits to ignore). Consequently, if step 856 reveals that the first usable bits match a particular signature according to H.264 bitstream standards (e.g., 0x00, 0x00, 0x00, 0x01), the H.264 bitstream mode test will have successfully passed, and the codec autodetect sub-process 210 may terminate; otherwise the codec autodetect sub-process 210 continues with step 860.

It is noted that H.264 bitstream mode is detected based on a particular signature contained within the first bits of the RTP payload, which makes detection of H.264 bitstream mode simpler than for H.264 as the particular signature is instantly recognizable (as opposed to cumulating NALUs and maintaining/updating a state).

With specific reference to step 860, which corresponds to the H.265 test, it can be described with reference to FIG. 8F. Specifically, the H.265 test searches for several (e.g., 4) partial codec-identifying pieces of information (so-called Network Abstract Layer Units (NALUs)) that would be contained in the H.265 header if such were present in the RTP payload. The three NALUs can be referred to as Instantaneous Decoder Refresh (IDR), Picture Parameter Set (PPS), Sequence Parameter Set (SPS) and Video Parameter Set (VPS). The detecting order may vary from one RTP packet to another, as loss of packet order may occur during transit on the network. Moreover, these NALUs may themselves be fragmented and contained in several non-consecutive packets. A "state of codec discovery" is therefore built up over several packets. The H.265 test updates the state of codec discovery until all four NALUs have been found and discovery is complete. The state of codec discovery may be suspended between packets. Practically speaking, the state of codec discovery may be represented by a NALU flag that is set for each NALU as it is received, and reset under various conditions.

Figure 8F:
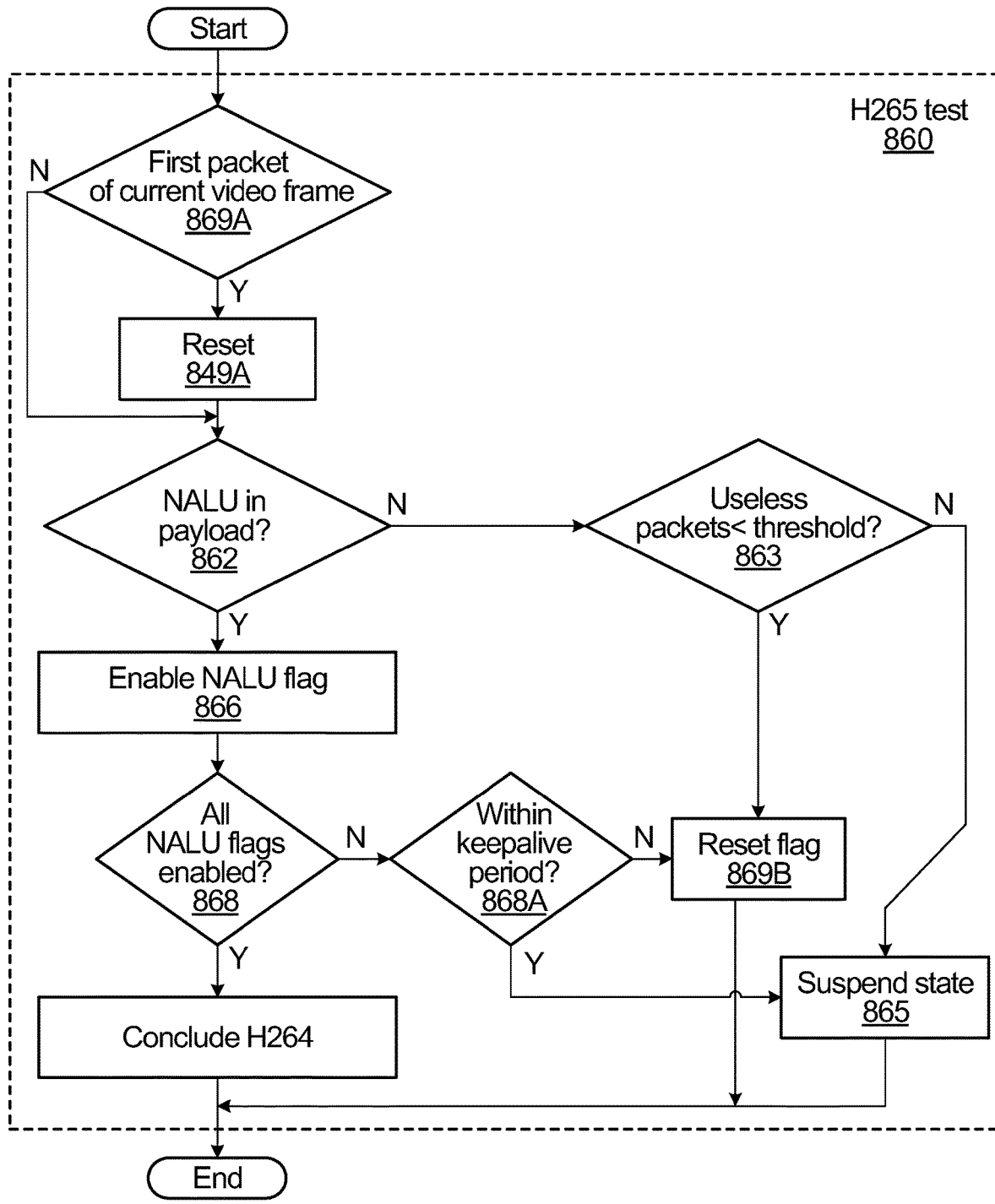

Turning now to the simplified flowchart in FIG. 8F, a check is done at step 869 to see if the received packet is the first packet in the current video frame. If not, the next step is step 862, but if yes, the state is reset (e.g., NALU flags are reset) at step 869A and the following step is step 862. At step 862, it is checked whether the received packet (the presumed RTP payload) appears to include one or more NALUs (or portions of NALUs), which can be determined based on specific bit patterns. If not, then a check is done at step 863 to see whether the count of successive "useless" packets (i.e., not containing NALU information) exceeds a certain threshold (e.g., greater than 3, 5, 10, etc. useless packets). If not, this means that the state continues to be built up; therefore, the state is suspended and a next packet is awaited. However, it is possible that the correct codec is not H265, therefore no conclusion is reached. Returning to step 863, if the count of successive useless packets determined at step 863 did exceed the threshold, then the next step is step 869B the state is reset (e.g., the NALU flags are reset).

On the other hand, if step 862 revealed that the presumed RTP payload of the received packet does appear to include one or more NALUs (or portions of NALUs), then then next step is step 866 where the appropriate NALU flag is set. A check is then done at step 868 to see if all NALU flags have been set. If so, then the H265 test will have successfully passed ("conclude H265"), and the codec autodetect sub-process 210 may terminate. If not all NALU flags have been set, the state continues to be built up. The state is therefore suspended, but only if the time taken to build the state is still within a "keep-alive period" (e.g., 1-10 seconds) (see step 868A). Otherwise, the state is reset (e.g., the NALU flags are reset; see step 869B).

It should be appreciated that the maximum number of useless packets referred to above in FIGS. 8D and 8F can be a user-defined variable equal to a number of packets that will be tolerated while the state of codec discovery is being built and which do not include useful codec-identifying information. In other words, it is possible that when searching for a total number (e.g., 3 or 4) NALUs in a given frame, 2 are received, and the third (or fourth) does not arrive. Each additional packet that does not contain the missing NALU (e.g., third or fourth) can be considered "useless". If the number of "useless" packets reaches a certain level, then the codec autodetect sub-process 210 abandons the search, and reinitiates it when the next video frame starts to be received. Indeed, the third (or fourth) NALU may have been lost, and any computational resources spent searching for it would be wasted. Of course, every time the search is abandoned, this leads to delay, and if one is too quick to abandon the search (e.g., if the third or fourth NALU is just one packet away when abandoning the search), then one incur a significant additional delay before the codec can be successfully identified for that flow. Thus, the maximum number of useless packets is a tradeoff between computational resources and delay, It should be appreciated that each of the aforementioned tests is designed so as to determine whether the payload contains pre-determined codec-identifying information regarding a particular codec that is sufficient to identify the particular codec as having been used to encode video data in the payload. If so, the test returns the particular codec as an identified codec for the current flow associated with the received packet.

It should also be appreciated that in some embodiments, the video streams must comply with certain general requirements including the bitrate (e.g., 8000 bps) and number of packets per second (e.g., 10 packets per second) in order for the outcome of any of the tests 820 to 860 to be considered valid.

Figure 8G:
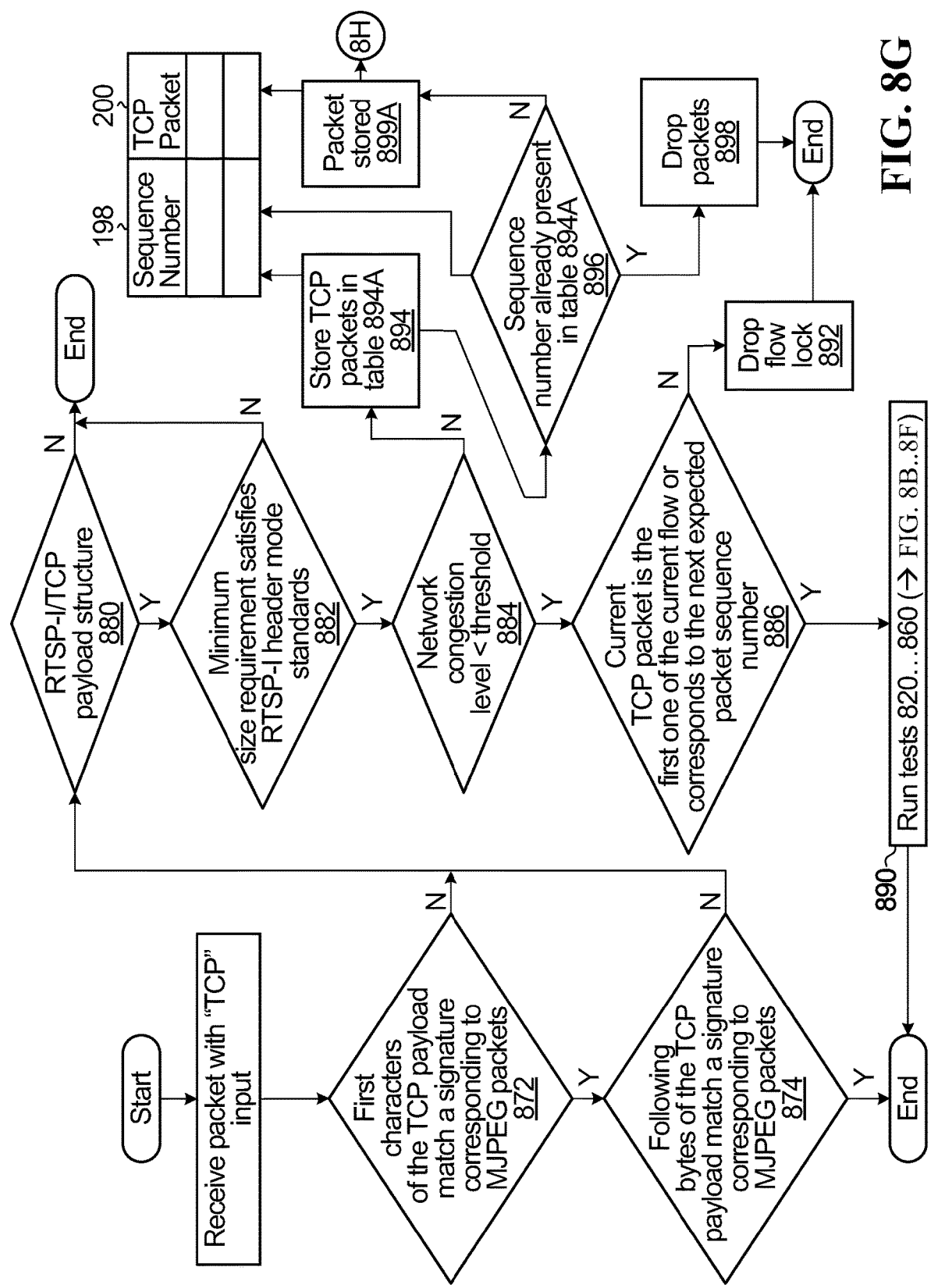
FIGS. 8G and 8H are parts of a flowchart corresponding to an example codec autodetect sub-process with the input variable "TCP".

Reference is now made to FIG. 8G, which pertains to step 1050 of FIG. 5 and step 1050A of FIG. 5A, whereby the codec autodetect sub-process 210 is carried out for the current flow with the input variable "TCP". As a preliminary comment, those skilled in the art will appreciate that in contrast to UDP, which is a connectionless protocol commonly used to transmit in real-time media packets such as video and audio, TCP provides a reliable and ordered way to transmit any type of content (e.g. audio, video, image, text, and so on). If the received packet is a TCP packet, it may or may not contain video data in its payload. As such, the codec detection process 222 is tasked with searching for video data inside the received TCP packet at different levels.

First, at steps 872 and 874, a verification is performed to determine if the received TCP packet might have an HTTP MJPEG multipart payload structure (which would also imply that the codec type for the current flow is MJPEG). This can be determined by comparing, at step 872, certain initial bits in the TOP payload against the introductory portion known to be associated with an HTTP MJPEG multipart payload structure (e.g., —*\r\nContent-Type: image/jpeg\r\nContent-Length:*\r\n\r\n). If the answer is yes, this would suggest that the following bytes of the TCP payload may include blocks of coded video data in JPEG format. To check this, the codec detection process 222 proceeds to step 874, where the following bytes of the TOP payload (or the first bytes of the TOP payload of the next received packet for the current flow) are compared against another signature associated with JPEG images (e.g., "0xFF 0xD8 0xFF"). If the comparison is positive, it can be hypothesized that the payload structure for the current flow is HTTP MJPEG multipart (and therefore that the codec type for the current flow is of course MJPEG), and the codec detection process 222 may terminate.

Otherwise, the codec detection process 222 proceeds to perform a verification to determine if the received TOP packet might have an RTSP-I/TCP payload structure. Specifically, the codec detection process 222 verifies, at step 880, if the presumed RTSP-I packet thought to be carried in the payload of the TOP packet starts with a particular signature proper to the header of an RTSP-I packet (e.g., "0x24 0x00"). If yes, then at step 882, the codec detection process 222, presuming that the packet carried in the payload of the TOP packet is an RTSP-I packet, checks if the header of such packet satisfies a maximum size requirement based on the typical structure of an RTSP-I header (e.g., less than 2048 bytes). If both conditions are met, the codec detection process 222 executes a "TCP stream sequencing method" for locking onto the current flow (i.e., to retrieve the correct order dictated by a TOP transmission) and extracting the corresponding RTP payload from the RTSP-I packet.

To this end, a network congestion level is verified at step 884 and, depending on whether the congestion is low or high (this can be compared against a threshold), one of two variants of the TOP stream sequencing method is used to retrieve the RTP payload, starting at either step 886 (for low congestion) or step 894 (for high congestion):

At step 886 (for a low congestion network, with low memory footprint), it is confirmed if the current TOP packet is the first one associated with the current flow or if it corresponds to the next expected packet sequence number. If one of these conditions is satisfied, the TOP packet is consumed and the corresponding RTP payload is extracted and tested for codecs at step 890 (see steps 820 . . . 860 previously described with reference to FIGS. 83 to 8F). If neither of these conditions is satisfied, the TCP stream sequencing method drops the flow lock at step 892 (also referred to as "stream lock"), and ends. It is expected that sooner or later (i.e., within the keep-alive period), the TOP packets will transit in sequential order, due to the low congestion of the network.

At step 894 (for a higher congestion network, with higher memory footprint), the TOP stream sequencing method stores several TOP packets (e.g., up to 20 TCP packets per flow, but this number is flexible) inside a table 894A ordered by sequence number. On receiving packets with a sequence number already present in table 894A (which is verified at step 896), the previous instance and subsequent packets are dropped at step 898 (as this indicates a high likelihood of TOP retransmission); otherwise, the packet is stored in the table at step 899A. Next, the TCP stream sequencing method validates at step 899C that each packet sequence number follows the previous packet sequence number stored in the table for the current flow. If so, the TCP packet is consumed at step 888 and the corresponding RTP payload is extracted and tested for codecs (see steps 820 . . . 860 previously described with reference to FIGS. 8B to 8F). If the number of packets exceeds a pre-defined limit (e.g., up to 20 packets) for the current flow (step 899E), the TOP stream sequencing method drops the flow lock at step 899F, and ends.

In a variant, step 899C is preceded by step 899B, where it is checked whether the received packet includes the acknowledge flag (i.e., ACK flag) and, if so, step 899D involves the TOP stream sequencing method extracting and returning the RTP payload by assembling the TCP packets up to the acknowledged packet sequence number (step 899D).

For either congestion level, it will be appreciated that the aforementioned TOP stream sequencing method extracts and returns an RTP payload. The returned RTP payload is then processed by applying a set of (for MPEG4, H263, H.264, H.264 bitstream mode and H.265, for example, although other tests may be done for PCM, AAC and other codec types). As such, depending on the test results, the codec detection process 222 may return one of these codec types as being associated with the current flow.

Those skilled in the art will appreciate that in the case of RTSP-I, the TCP stream sequencing method may find multiple RTP headers in the payload of the TCP packet and therefore the codec detection method extracts and returns multiple RTP payloads, one for each of the RTP headers. The codec that might be associated with each RTP payload needs to be detected individually. Therefore, for a given RTP header of a given flow, the associated RTP payload is processed by applying the aforementioned series of tests described with reference to FIGS. 8B through 8F (for MPEG4, H263, H.264, H.264 bitstream mode and H.265, for example). As such, the codec detection process 222 may return multiple codec types, one for each of the various RTP headers for the current flow.

Those skilled in the art will appreciate that in the case of H.264 and H.265, it may be difficult for the external system 72 to decode the coded video data without the complete set of NALUs, even if the type of codec is known. As such, the state of codec discovery is reconstructed from NALUs. In the aforementioned examples of H.264 and H.265 detection within the codec autodetect sub-process (FIGS. 8D and 8F), the NALUs are located in the RTP payload of successive RTP packets associated with the same flow. However, it will be appreciated that in some cases, some or all of the NALUs may be found elsewhere than in the RTP payloads of RTP packets. For example, some or all of the NALUs (in particular, SPS and PPS) may be sent as part of a negotiation that occurs using control messages sent in accordance with a different protocol (e.g., RTSP over TCP). Specifically, the control messages may include an RTSP DESCRIBE message which, upon receipt by a camera, may cause the camera to negotiate transmission of a video stream. This negotiation may contain crucial control information (e.g., some of all of the NALUs, such as SPS, PPS and/or VPS, for example) that may be detected and used by the surveillance module 70.

Figure 8H:
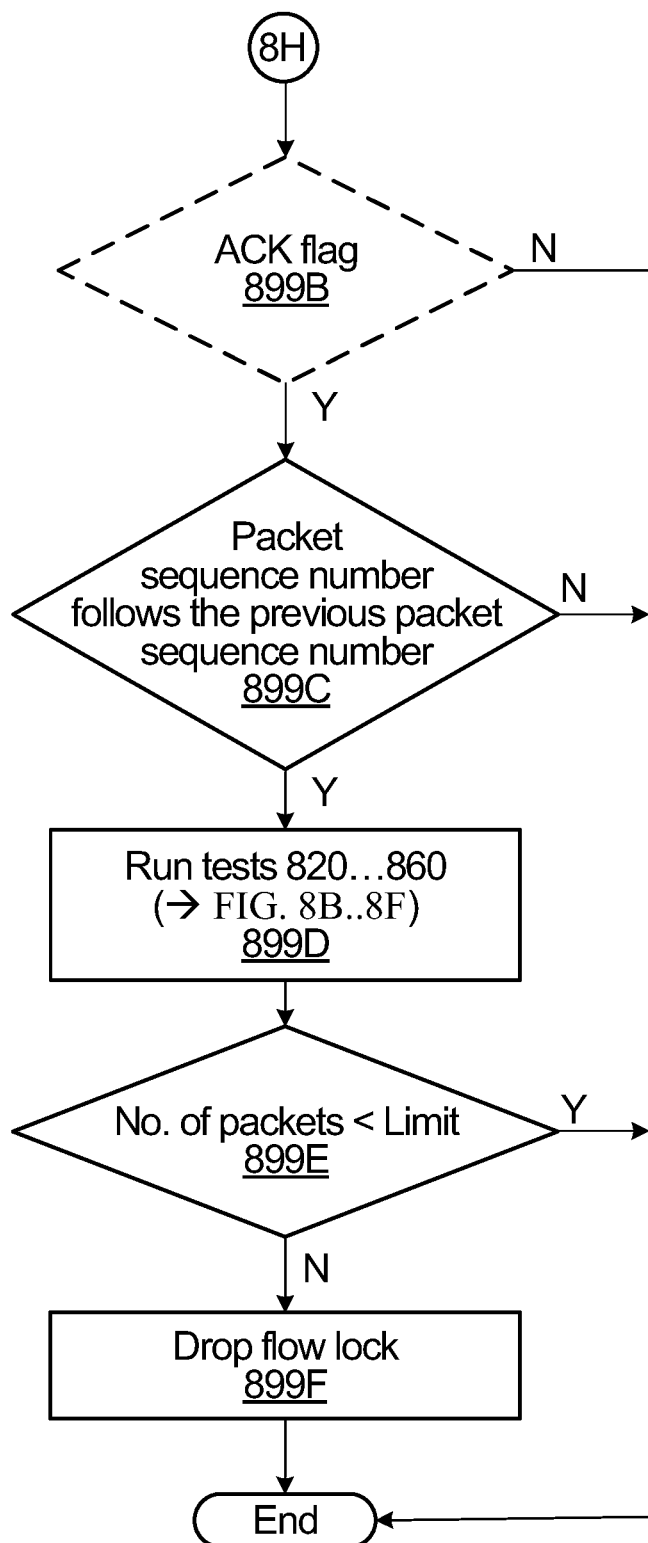

To this end, the codec detection module 78 runs an out-of-band codec control information reconstruction process for detecting NALUs that are sent using the RTSP protocol (rather than in the RTP payloads of RTP packets) between the VMS and a given camera. This process is run if it is determined that the lower-layer communications protocol of the incoming IP packet is TCP (e.g., as part of FIGS. 8G and 8H).

Figure 19:
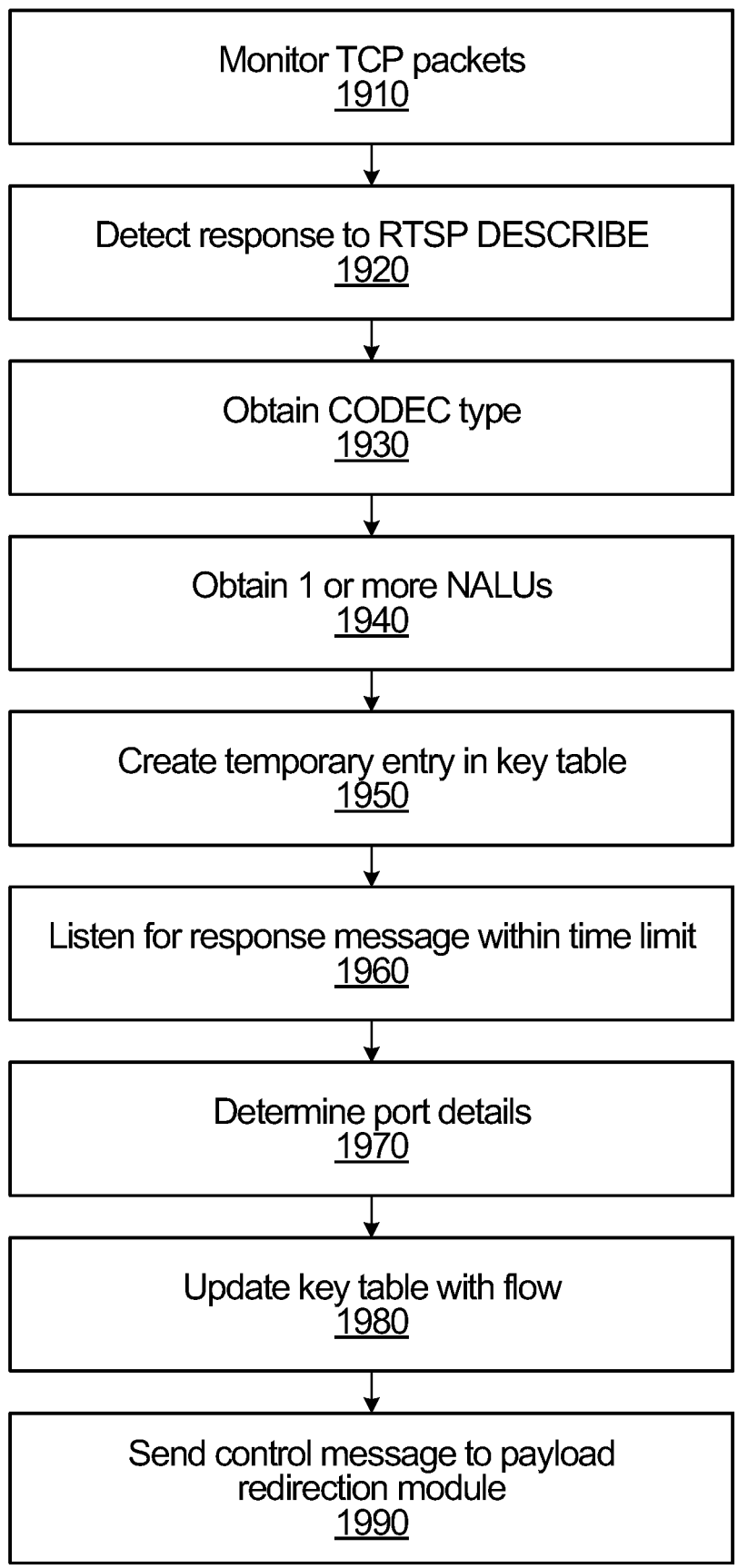
FIGS. 19 and 20 illustrate in detail an out-of-band codec control information reconstruction process, in accordance with a non-limiting embodiment.
Figure 20:
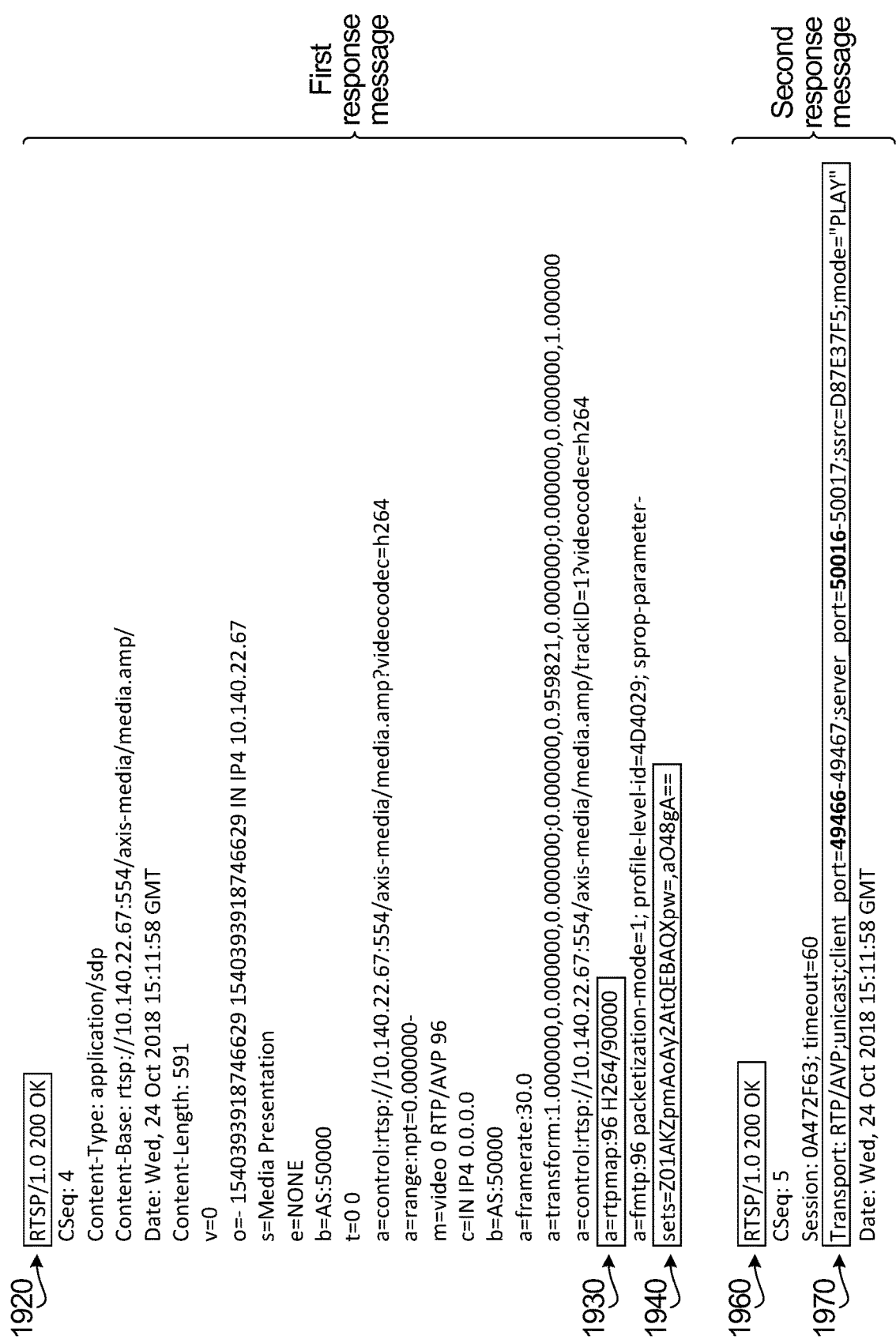

Specifically, with reference to FIGS. 19 and 20, the out-of-band codec control information reconstruction process comprises monitoring the TCP packets from the cameras (block 1910). At block 1920, the out-of-band codec control information reconstruction process detects a particular response message from a given camera, e.g., starting with "RTSP/1.0 200 OK". This response message may be a response to an RTSP DESCRIBE message from the VMS (e.g., MacA:IpA:TcpPortA) to the given camera (MacB:IpB:TcpPortB), although it need not be known that the RTSP DESCRIBE message was actually sent. Based on the response message (e.g., starting with "RTSP/1.0 200 OK"), the out-of-band codec control information reconstruction process (at block 1930) obtains the codec type (e.g., H.264 or H.265). This can be done upon detection of a specific set of characters (e.g., "rtpmap"). Also, the out-of-band codec control information reconstruction process (at block 1940) obtains one or more NALUs (e.g., parameter sets such as SPS, PPS and/or VPS). At block 1950, the out-of-band codec control information reconstruction process creates a temporary entry in a key table for the identifier combination {MacA, IpA, TcpPortA, MacB, IpB, TcpPortB} and associates the discovered NALUs (e.g., SPS, PPS, VPS) therewith.

The MAC address and the IP address of the VMS and the camera stay the same when sending RTP packets with video data, but the ports may differ. As such, the identifier combination {MacA, IpA, TcpPortA, MacB, IpB, TcpPortB} is not necessarily a flow associated with video data, Rather, further listening for a reply to an RTSP SETUP message is required, as this will reveal the ports used for transmitting RTP packets with video data, which allows establishing the flow. If this does not occur within a certain amount of time (e.g., 10 seconds), the temporary entry in the aforementioned key table may be cleaned.

Accordingly, the out-of-band codec control information reconstruction process listens to messages from the cameras and attempts to detect a particular second response message (e.g., starting with "RTSP/1.0 200 OK") within a time limit (block 1960). This second response message may be a response to a matching RTSP SETUP message from the VMS, but since the RTSP SETUP message is not being listened to, all messages from the cameras must be listened to in order to identify one that has the correct same identifier combination {MacA, IpA, TcpPortA, MacB, IpB, TcpPortB}. If this does occur, the out-of-band codec control information reconstruction process may then determine, from this second response message (see block 1970), the port details of the ensuing RTP video data transmission (e.g a unicast UDP stream, between the MacA:IpAA9466 and MacB:IpB:50016, for example). The flow is now known, e.g., {MacA, IpA, 49466, MacB, IpB, 50016}, in this example.

At block 1980, the out-of-band codec control information reconstruction process may update the key table with the flow (for example, {Udp, MacA, IpA, 49466, MacB, IpB, 50016}, where 49466 and 50016 are the UDP ports that will be used for video data transmission). The appropriate entry in the key table will have been pre-filled with the previously discovered NALUs (e.g., PPS, SPS, VPS) for what is now the known flow.

At this stage, these NALUs, in association with the flow, can be communicated to the external system 72. At block 1990, this can be done by the out-of-band codec control information reconstruction process sending a control message to the payload redirection module. The control message may specify the aforementioned flow and its associated NALUs. In response, the payload redirection module can be configured to create one or more extra RTP packets, and these extra RTP packets may contain, in their RTP payload, the relevant NALUs for the flow. These extra RTP packets may be inserted ahead of or in between other RTP packets for the flow, which changes the sequence number of subsequent packets. An advantage of inserting the NALUs in the RTP payload of extra RTP packets is that the external system 72 will receive all the necessary NALUs via the RTP payload of successive RTP packets associated with the same flow, which could allow prompt decoding of the video data.

Transmission of the RTSP DESCRIBE message from the VMS to a given camera may be done controllably by the VMS at a desired moment (known as "cycling"), If operation of the VMS cannot be controlled, transmission of the RTSP DESCRIBE message from the VMS to a given camera (or a set of cameras) may be triggered by interrupting the communication link 28 in order to connect the tap 74.

Figure 22:
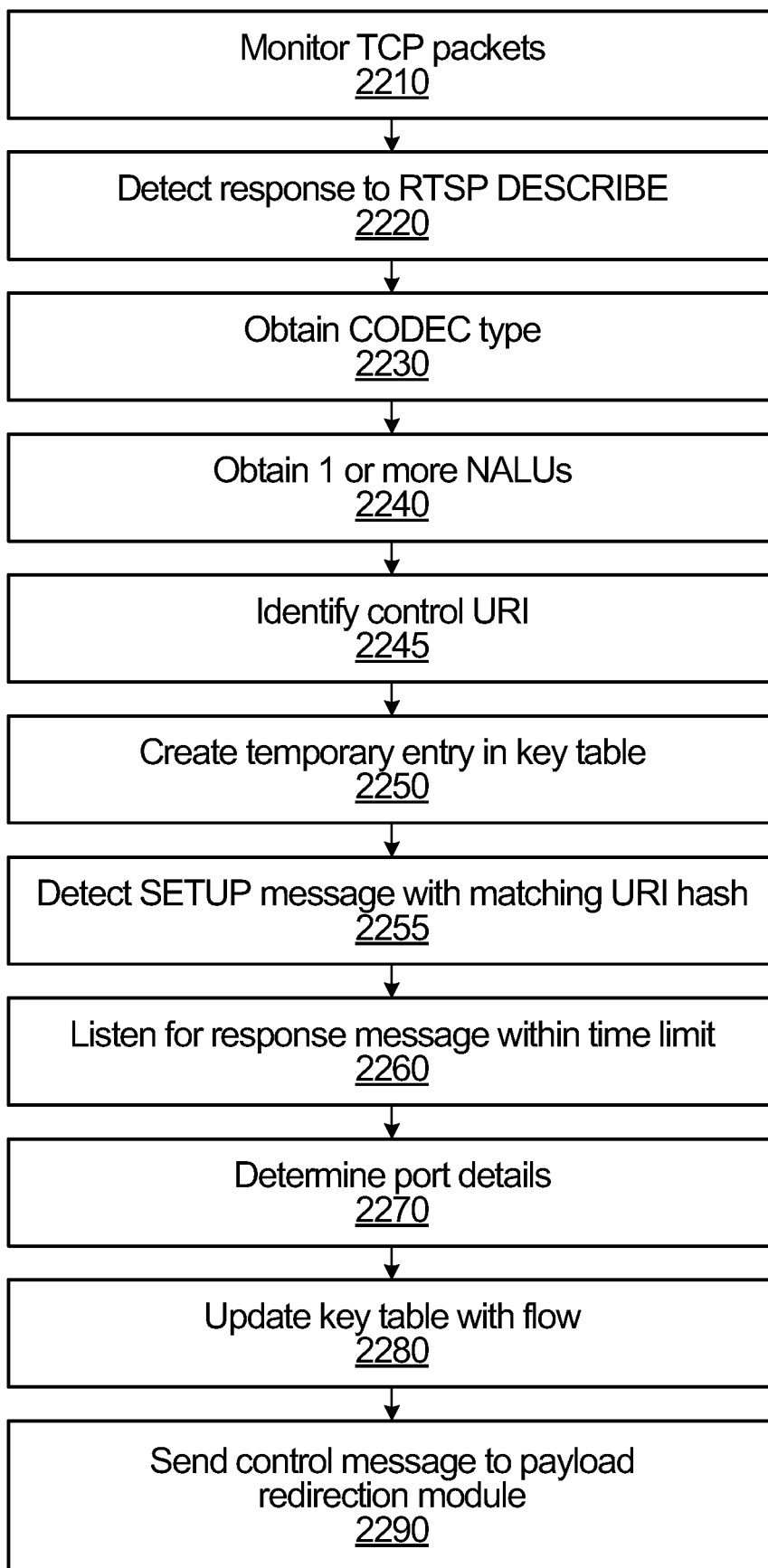
FIG. 22 illustrates in detail an out-of-band codec control information reconstruction process, in accordance with another non-limiting embodiment.

In a variant, and with reference to FIG. 22, the out-of-band codec control information reconstruction process comprises monitoring the TCP packets (block 2210). At block 2220, the out-of-band codec control information reconstruction process detects a particular response message from a given camera, e.g., starting with "RTSP/1.0 200 OK". This response message may be a response to an RTSP DESCRIBE message from the VMS (e.g., MacA:IpA:TcpPortA) to the given camera (MacB:IpB:TcpPortB). Based on this response message, the out-of-band codec control information reconstruction process (at block 2230) obtains the codec type (e.g., H.264 or H.265). This can be done upon detection of a specific set of characters (e.g., "rtpmap"). Also, the out-of-band codec control information reconstruction process (at block 2240) obtains one or more NALUs (e.g., parameter sets such as SPS, PPS and/or VPS). At block 2245, the out-of-band codec control information reconstruction process identifies a control URI (e.g., rtsp:// 10.122.218.192:554/axis-media/media.amp/ stream=0?videocodec=h265) and creates a hash (e.g., URI_hash). At block 2250, the out-of-band codec control information reconstruction process creates a temporary entry in a key table for the identifier combination {MacA, IpA, TcpPortA, MacB, IpB, TcpPortB, URI_hash} and associates the discovered NALUs (e.g., SPS, PPS, VPS) therewith.

The MAC address and the IP address of the VMS and the camera stay the same when sending RTP packets with video data, but the ports may differ. As such, the identifier combination {MacA, IpA, TcpPortA, MacB, IpB, TcpPortB} is not necessarily a flow associated with video data. Rather, further listening for a suitable reply to an RTSP SETUP message is required, as this will reveal the ports used for transmitting RTP packets with video data, which allows establishing the flow.

Accordingly, the out-of-band codec control information reconstruction process listens to the messages from the VMS 26 and from the cameras 12 and attempts to find, within a time limit, a particular second response (from the camera side) message having a valid start (e.g., starting with "RTSP/ 1.0 200 OK") and that follows a RTSP SETUP message (from the VMS side) having a matching URI hash (e.g., URI_hash). To this end, the RTSP SETUP message having a matching URI hash is detected (block 2255) and then a response message having the correct same identifier combination {MacA, IpA, TcpPortA, MacB, IpB, TcpPortB} is detected (bock 2260). Thereafter, the out-of-band codec control information reconstruction process may then determine, from this second response message (see block 2270), the port details of the ensuing RTP video data transmission. The flow is now known.

At block 2280, the out-of-band codec control information reconstruction process may update the key table with the flow. The appropriate entry in the key table will have been pre-filled with the previously discovered NALUs (e.g., PPS, SPS, VPS) for what is now the known flow.

At this stage, these NALUs, in association with the flow, can be communicated to the external system 72. At block 2290, this can be done by the out-of-band codec control information reconstruction process sending a control message to the payload redirection module. The control message may specify the aforementioned flow and its associated NALUs. In response, the payload redirection module can be configured to create one or more extra RTP packets, and these extra RTP packets may contain, in their RTP payload, the relevant NALUs for the flow. These extra RTP packets may be inserted ahead of or in between other RTP packets for the flow, which changes the sequence number of subsequent packets. An advantage of inserting the NALUs in the RTP payload of extra RTP packets is that the external system 72 will receive all the necessary NALUs via the RTP payload of successive RTP packets associated with the same flow, which could allow prompt decoding of the video data.

Figure 21:
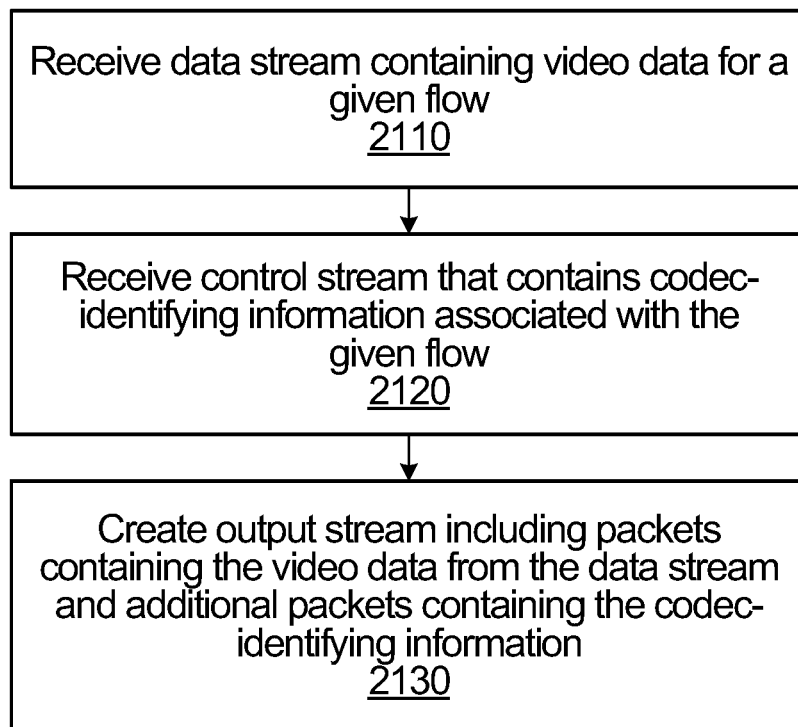
FIG. 21 is a flowchart illustrating an example codec control information reconstruction process.

The above description provides a specific non-limiting example of a process that may be generally described with reference to FIG. 21, whereby a data stream containing video data for a given flow is received (step 2110), a control stream that contains codec-identifying information associated with the given flow is also received (step 2120, which could be before of after step 2110, or at the same time); and an output stream is created at step 2130. The output stream includes packets containing the video data from the data stream and additional packets containing the codec-identifying information.

In some embodiments, the process is not aware a priori that it has received a control stream (such as an RTSP stream), let alone a control stream containing codec-identifying information. As such, the process may include an additional step of determining that a received packet is part of a control stream (e.g., by looking for certain key information in the header or payload of the packet and/or by looking for a certain pre-determined number of packets containing predetermined markers). In general, the codec detection module can be configured to attempt to (i) find information in an incoming stream of packets that would be indicative of the stream of packets being a control stream and/or (ii) reconstruct a portion of a control stream from the stream of packets, and determining that the stream of packets is the control stream if the attempting is successful.

Once the process has determined that a control stream has been received, the process can determine that the control stream contains codec-identifying information. In other words, a two-step process may be involved, where the second step (detecting codec-identifying information in a given stream) is conditional upon success of the first step (confirming that the given stream is a control stream).

Also, the above disclosure has described an out-of-band codec control information reconstruction process that obtains the codec type and codec-identifying information in an out-of-band way (e.g., in packets of a control stream such as RTSP packets) as well as a codec autodetect sub-process that determines a codec type by building a codec state based on in-band information (e.g., from codec-identifying information in packets of a data stream such as RTP packets). It should be appreciated that in some embodiments, both methods may be used together. For example, the codec detection module may attempt to detect the codec type from packets in an incoming control stream and, if it is unsuccessful (e.g., after a certain period of time has elapsed or after a certain number of packets has been received, processed or tested), then the codec detection module may proceed to attempt to detect the codec type from packets in an incoming data stream for codec-identifying information that would allow it to determine that a codec of a certain codec type is being used. The opposite may also be done. The codec detection module may also be configured to apply both methods in parallel so as to more quickly determine the codec type. Also, the codec detection module may be configured to require that both methods be carried out and that both methods yield the same result before declaring that a certain codec type has been successfully detected. If detection of a certain type of video codec type is successful for a given flow, the codec detection module may be configured to associate the certain type of video codec with the given flow.

As such, considering that the data stream identifies a source and a destination of the data stream and that the control stream also identifies a source and a destination of the control stream (which could be the same or different as the source/destination of the data stream), the surveillance module that implements the codec detection module may be neither the source nor the destination of the data stream or of the control stream. Moreover, the surveillance module may be remote from the source and destination of the data and control streams.

Those skilled in the art will appreciate that in some cases the codec detection process 222 described above relies on heuristics and knowledge regarding video stream structures and behavioral events, and therefore certain of the above examples may be used as a training dataset to improve reliability and precision through machine learning of a probabilistic model. Such a model may generalize the outcome of the codec detection process 222 by capturing a latent (i.e., non-observed properties in data) and observable set of variables toward a classification effort (i.e., assume codec based on similarities detected between an input video stream and the current training dataset), The probabilistic model may be applied through a complementary routine to the codec detection process 222. In addition to learning the various video stream data structures from the training dataset, the model may also output a confidence level for the type of codec based on events (e.g., packet sequencing, TCP fragmentation, congestion, and so on) occurring on the network.

Figure 23A:
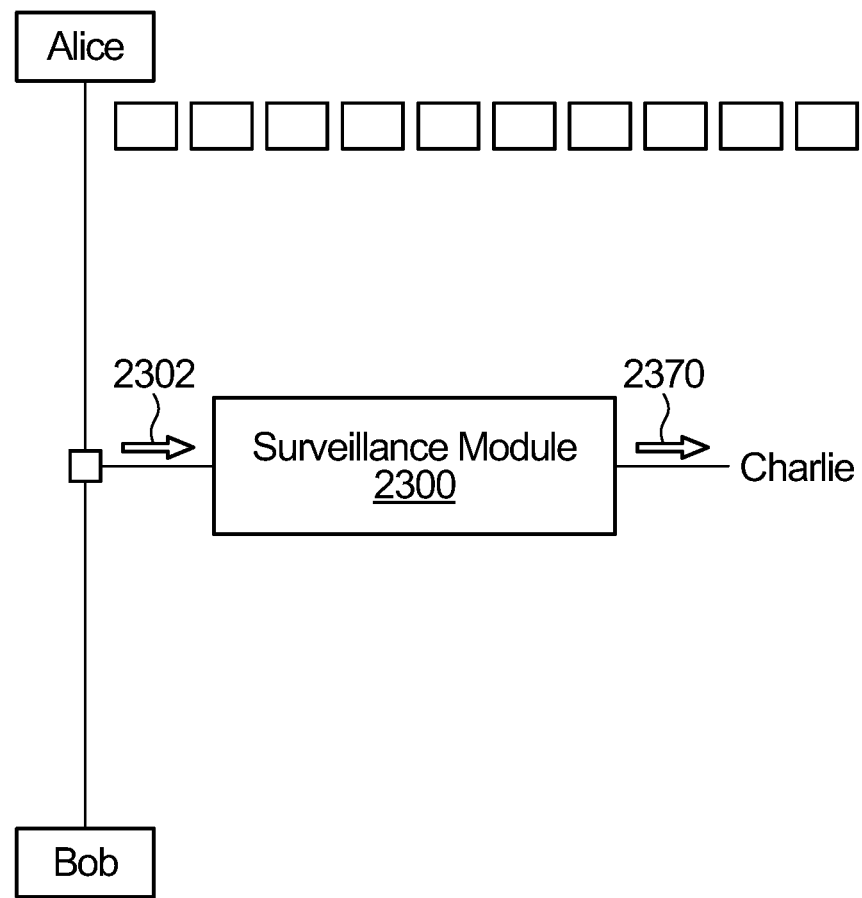
FIG. 23A is a block diagram showing a surveillance module that obtains received packets.

A potential advantage of this complementary routine may be the adaptive aspect of an always-expanding training dataset. In other words, the more video streams are analyzed by the complementary routine, the more the probabilistic model may be efficient and adapt to variances in the types and data structures present in various video streams. The complementary routine may also prevent the codec discovery process from false-negatives and false-positives through unsupervised learning (i.e., unlabeled classification), Generalized Approach With reference to FIG. 23A, a surveillance module 2300 (which can also be surveillance module 70) is operable to access a plurality of network packets 2302 using passive or active monitoring techniques as described herein. The packets carry 2302 data originating from various sources and destined for various destinations (e.g., Alice and Bob). The packets 2302, e.g., IP packets, may be connection-oriented (e.g., TCP) or connectionless (e.g., UDP) or a combination thereof.

The data carried by the packets may be of various types, including text, images, audio, video (live ore pre-recorded), web browsing commands, IoT (Internet of Things) sensor data, other control data, and still other types of data and combinations thereof. Each of these types of data may be formatted in accordance with a certain format. In the particular case of packets carrying video, the video may be formatted into video frames. Various protocols spanning various layers of the OSI communication model may ensure proper transport of data by IP packets. One example that is used often in the transport of video data is RTP, which spans layers 4, 5, 6 and 7 of the OSI model.

Certain ones of the packets 2302 can be considered as related to one another. One non-limiting example of relatedness is where packets originate from the same source IP address and are destined for the same destination IP address. Another example of packets being considered as related to one another is where they share more than just the same origin and destination IP addresses, but also the same port. Another example of packets being related to one another is where a designated portion of their respective headers is identical.

Other ways of defining or establishing relatedness are possible. For example, there may be a hierarchical nesting of "relatedness":

At the Network layer (OSI layer 3): relatedness may be established based on source and destination.

At the Transport layer (OSI layer 4): relatedness may be established based on source and destination ports, as well as the packet sequence ordering. Sequencing is particularly relevant in RTP when using UDP transport.

At the Session layer (OSI layer 5): relatedness may be established by the SSRC (synchronization source identifier), which identifies which session the stream belongs to. For example, in a VoIP telephone conference call, each participant may have unique Network-layer and Transport-layer information but would share the same Session-layer identifier (e.g., SSRC) which identifies the conference call that the participant belongs to and how to resynchronize the component streams of the conference call.

The Presentation layer (OSI layer 6): relatedness may be established based on information about how to go from a network representation to an internal representation of various data types, for example:

Whether integers Big Endian or Little Endian,
Whether strings is null terminated or Length-Value
Whether strings are ASCII, EBCEDIC, UTF, etc.

The Application layer (OSI layer 7): relatedness may be established based on information about the encoding of the media: MPEG4, MJPEG, etc.

Figure 23B:
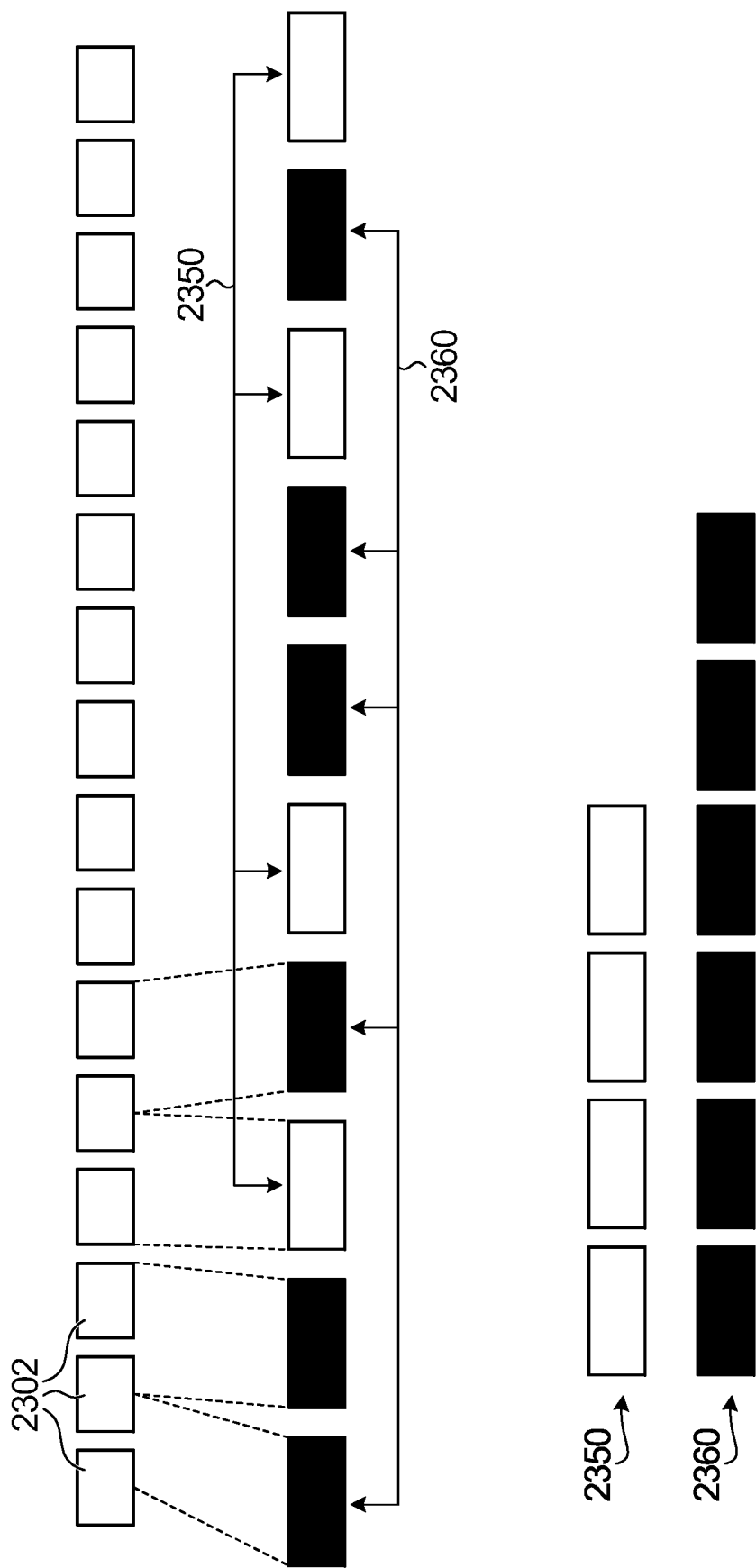
FIG. 23B conceptually illustrates related frames carried by the received packets.

Deeper in the media encoding one can find structures that may or may not be "of interest", such as video frames, or simply "frames". A frame is a collection of various data structures needed to reconstruct one picture in a sequence of pictures. Structures of interest may include I-Frames, B-Frames and P-Frames, to name a few non-limiting possibilities. FIG. 23B illustrates several frames as two groups of related frames 2350 and 2360. Frames 2350 are related to one another and frames 2360 are related to one another, but frames 2350 may be unrelated to frames 2360. Frames 2350, 2360 may be related to the packets 2302 as one frame per packet, multiple frames per packet or multiple packets per frame. The surveillance module 2300 may utilize various techniques, such as header inspection, to analyze the packets 2302 and identify related frames.

In the lower portion of FIG. 23B, frames 2350 have been grouped together, and frames 2360 have been grouped together, for ease of reference.

Considering now specifically the case of frames 2350 (frames 2360 could have been chosen just as easily), these frames may carry video data in accordance with a variety of "structures". A non-limiting example of a "structure" may be a protocol format, such as HTTP, H.264, H.263, H.265, MJPEG, SIP, etc. Another non-limiting example of a "structure" may be a payload structure for streaming video, such as "RTP/UDP" or "RTSP-I/TCP".

Figure 24C:
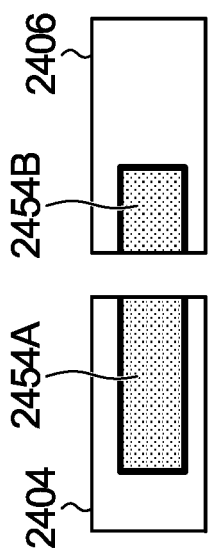
FIGS. 24A to 24F show different structures of interest that can be carried by related frames.
Figure 24D:
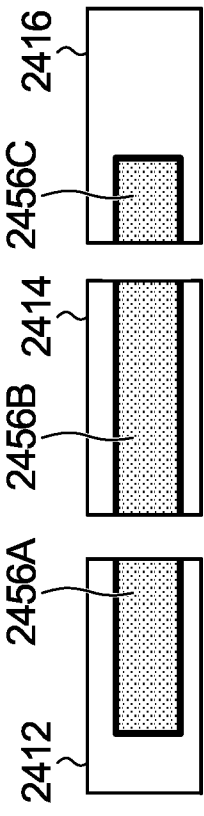
Figure 24E:
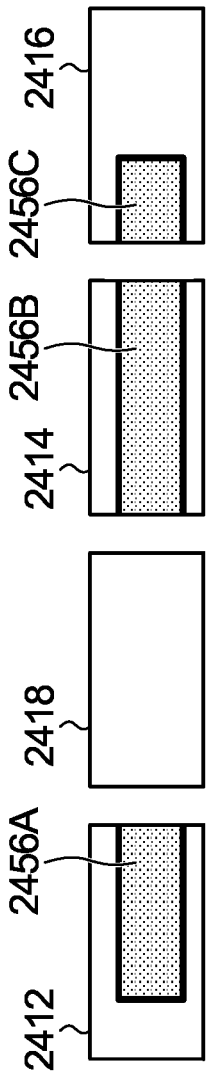
Figure 24A:
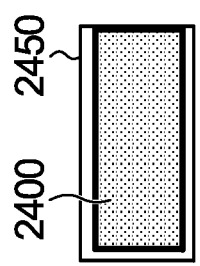

Reference is now made to FIGS. 24A through 24F, which depict various scenarios in which portions of certain frames are in accordance with (i.e., follow or abide by) a particular structure, regardless of the data type. Accordingly:

FIG. 24A depicts a scenario in which a portion 2450 of the frame 2400 (in this case, the entirety of the frame 2400) is in accordance with a first particular structure.

Figure 24B:
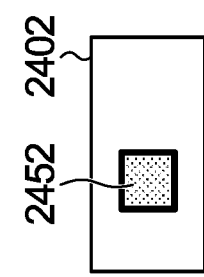

FIG. 24B depicts a scenario in which a portion 2452 of the frame 2402, that is less than the entirety of the frame 2402, is in accordance with a second particular structure.

FIG. 24C depicts a scenario in which portions 2454A, 2454B of each of two consecutive frames 2404 and 2406 are in accordance with a third particular structure.

FIG. 24D depicts a scenario in which portions 2456A, 2456B 2456C of each of several frames 2412, 2414, 2416 are in accordance with a fourth particular structure.

FIG. 24E depicts a similar scenario to the one shown in FIG. 24D, except that there is an intermediate frame 2418 not containing any portion that is in accordance with the structure, such that the particular structure spans multiple frames that are not necessarily contiguous.

Figure 24F:
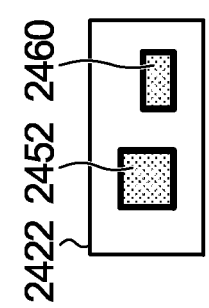

FIG. 24F depicts a scenario in which different portions 2452, 2460 of a single frame 2422 are in accordance with respective structures.

As such, a given one of the frames 2350 may include a portion (including, possibly, where the term "portion" means the entirety of the frame) that is in accordance with a given structure, or even multiple portions that are in accordance with multiple structures.

In accordance with embodiments of the present disclosure, the surveillance module 2300 is adapted to carry out a method that involves identifying, in the set of related frames 2350 derived from packets 2302, those portions of the related frames 2350 that are in accordance with at least one "structure of interest", and assembling such portions into at least one stream of new packets 2370 that are stored in memory or sent elsewhere (such as an external entity, e.g., "Charlie") for observation/processing. This allows extraction and storage/delivery of the essence of what is considered "of interest" to the related frames 2350.

In various cases, the at least one "structure of interest" may be specified by a user, an external entity or selected by the surveillance module. The at least one structure of interest may comprise one or more of the aforementioned structures, such as protocol formats and payload structures. In some embodiments, the at least one structure of interest may comprise all structures of interest associated with a certain data type, such as video data or web traffic, for example. In that case, the surveillance module 2300 would be considered "on the lookout" for all video data or web traffic irrespective of which actual structure the video data or web traffic abides by.

Figure 25:
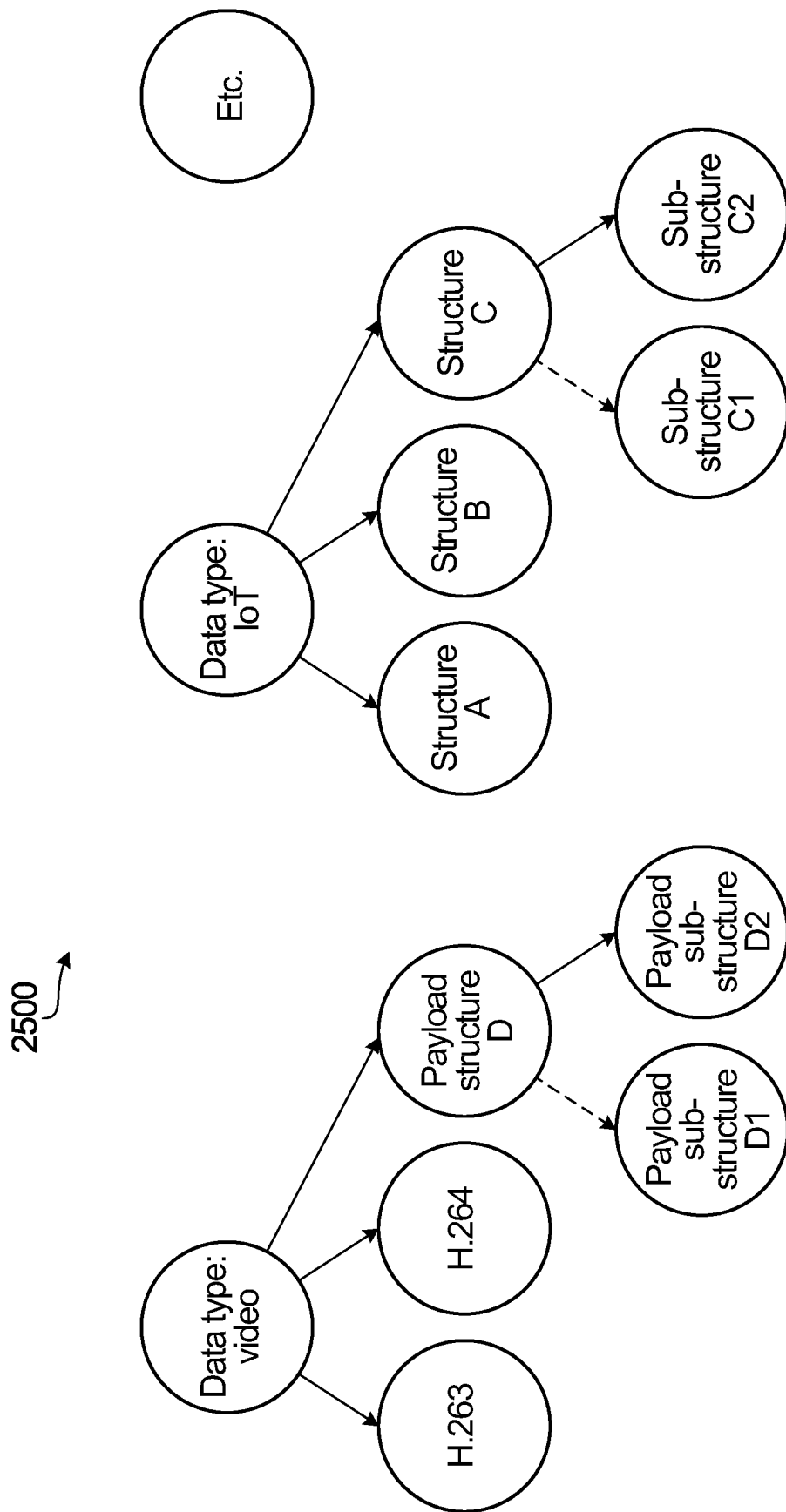
FIG. 25 is a tree showing structures of interest.

The at least one structure of interest may be recorded in a memory and conceptualized as a table. FIG. 25 depicts a directed acyclic graph or polytree 2500 showing a plurality of structures (and in some cases sub-structures), each associated with a particular data type (in the row). The structure includes all branches leading down to a termination of the polytree. An interest flag may encode a value indicative of whether the associated structure is a structure of interest. For example, when the interest flag is set to 1, this indicates that the associated structure is a structure of interest and when the interest flag is reset to 0, this indicates that the associated structure is not a structure of interest. In terms of mapping to the polytree 2500, when the branches leading to a particular structure are all solid lines this corresponds to an interest flag that is set to 1 for the structure (or sub-structure) and when there is at least one dashed line along the path this corresponds to an interest flag that is not set for that structure (or sub-structure). Thus, for example, for the video data type, the structures that are structures of interest are H.263, H.264 and payload sub-structure D2, but not payload sub-structure D1.

It is thus appreciated that the value of the interest flags collectively define a set of structures of interest, and it is envisaged that this set may change in size or composition over time as different structures either become or cease to become structures of interest. In the polytree representation of FIG. 25, branches may change from solid to dashed or vice versa. Also, new structures may be added to the graph 2500 (without necessarily setting their interest flag), and obsolete structures may be removed from the graph 2500.

Setting and resetting of the interest flags may be carried out by the surveillance module 2300 under control of an external user (such as Charlie, for example).

Although not shown in FIG. 25, the tree 2500 may also represent relatedness field, which links together different structures of interest by requiring the same type of line (solid or dashed) for the such structures. The surveillance module 2300 may be configured to ensure that the interest flags for related structures are always identical (either set or reset). This ensures that related structures of interest are kept together when required for the intelligibility of the redirected stream of new packets 2370.

As mentioned above, portions of the related frames 2350 that are in accordance with at least one structure of interest are assembled into a stream of new packets 2370 that are stored in memory or sent to an external entity for observation. Packets 2302 containing other portions of the related frames 2350, as well as unrelated frames or no frames at all, may be redirected elsewhere or simply discarded by the surveillance module 2300.

Those skilled in the art will appreciate that although the structures of interest are known to the surveillance module 2300, it is not known a priori which of the received frames 2350 contain portions, if any, that might be in accordance with the structure(s) of interest.

It may therefore be desirable for the surveillance module 2300 to inspect and analyze the headers and payloads of the received packets 2302 so as to determine whether the received packets 2302 contain related frames 2350, and to determine whether the related frames 2350 include portions that abide by any of the structures of interest. This inspection/analysis may include a process of identifying a structure in the frames 2350 and determining whether it is a structure of interest, and/or a process of comparing certain bits, markers or states corresponding to the structure of interest against bits, markers or states found in the frames 2350.

Once a portion of a given frame 2350 is found to be in accordance with a structure of interest, such portion is extracted from the given frame 2350 and assembled together with other successfully extracted portions of other ones of the frames 2350 (or even of the same frame) into a stream of new packets 2370, which can be recorded in memory (e.g., on disk) or sent to Charlie (e.g., via a network interface). Any other data in the frames 2350 may be ignored or discarded by the surveillance module 2300. This can be analogized to the surveillance module 2300 listening to a conversation between Alice and Bob, disregarding the small talk, and sending the essence of the conversation to Charlie.

In other cases, for example in the case where packets 2302 are related by a given flow, the surveillance module 2300 processes a particular one of the packets to first determine or suggest a "candidate" payload structure of the particular packet (such as RTP/UDP or RTSP-I/TCP) and then process at least part of the payload of the particular packet under the assumption that the candidate payload structure is the true payload structure. This includes processing at least part of the payload of the particular packet in accordance with one or more codec-specific tests and, if a given test of the one or more codec-specific tests is passed, this will confirm that the originally suggested candidate payload structure was correct, and an association may be created between the flow associated with the particular packet and the candidate payload structure. This association is recorded in memory and made available to a payload redirection module, which can learn that packets related to this flow contain video and are structured a certain way (e.g., RTP/UDP), thus allowing the video-carrying portions of the payload of such packets to be extracted, assembled and transmitted to Charlie, without necessarily decoding the coded video in each packet. This process is described in further detail elsewhere in the present disclosure.

In some embodiments, the surveillance module 2300 may be under various performance or computing constraints. To this end, the surveillance module 2300 may be equipped with hardware and/or software configured to monitor a particular computing condition such as bandwidth, memory/storage, temperature, processing power, etc. If the condition is met, the surveillance module 2300 may take an action.

For example, if the condition that is met generally signals a worsening situation (e.g., if available memory drops below a certain threshold, if available bandwidth to the external entity drops below a certain threshold, if network congestion rises above a certain threshold, if latency rises above a certain threshold, etc.), the surveillance module 2300 may be configured to reduce a quantity of data being assembled into the stream of new packets 2370. In the opposite case, the surveillance module 2300 may be configured to increase the quantity of data being assembled into the stream of new packets 2370.

One example of reducing the quantity of data being assembled into the stream of new packets 2370 is by way of reducing the number of structures that are considered structures of interest, i.e., by resetting certain interest flags in the polytree 2500. Conversely, certain interest flags (particularly those that had previously been reset due to worsening conditions) may be set once conditions improve again.

Consider now the situation where portions of the related frames 2350 have been found to abide by a particular structure of interest and are being assembled into the stream of new packets 2370. Another way to pare down or "throttle" the quantity of data being assembled into the stream of new packets 2370 is to assemble only representative sub-portions of such portions of the related frames 2350 into the stream of new packets 2370.

By way of specific non-limiting example, in the case where the structure of interest is a certain video data format, and if it is determined that a bandwidth reduction is required, the surveillance module 2300 may be configured to throttle the quantity of video data being assembled into the stream of new packets 2370. However, in accordance with certain embodiments of the disclosure, such throttling would not be done randomly. Rather, throttling may be done in a deliberate and deterministic manner, with a goal being to reduce visual artifacts seen by the external entity that receives the throttled stream forwarded by the surveillance module 2300.

To this end, each structure of interest may be associated with its own unique set of "instructions" when facing constraints of various kinds. Reference is now made to FIG. 26, which shows a table 2600 indicating, for each structure of interest, the representative portions to preserve under different constraints. For example, in the case where the structure of interest is structure "Structure A", and when facing constraint "Memory space reduction", the surveillance module 2300 is configured to keep representative portions "XYZ".

As a practical example, and with continued reference to table 2600 in FIG. 26, consider the structure of interest being an H.263 structure. When facing a constraint of "Bandwidth reduction", the surveillance module 2300 is configured to preserve "every Xth video image" and discard the rest. This would result in using only approximately 1/X of the usual bandwidth, since only every Xth video image would find its way into the stream of new packets 2370 being sent to the external entity.

Another practical example involves a more complex codec type, such as H.264, whose structure comprises i-frames and p-frames. In this case, the representative portions are the i-frames. As such, when facing a constraint of "Bandwidth reduction", the surveillance module 2300 is configured to preserve "i-frames", whereas p-frames may be ignored or discarded, e.g., until conditions improve. It is noted that the i-frames can be found at known locations within the frames 2350 without having to decode the packets themselves, thus the surveillance module 2300 can continue to operate at high speed, while significantly reducing the bandwidth and memory requirements of the stream of new packets 2370.

Those skilled in the art will appreciate that there may be several layers of constraints and combinations of constraints, each associated with its own respective set of instructions.

Memory Management

As new packets are received by the surveillance module 70 (or 2300), the identifiers that define various flows may be stored in a memory container 164 which, as shown in FIG. 9A, may include (or be represented as including) an array of records 161. Each of the records 161 has a plurality of fields including a flow field (which has source IP 156, source port 158, destination IP 160 and destination port 162 sub-fields), a payload structure field, a codec field and a timestamp field. In this embodiment, upon identifying a codec for a packet having a particular flow corresponding to the contents of the flow field of a given record, the codec detection module 78 is configured to store the corresponding payload structure and detected codec in the payload structure and codec fields, respectively, of the given record and to store the current time in the timestamp field of the given record.

Since a newly discovered flow may require additional memory to be allocated, the codec detection module 78 is configured to perform a memory management process for managing the memory container 164 so as to prevent excessive and unfillable memory allocation requests. To this end, the memory management process may utilize the notion of a keep-alive period, wherein the keep-alive period is a period of time allotted for codec detection following detection of a new flow. The effect of the keep-alive period is to release memory when a codec is not identified for a particular flow after a certain amount of time (e.g., 1-10 seconds, but possibly longer or shorter).

Figure 9B:
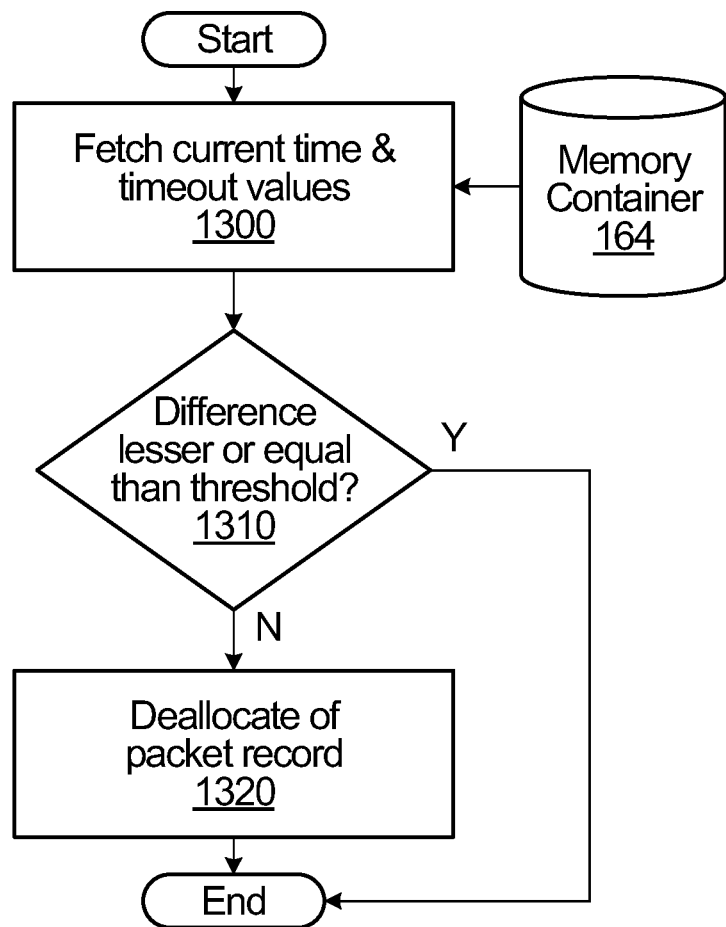
FIG. 9B is a flowchart corresponding to an example memory management process.

To this end, the memory container 164 may be stored as a global variable and the memory management process may be described with reference to the flowchart in FIG. 9B. At step 1300, the memory management process obtains the current time and compares it to the value of the timestamp field of each record of the memory container 164. This may be done sequentially or in parallel. At step 1310, if the difference computed is not greater than a threshold (e.g., 1, 5, 10, 15 seconds), i.e., if the current time and the value of the timestamp field for a given record are within the threshold of one another, the memory management process terminates for the present packet. However, if comparing the current time and the value of the timestamp field reveals a difference greater than the threshold for a given record, the memory management process proceeds to step 1320, where the control module carries out a deallocation of memory. Specifically, the memory space formerly taken up by the given record is freed up (released or deallocated). This may have the advantage of preventing unnecessary consumption of memory for a potentially huge number of flows that ultimately may not be used for a long time. Of course, this function can be optimized further so that memory allocation and deallocation is done asynchronously and/or less often and/or using larger blocks of memory (e.g., greater than a single record at a time). Also, the memory management process may pre-allocate additional memory as needs grow.

Additional Remarks

In view of the foregoing, it will be appreciated that the present disclosure provides various methods. These methods may be summarized in the flowcharts of FIGS. 13-18.

Figure 13:
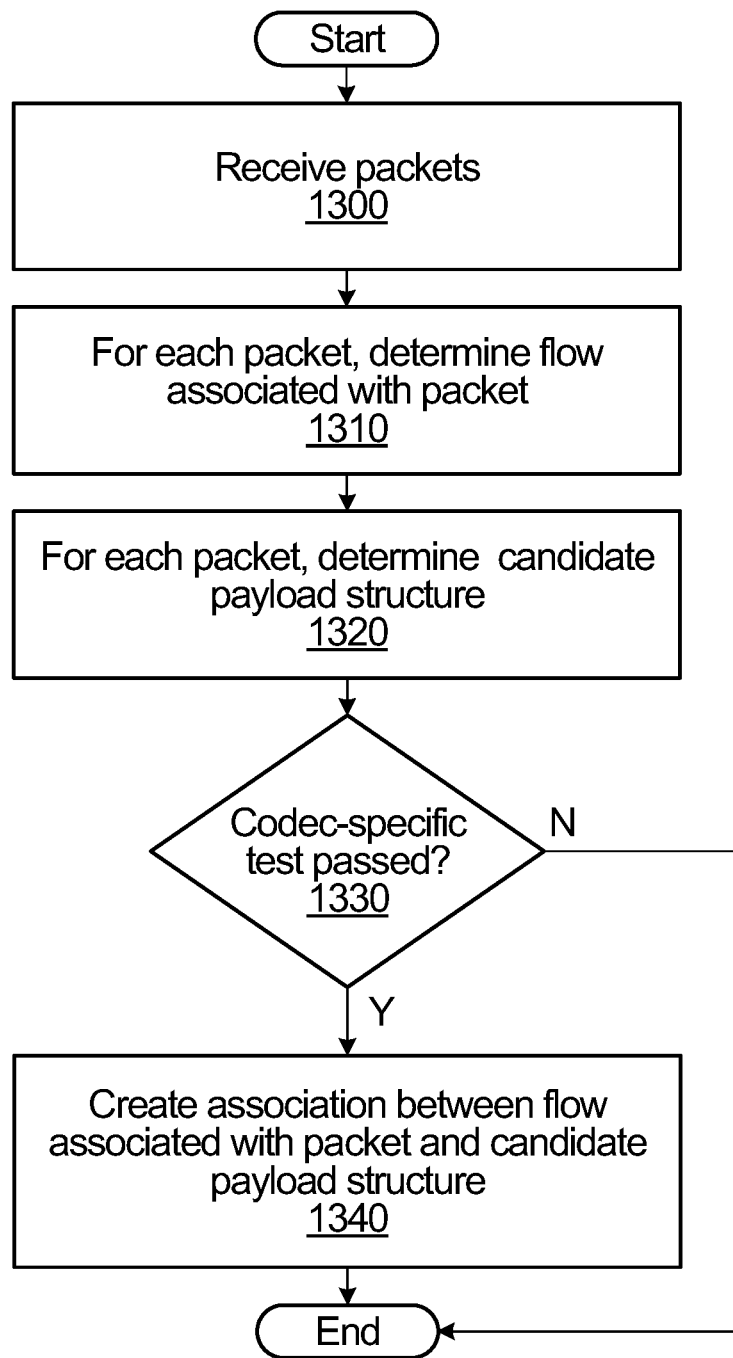
FIG. 13 is a flowchart corresponding to an example method carried out within the codec detection module.

With reference to FIG. 13, a computer-implemented method implemented within the codec detection module 78 is described. At step 1300, a plurality of packets is received. Each of the packets comprises a header and a payload. It is noted that for each particular packet among the packets the following additional steps are executed. At step 1310, the header of the particular packet is processed to determine a flow associated with the particular packet. Once, the payload of the particular packet is processed to determine a candidate payload structure of the particular packet at step 1320, the payload of the particular packet is further processed in accordance with the candidate payload structure at step 1330, The latter includes payload processing in accordance with one or more codec-specific tests. If the test is successful, an association between the flow associated with the particular packet and the candidate payload structure is created at step 1340.

Figure 14:
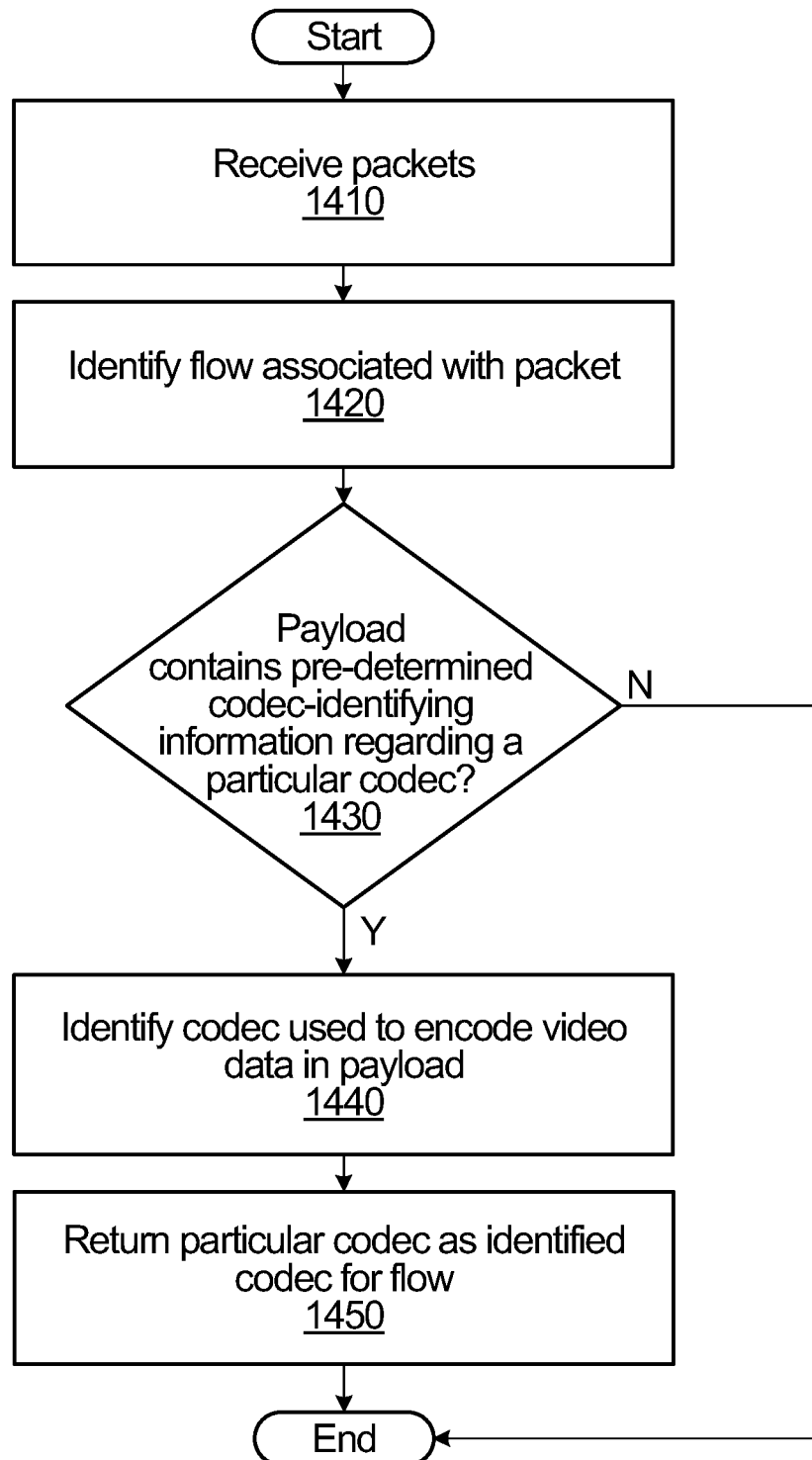
FIGS. 14 and 15 are flowcharts corresponding to example codec autodetect sub-processes.

With reference to FIG. 14, a computer-implemented method carried out as part of the codec autodetect process with an "instantaneous" approach is explained below. At step 1410, the packet, comprising a header and a payload, is received. Next, at step 1420, a portion of the packet is processed to identify a flow associated with the packet. At step 1430, if it is determined that the payload contains pre-determined codec-identifying information regarding a particular codec that is sufficient to identify the particular codec as having been used to encode video data in the payload, the particular code is identified (step 1440) and returned as an identified codec for the flow at step 1450.

Figure 15:
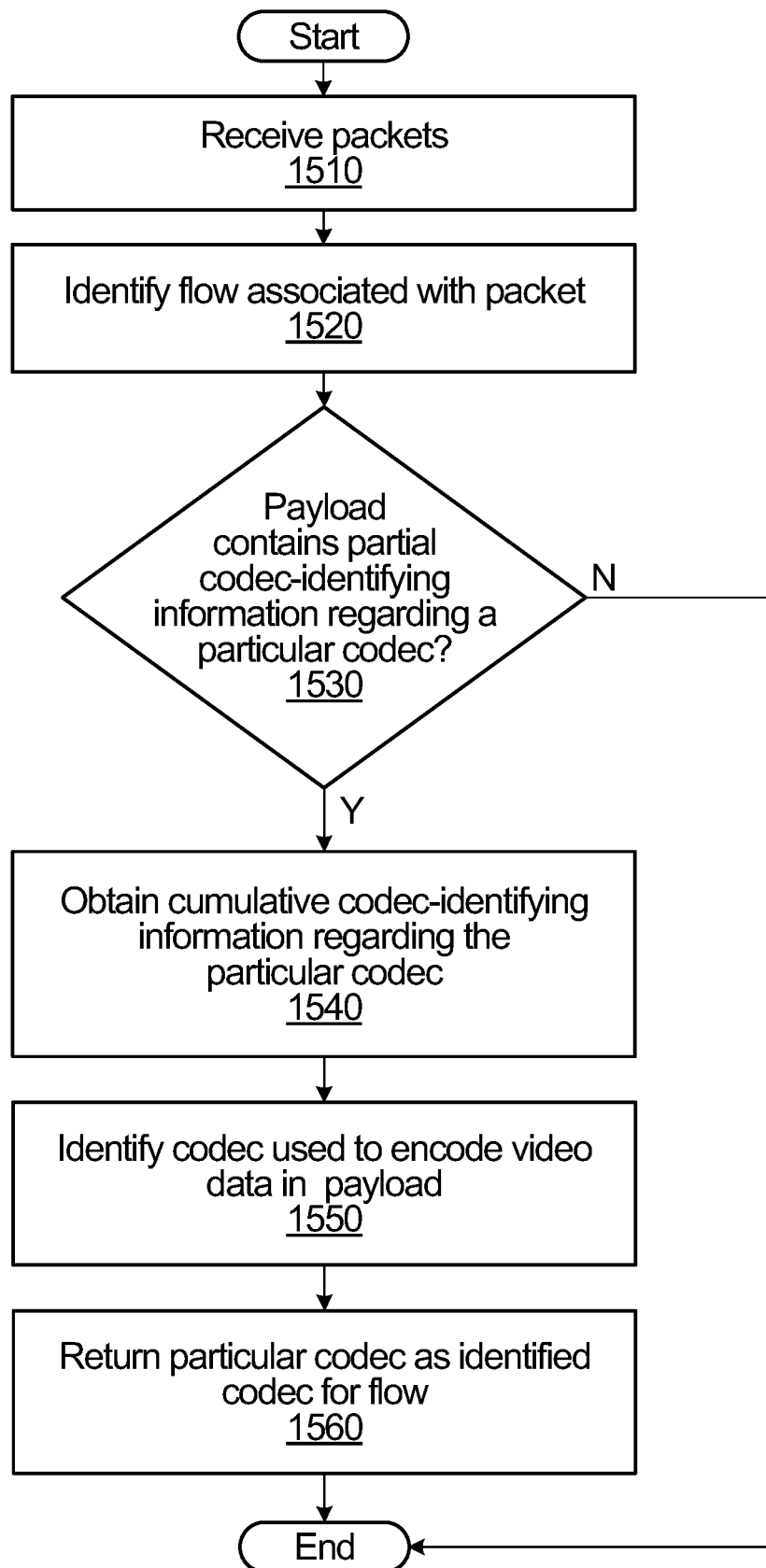

With reference to FIG. 15, a method carried out as part of the codec autodetect sub-process 210 with a "cumulative" approach is explained below. At step 1510, a packet comprising a header and a payload is received. Then, a portion of the packet is processed to identify a flow associated with the packet in step 1520. If it is determined that the payload contains partial codec-identifying information regarding a particular codec at step 1530, the partial codec-identifying information is added to previously determined partial codec-identifying information regarding the particular codec and, as a result, obtain cumulative codec-identifying information regarding the particular codec (step 1540). Following this, the particular codec is identified as having been used to encode video data in the payload in step 1550. To finish, at step 1560, the particular codec is returned as an identified codec for the flow in case the cumulative codec-identifying information regarding the particular codec is sufficient to identify the particular codec as having been used to encode video data in the payload.

Figure 16:
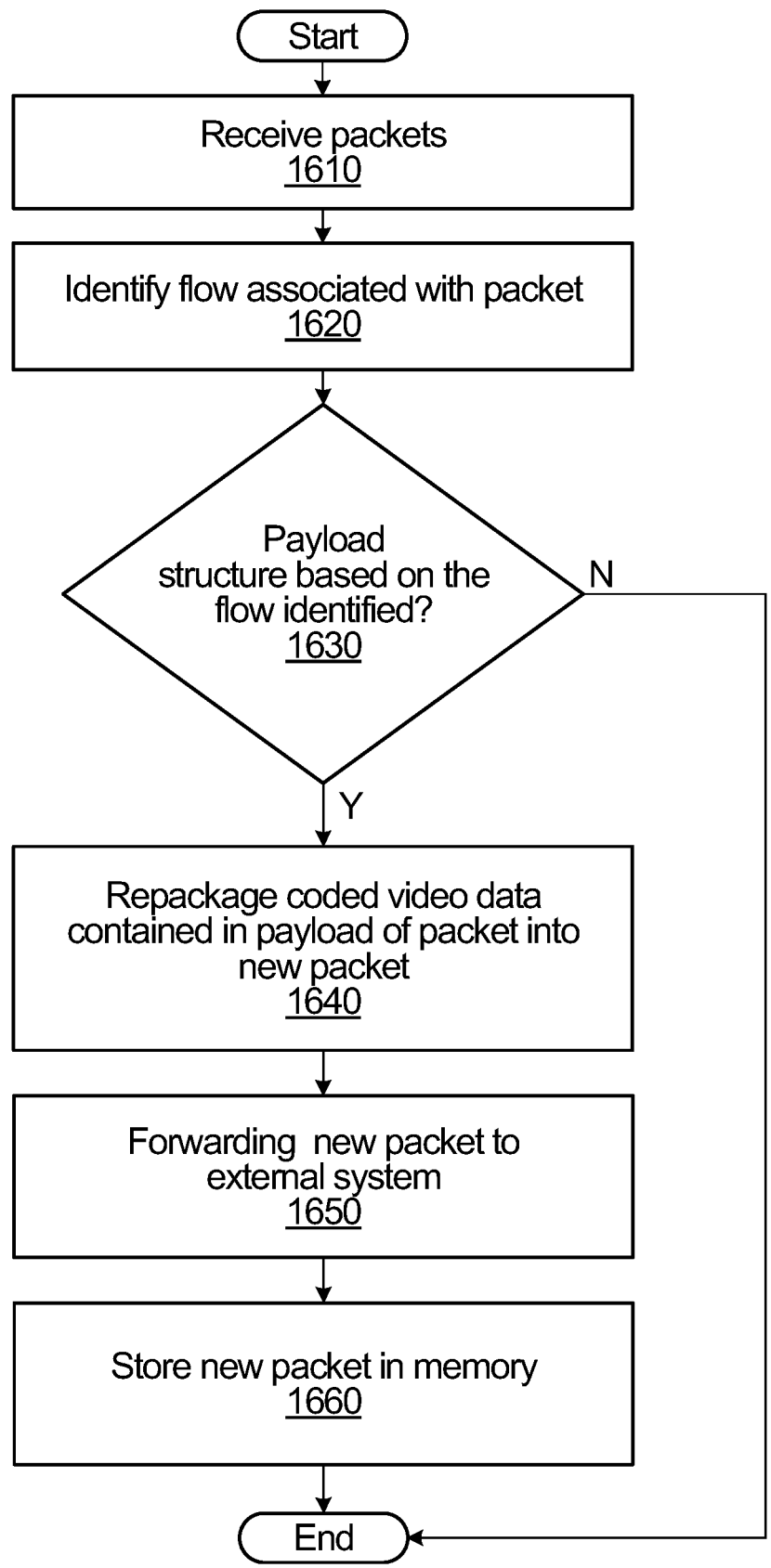
FIG. 16 is a flowchart corresponding to an example method carried out within a payload redirection module.

With reference to FIG. 16, a computer-implemented method is shown. At step 1610, packets, comprising a header and a payload, are received. Specifically, for each of the packets, the following steps are performed. In the first place, the header of the particular packet is processed at step 1620 in order to determine a flow associated with the particular packet. If a payload structure based on the flow, the payload structure associated with transport of coded video data in the payload of the particular packet, is successfully identified (step 1630), the coded video data contained in the payload of the particular packet is repackaged into a new packet at step 1640. Then the packet is forwarded to an external system (step 1650) and/or stored in memory (step 1660).

Figure 17:
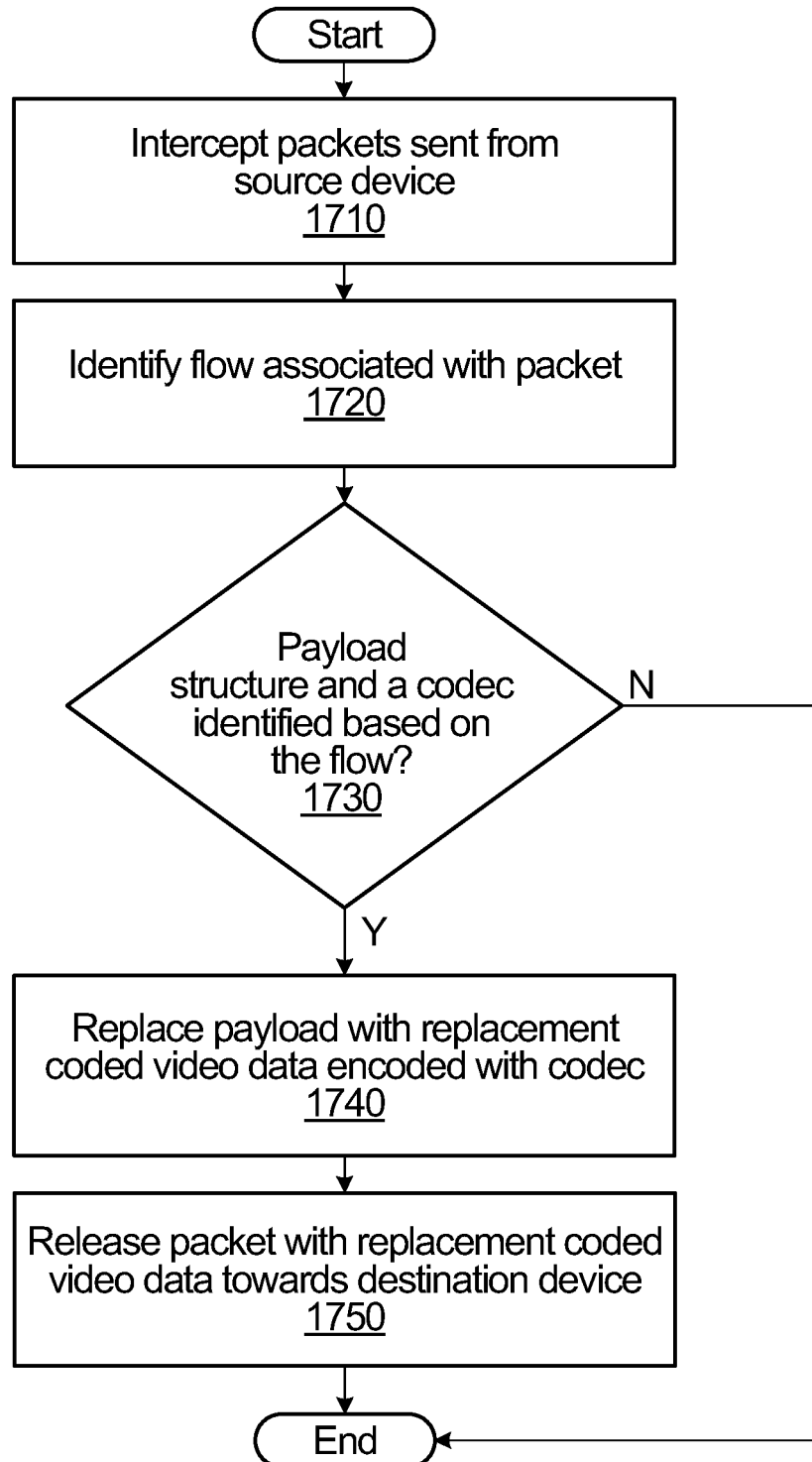
FIG. 17 is a flowchart corresponding to an example method carried out within a payload modification module.

With reference to FIG. 17, a computer-implemented method implemented within the payload modification module and is described below. The computer-implemented method comprises intercepting packets sent from a source device and destined for a destination device at step 1710. Then for a particular packet among the packets the following steps are carried out: At step 1720, the header of the particular packet is processed to determine a flow associated with the particular packet. If a payload structure and a codec are identified based on the flow during step 1730, the payload of the particular packet is replaced with replacement coded video data that has been encoded with the codec at step 1740. Finally, at step 1750, the packet with the replacement coded video data is then released towards the destination device instead of the particular packet.

Figure 18:
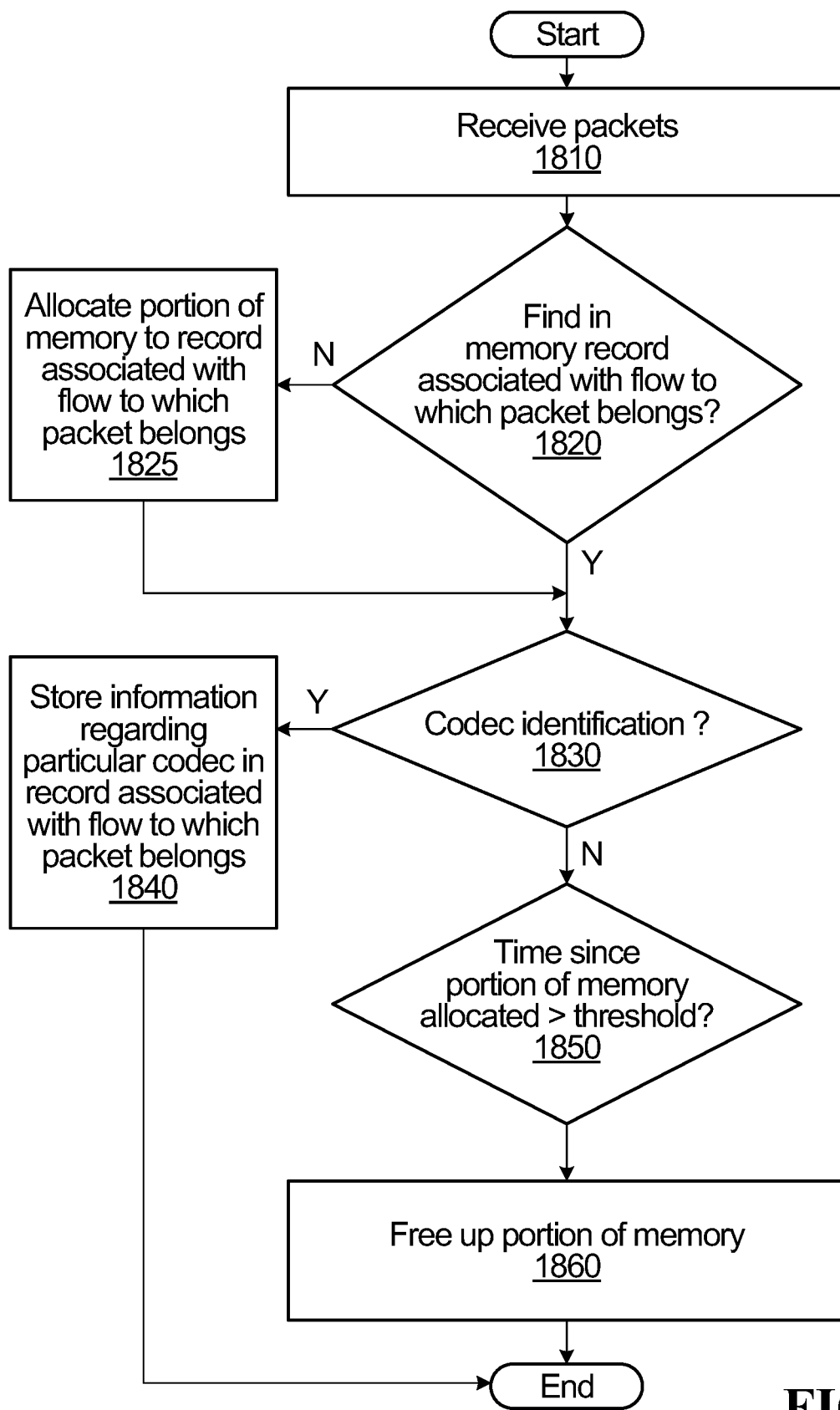
FIG. 18 is a flowchart corresponding to an example memory management process.

With reference to FIG. 18, a processor-implemented method carried out during a memory management process is presented below. The memory management process starts with receiving a plurality of packets, each belonging to one of a plurality of flows at step 1810. Upon receipt of each of the packet, the memory management process proceeds to perform the following actions. At step 1820, a record associated with the flow to which the packet belongs is searched in the memory. In case no record is found within the memory, a portion of the memory is allocated to a record associated with the flow to which the packet belongs (step 1825). Next, codec identification is attempted by processing the payload of the packet. At this point, if a particular codec is successfully identified (step 1830) then the information regarding the particular codec is stored (step 1840) in the record associated with the flow to which the packet belongs. If unsuccessful and a certain period of time has elapsed since the portion of the memory has been allocated (verification at step 1850), the portion of the memory is freed up at step 1860.

Figure 12:
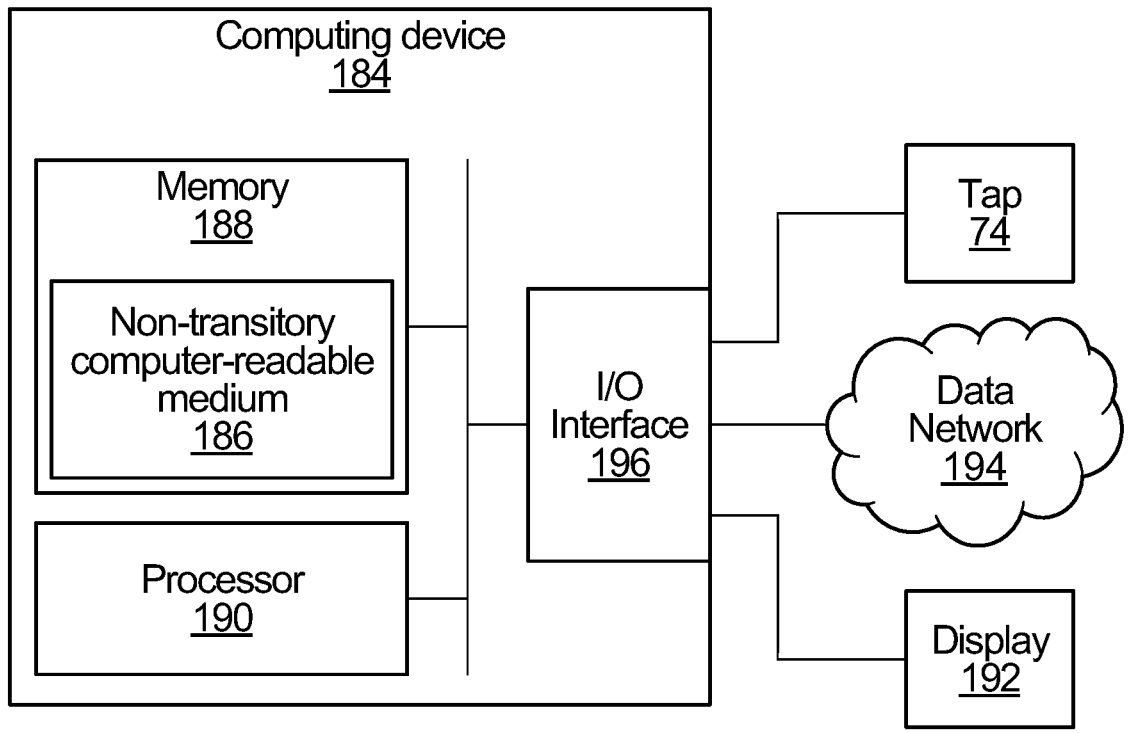
FIG. 12 is a block diagram of an example computing device.

Also, it will be appreciated that certain embodiments or parts of the surveillance module 70 can be implemented as hardware, firmware, software, or a combination thereof. For example, with reference to FIG. 12, the codec detection module 78 and/or the payload redirection module 82 and/or the payload modification module 198 may be implemented as an apparatus (e.g., a computing device) comprising a microprocessor 190 and a computer-readable program storage unit. An application program may be tangibly stored in the program storage unit, and may encode the various methods and functions referred to above. The application program in the program storage unit, as well as operating system code, may be read and executed by the microprocessor 190, thereby to carry out the various methods and functions encoded in the application program. The microprocessor 190 may include one or more central processing units ("CPUs") and/or graphics processing units ("GPUs"). An input/output (I/O) interface 196 allows the microprocessor 190 to communicate with the outside world, be it with the tap 74, the console, a data network 194 or a display 192.

It should also be appreciated that while the above description has been focused on video codecs, those skilled in the art would find it within their purview to apply the teachings herein to any media that is coded and decoded, and is transported using packets, including but not limited to video and/or audio that is encoded/decoded by various video/audio codecs.

The examples and language recited herein are intended for pedagogical purposes to aid the reader in understanding the principles of the disclosed embodiments and concepts, and are to be construed as being without limitation to such specifically recited examples and language. Moreover, statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated that certain adaptations and modifications of the described embodiments can be made. Therefore, the above discussed embodiments are to be considered illustrative and not restrictive. Also, it should be appreciated that additional elements that may be needed for operation of certain embodiments of the present disclosure have not been described or illustrated as they are assumed to be within the purview of the person of ordinary skill in the art. Moreover, any feature of any embodiment discussed herein may be combined with any feature of any other embodiment discussed herein in some examples of implementation. Moreover, certain embodiments of the present disclosure may be free of, may lack and/or may function without any element that is not specifically disclosed herein.

What is claimed is:

1. A system comprising:
a tap for capturing packets sent from a source device to a destination device on a data network;
a surveillance module operatively coupled to the tap, the surveillance module having an input port, and output port and a processing entity configured for receiving the captured packets from the tap via the input port, each of the packets comprising a header and a payload and, for a particular packet among the packets:
  (i) processing at least the header of the particular packet to determine a flow associated with the particular packet;
  (ii) attempting to determine a payload structure based on the flow, the payload structure associated with transport of coded video data in the payload of the particular packet;
  (iii) if the attempting is successful, repackaging coded video data contained in the payload of the particular packet into a new packet and forwarding the new packet to an external system via the output port or storing the new packet in memory.

2. The system defined in claim 1, wherein the tap is a passive tap.

3. The system defined in claim 1, wherein the tap is an active tap.

4. The system defined in claim 3, wherein the tap is configured for intercepting the packets sent from the source device and for sending versions of the captured packets to the surveillance module and to the destination device.

5. The system defined in claim 1, wherein attempting to determine the payload structure based on the flow comprises consulting a database that associates a set of flows to corresponding payload structures.

6. The system defined in claim 1, wherein the flow is unique to the source device.

7. The system defined in claim 1, wherein the flow is defined by a combination of identifiers including at least one of: source address, destination address, source port, destination port and MAC address.

8. The system defined in claim 1, wherein the particular packet is an IP packet comprising a header and a payload, the payload carrying the coded video data, and wherein the repackaging comprises repackaging the coded video data in the payload of the particular packet into RTP payloads sent to an output socket.

9. The system defined in claim 1, wherein the particular packet is an IP packet comprising a header and a payload, and wherein the flow is defined by a combination of identifiers, at least one of the identifiers being contained at least in the header of the IP packet.

10. The system defined in claim 9, wherein each of the identifiers is contained in the header of the IP packet.

11. The system defined in claim 9, wherein at least another one of the identifiers is contained in the payload of the IP packet.

12. The system defined in claim 11, wherein the payload of the IP packet carries an encapsulated packet comprising a header and a payload, and wherein the at least another one of the identifiers is contained in the header of the encapsulated packet.

13. The system defined in claim 1, wherein the payload structure associated with at least one flow is one of: RTP/UDP, RTSP-I/TCP and HTTP MJPEG multipart.

14. The system defined in claim 1, wherein the surveillance module is configured for ignoring or discarding the particular packet if the attempting is not successful.

15. The system defined in claim 1, wherein the repackaging is carried out in a manner that is dependent on the payload structure.

16. The system defined in claim 1, wherein the surveillance is further configured for repackaging the coded video data without decoding the video data.

17. The system defined in claim 1, wherein the surveillance module is further configured for validating at least some of the coded video data before the repackaging.

18. A computer-implemented method, comprising:
capturing packets sent from a source device to a destination device on a data network;
receiving the captured packets, each of the packets comprising a header and a payload; and
for a particular packet among the packets:
  (i) processing at least the header of the particular packet to determine a flow associated with the particular packet;
  (ii) attempting to determine a payload structure based on the flow, the payload structure associated with transport of coded video data in the payload of the particular packet;
  (iii) if the attempting is successful, repackaging coded video data contained in the payload of the particular packet into a new packet and forwarding the new packet to an external system or storing the new packet in a memory.

19. A computer-implemented method, comprising:
intercepting packets sent from a source device and destined for a destination device, each of the packets comprising a header and a payload;
for a particular packet among the packets:
  processing at least the header of the particular packet to determine a flow associated with the particular packet;

attempting to determine a payload structure and a codec based on the flow;

if the attempting is successful, constructing a new packet with a header and a payload, the header of the new packet comprising the header of the particular packet and the payload of the new packet comprising replacement coded video data that has been encoded with said determined codec, and releasing the new packet towards the destination device.

20. The method defined in claim 19, wherein the particular packet is received from a first device and wherein the header of the particular packet indicates that the particular packet is destined for a second device, the new packet being released towards the second device.

21. The method defined in claim 20, wherein the payload of the particular packet comprises an embedded packet with a header and a payload, wherein the payload of the new packet comprises an embedded packet with a header and a payload, wherein the header of particular packet and the header of the embedded packet in the payload of the particular packet are identical to the header of the new packet and the header of the embedded packet in the payload of the new packet, respectively.

22. The method defined in claim 19, further comprising loading the replacement coded video data from a database.

23. The method defined in claim 22, wherein the database is configured to store video data that has been encoded with a plurality of different codecs including with said determined codec.

24. The method defined in claim 19, further comprising obtaining the replacement coded video data by extracting coded video data from the payload of the particular packet, decoding the extracted coded video data, modifying the decoded video data, re-encoding the modified video data with said determined codec and loading the re-encoded modified video data into the payload of the new packet.

25. The method defined in claim 24, wherein modifying the decoded video data comprises obfuscating facial features detected in the decoded video data.

26. The method defined in claim 19, wherein attempting to determine the payload structure and the codec based on the flow comprises consulting a database that associates a set of flows to corresponding payload structure and codec combinations.

27. The method defined in claim 19, wherein the flow is unique to the source device.

28. The method defined in claim 19, wherein the flow is defined by a combination of identifiers including at least one of: source address, destination address, source port, destination port and MAC address.

29. A non-transitory computer-readable medium storing computer-readable instructions which, when executed by a processor, cause the processor to carry out a method in accordance with claim 19.

30. A computing device comprising:
a. a computer-readable program storage unit comprising an application program and an operating system code; and
b. a processor being configured to read and execute the application program so as to carry out a method that comprises:
   i. intercepting packets sent from a source device and destined for a destination device, each of the packets comprising a header and a payload;
   ii. for a particular packet among the packets:
   processing at least the header of the particular packet to determine a flow associated with the particular packet;
   attempting to determine a payload structure and a codec based on the flow; and
   if the attempting is successful, constructing a new packet with a header and a payload, the header of the new packet comprising the header of the particular packet and the payload of the new packet comprising replacement coded video data that has been encoded with said determined codec, and releasing the new packet towards the destination device.

* * * * *